(12) United States Patent
Kay et al.

(10) Patent No.: US 11,794,632 B2
(45) Date of Patent: Oct. 24, 2023

(54) HEADLIGHT MATRIX SYSTEMS AND METHODS FOR A VEHICLE

(71) Applicant: J.W. SPEAKER CORPORATION, Germantown, WI (US)

(72) Inventors: Bradley William Kay, Mequon, WI (US); Dragan Popovic, Germantown, WI (US)

(73) Assignee: J.W. SPEAKER CORPORATION, Germantown, WI (US)

( * ) Notice: Subject to any disclaimer, the term of this patent is extended or adjusted under 35 U.S.C. 154(b) by 0 days.

(21) Appl. No.: 17/883,343

(22) Filed: Aug. 8, 2022

(65) Prior Publication Data

US 2022/0373147 A1 Nov. 24, 2022

Related U.S. Application Data

(63) Continuation of application No. 17/146,656, filed on Jan. 12, 2021, now Pat. No. 11,407,354, which is a
(Continued)

(51) Int. Cl.
*B60Q 1/115* (2006.01)
*F21S 41/265* (2018.01)
*F21S 41/153* (2018.01)
*F21S 41/32* (2018.01)
*F21S 41/663* (2018.01)
*F21S 41/141* (2018.01)
*B60Q 1/14* (2006.01)
*F21Y 115/10* (2016.01)

(52) U.S. Cl.
CPC ............ *B60Q 1/115* (2013.01); *B60Q 1/1423* (2013.01); *F21S 41/141* (2018.01); *F21S 41/153* (2018.01); *F21S 41/265* (2018.01); *F21S 41/32* (2018.01); *F21S 41/663* (2018.01); *B60Q 2300/13* (2013.01); *B60Q 2300/136* (2013.01); *B60Q 2300/32* (2013.01); *F21Y 2115/10* (2016.08)

(58) Field of Classification Search
CPC ...... F21S 41/141; F21S 41/153; F21S 41/265; F21S 41/32; F21S 41/663; F21Y 2115/10; F21W 2102/19; B60Q 1/143; B60Q 1/12; B60Q 1/1423; B60Q 1/115; B60Q 2300/114; B60Q 2300/42; B60Q 2300/054; B60Q 2300/122; B60Q 2300/13; B60Q 2300/32; B60Q 2300/136; B62J 6/023
See application file for complete search history.

(56) References Cited

U.S. PATENT DOCUMENTS

2018/0238512 A1* 8/2018 Courcier ............... F21S 41/321

* cited by examiner

*Primary Examiner* — Anne M Hines
*Assistant Examiner* — Jose M Diaz
(74) *Attorney, Agent, or Firm* — Quarles & Brady LLP

(57) ABSTRACT

A headlight system for a banking vehicle is provided. The headlight system includes a plurality of optical assemblies being arranged about an optical horizon and an optical vertical axis. Each of the plurality of optical assemblies includes an illumination source and an optical element. Each of the illumination sources is configured to direct light toward a corresponding one of the optical elements to produce an illumination region. The illumination regions combine to form an illumination pattern that includes at least one illumination region that is radial and is positioned relative an optical origin. The intersection between the optical horizon and the optical vertical axis defines the optical origin.

20 Claims, 40 Drawing Sheets

Related U.S. Application Data continuation of application No. 16/179,865, filed on Nov. 2, 2018, now Pat. No. 10,919,437.

(60) Provisional application No. 62/580,762, filed on Nov. 2, 2017.

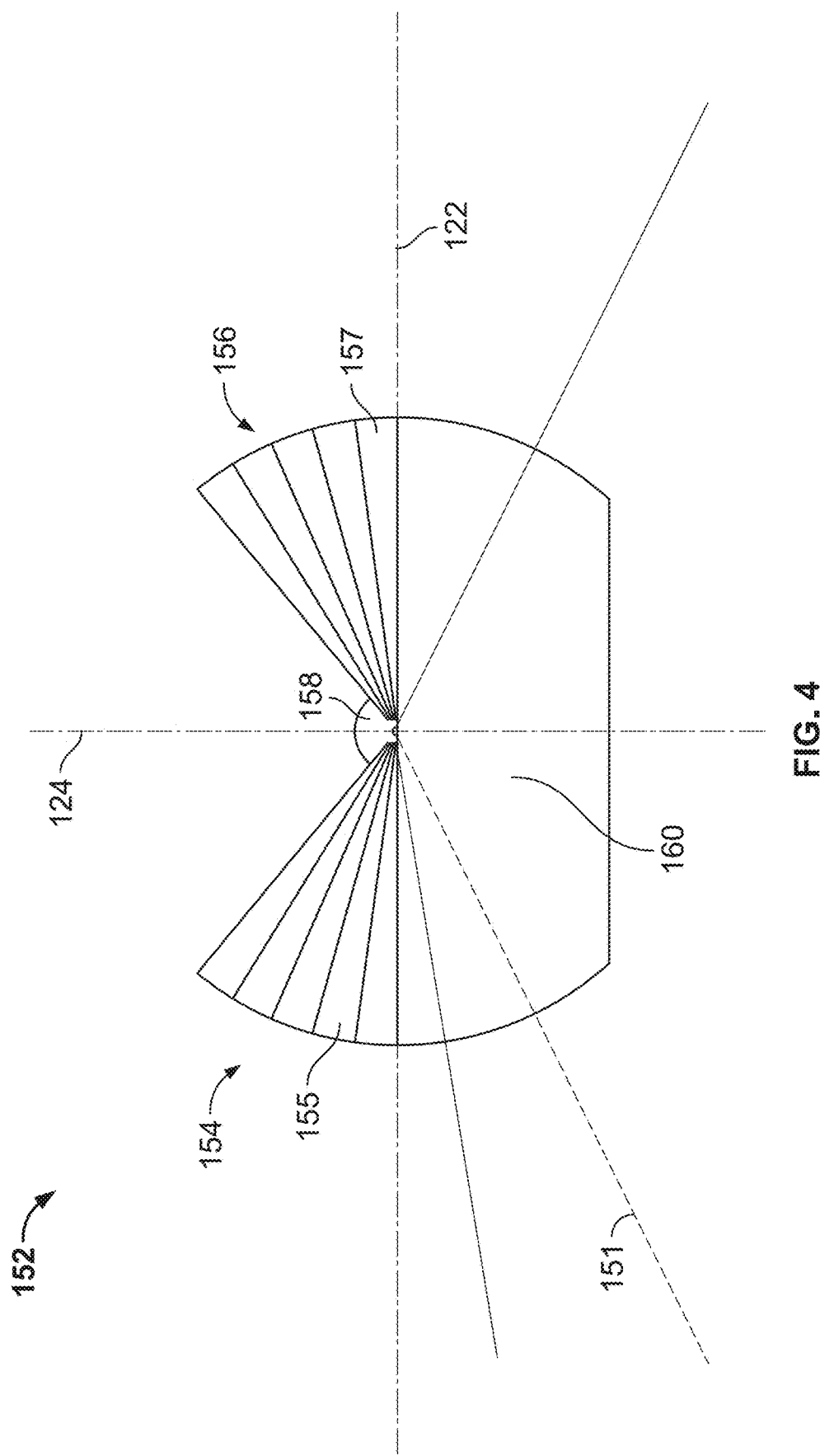

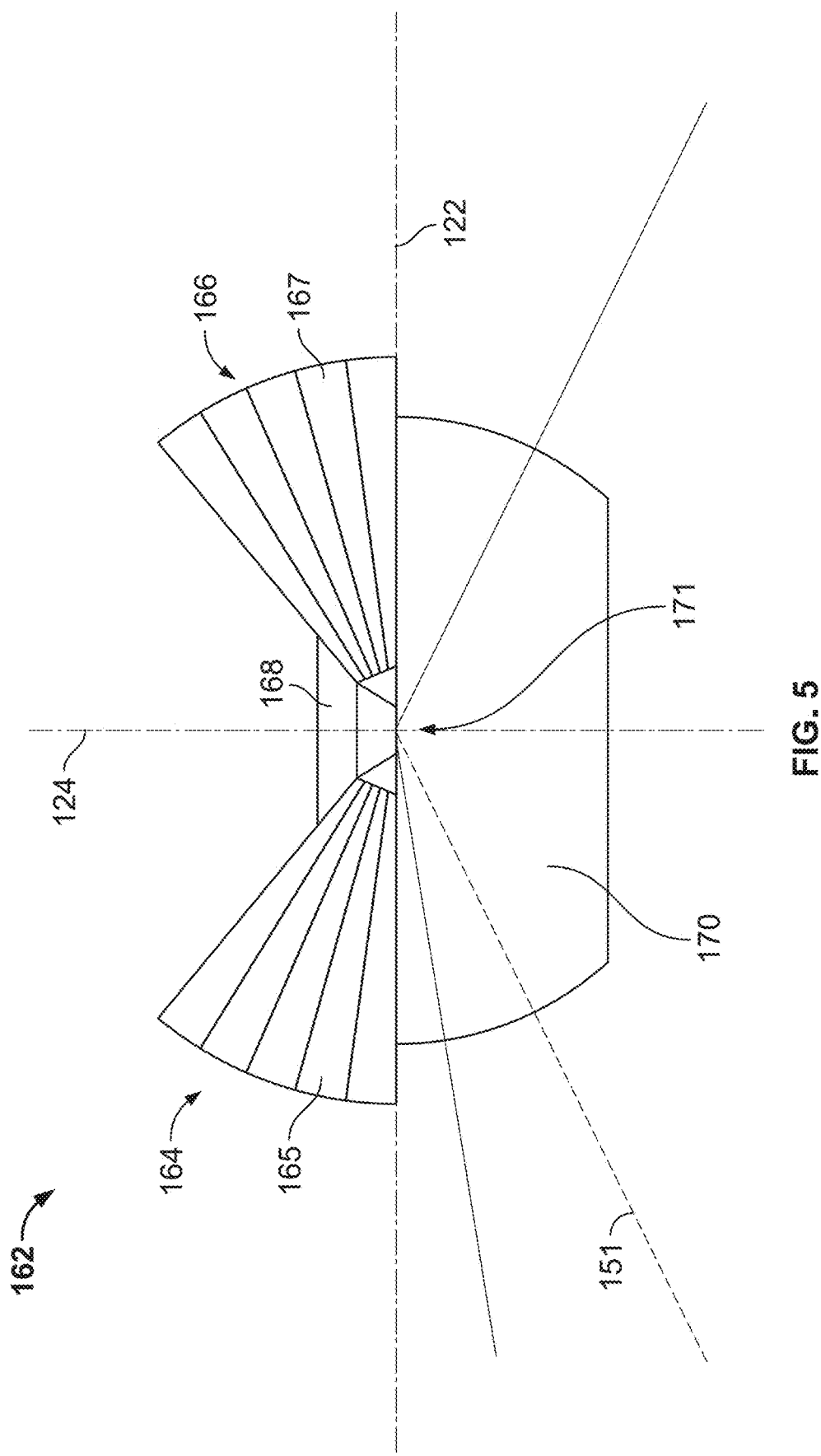

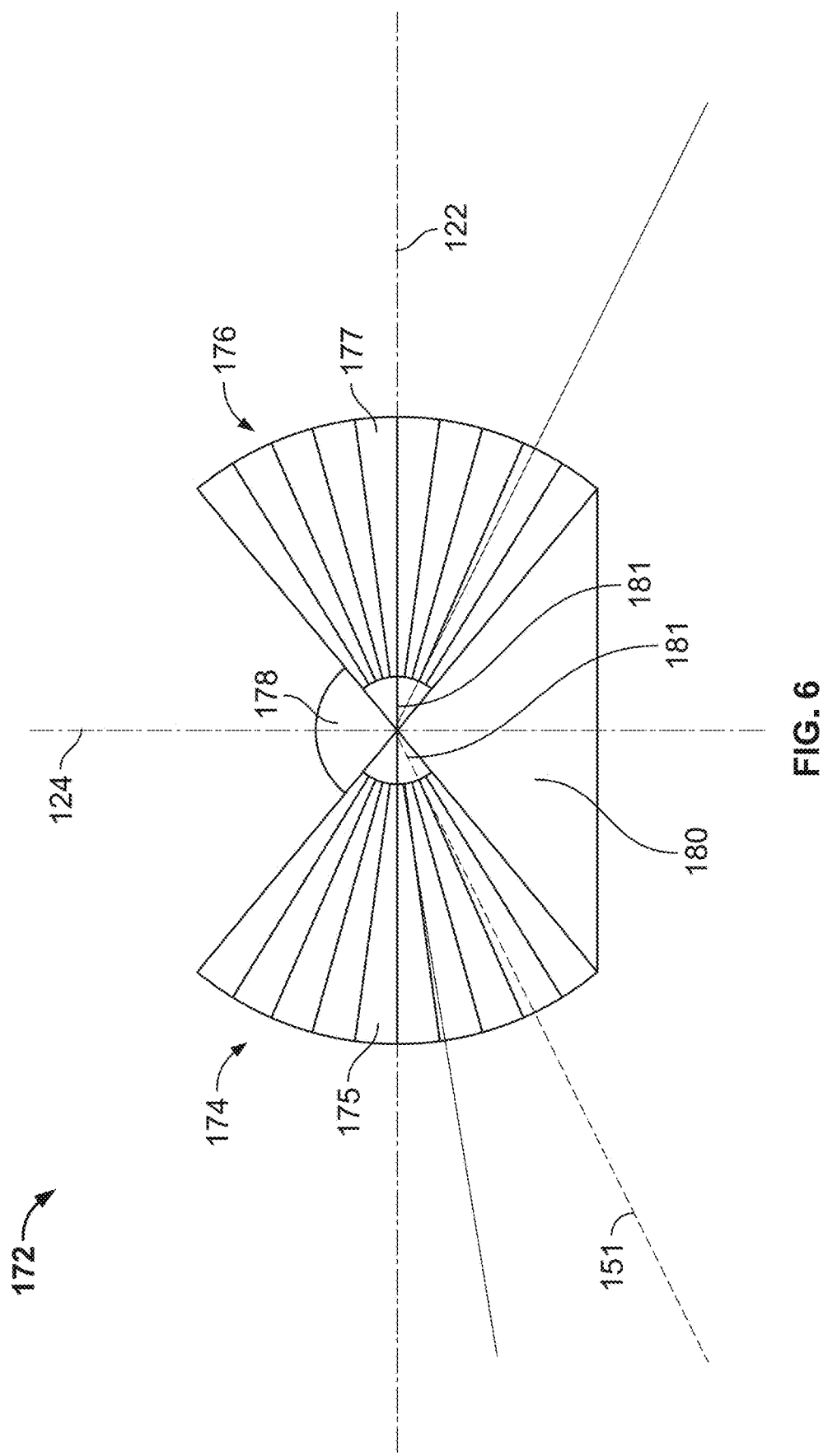

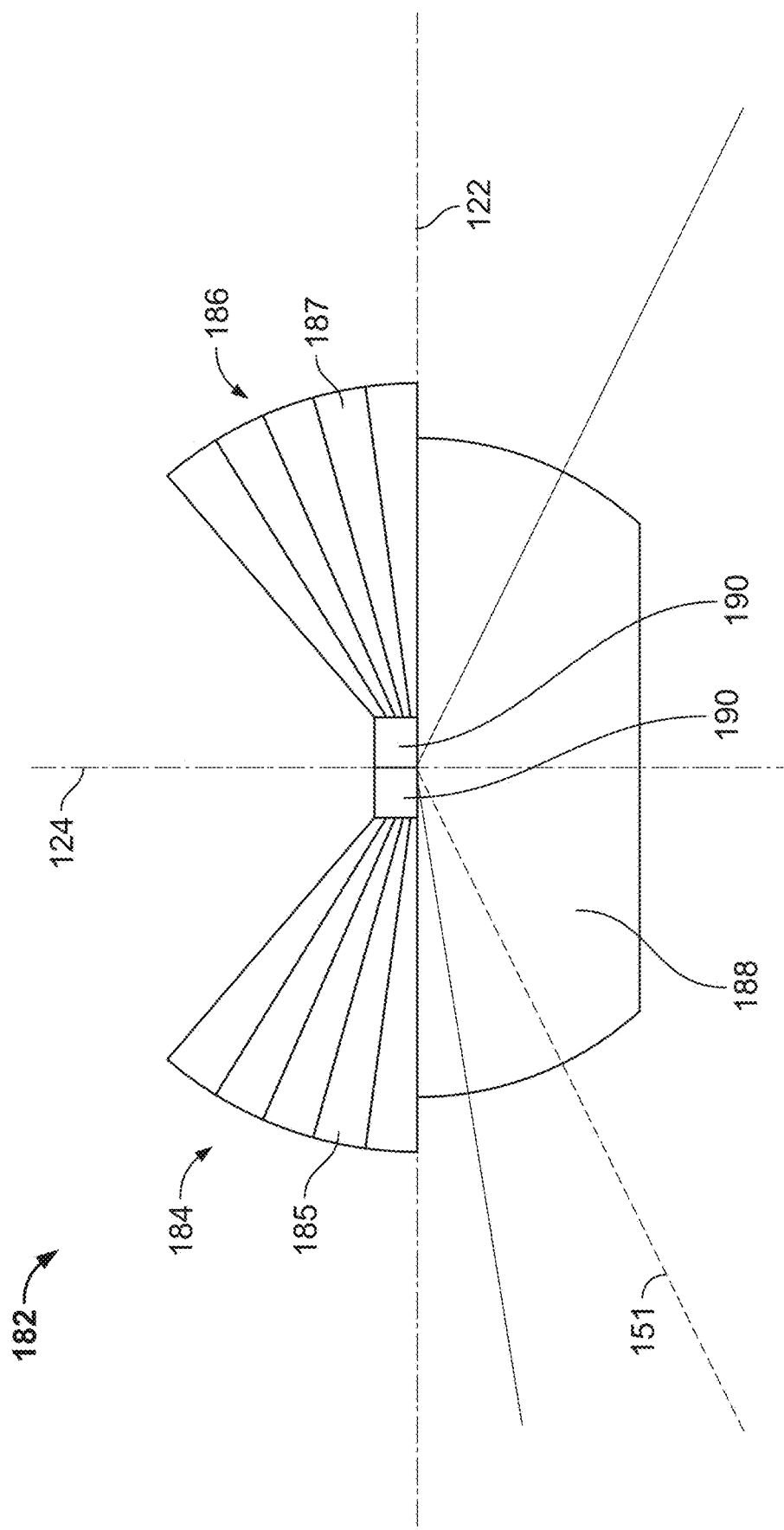

HEADLIGHT MATRIX SYSTEMS AND METHODS FOR A VEHICLE

CROSS-REFERENCE TO RELATED APPLICATIONS

The present application is a continuation of U.S. patent application Ser. No. 17/146,656, filed on Jan. 12, 2021, which is a continuation of U.S. patent application Ser. No. 16/179,865, filed on Nov. 2, 2018, now U.S. Pat. No. 10,919,437, issued Feb. 16, 2021, which is based on and claims priority to U.S. Provisional Patent Application No. 62/580,762, filed Nov. 2, 2017. All of which are incorporated herein by reference in their entirety.

STATEMENT OF FEDERALLY SPONSORED RESEARCH OR DEVELOPMENT

Not applicable.

BACKGROUND

Generally, vehicles include systems with one or more headlights that illuminate a region in front of the vehicle to provide a visible field of view for a driver of the vehicle. In some configurations, conventional headlight systems may include two illumination schemes, namely, a high beam and a low beam. The high beam may illuminate a region above a visual horizontal axis of the driver and is typically only utilized during conditions of significantly low visibility (e.g., at night on an unlit road). The low beam may illuminate a region below the visual horizontal axis of the driver and is typically used during normal low light conditions (e.g., at night on a lit road).

SUMMARY

In some aspect, the present disclosure provides a headlight system for a banking vehicle. The headlight system includes a plurality of optical assemblies being arranged about an optical horizon and an optical vertical axis. Each of the plurality of optical assemblies includes an illumination source and an optical element. Each of the illumination sources is configured to direct light toward a corresponding one of the optical elements to produce an illumination region. The illumination regions combine to form an illumination pattern that includes at least one illumination region that is radial and is positioned relative an optical origin. The intersection between the optical horizon and the optical vertical axis defines the optical origin.

In some aspects, the present disclosure provides headlight system for a leaning vehicle. The headlight system includes a plurality of optical assemblies being arranged about an optical horizon and an optical vertical axis. Each of the optical assemblies is configured to produce an illumination region. The illumination regions combine to form an illumination pattern. At least one illumination region is radial and positioned relative an optical origin. The intersection between the optical horizon and the optical vertical axis defines the optical origin.

In some aspects, the present disclosure provides method of controlling a headlight for a vehicle. The method comprising (i) emitting light from a plurality of light sources, wherein each light source has a corresponding optical element. The plurality of light sources being arranged about an optical horizon and an optical vertical axis. The method further includes (ii) forming an illumination region from each of the light sources and corresponding optical elements. At least one illumination region is radial and positioned relative an optical origin. The intersection between the optical horizon and the optical vertical axis defines the optical origin. The method further includes (iii) producing an illumination pattern from the illumination regions.

BRIEF DESCRIPTIONS OF THE DRAWINGS

The invention will be better understood and features, aspects and advantages other than those set forth above will become apparent when consideration is given to the following detailed description thereof. Such detailed description makes reference to the following drawings.

FIG. 4 is a schematic illustration of another illumination pattern, according to aspects of the present disclosure.

FIG. 5 is a schematic illustration of another illumination pattern, according to aspects of the present disclosure.

FIG. 6 is a schematic illustration of another illumination pattern, according to aspects of the present disclosure.

FIG. 7 is a schematic illustration of another illumination pattern, according to aspects of the present disclosure.

DETAILED DESCRIPTION

Figure 1:
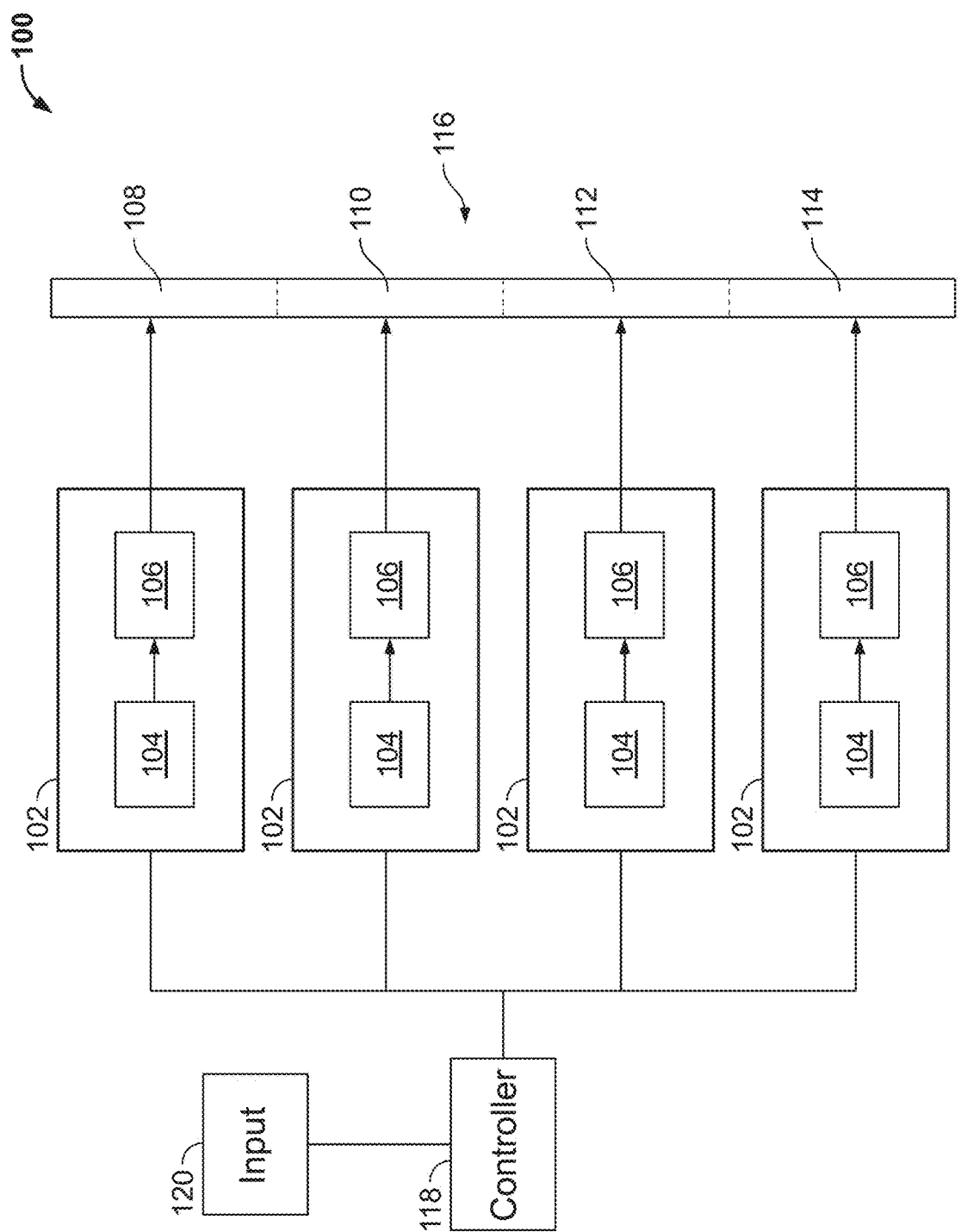
FIG. 1 is a schematic illustration of a vehicle matrix lighting system according to aspects of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, phrases similar to "at least one of A, B, and C," "one or more of A, B, and C," and the like, are meant to indicate A, or B, or C, or any combination of A, B, and/or C, including combinations with multiple or single instances of A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. Skilled artisans will recognize the examples provided herein have many useful alternatives and fall within the scope of embodiments of the invention.

As used herein, the term "processor" and "controller" may include one or more processors and memories and/or one or more programmable hardware elements. As used herein, the term "processor" and "controller" is intended to include any of types of processors, CPUs, microcontrollers, digital signal processors, or other devices capable of executing software instructions.

As used herein, the terms "edge" and "aligned" may refer to the spatial relationship between one or more illumination regions. For example, an "edge" of an illumination region "aligned" with an "edge" on a different illumination region may refer to multiple configurations. A first configuration being the two edges are shared by the two illumination regions. A second configuration may include the two edges being parallel or perpendicular to each other. A third configuration may include a slight overlap between the two illumination regions, due to the imperfect nature of optical components and/or illumination sources (e.g., the optical performance of reflectors, lens, light emitting diodes ("LEDs"), etc., in practice is not theoretically-perfect so some overlap may occur), which can be understood by a person skilled in the art. A last configuration can be any combination thereof.

The various embodiments of the vehicle headlight system disclosed herein will be described in connection with a vehicle that leans during a turn (e.g., banking vehicles, leaning vehicles, etc.). Examples of these vehicles include, but are not limited to, saddle-ride vehicles, motorcycles, three-wheeled motor vehicles, snowmobiles, and ATVs (all-terrain vehicles). When turning, banking vehicles "lean" into a turn, rotating the entire vehicle towards the ground, generally due to the driver shifting their center of mass inducing torque on the vehicle. As will be described herein, the vehicle headlight systems and methods described may include features and advantages that are well suited for vehicles that lean, or bank, into turns.

The present disclosure provides various systems and methods for producing and/or controlling an illumination pattern that includes individual illumination regions. In accordance with various embodiments, the illumination pattern can be formed and/or adjusted, for example, to prevent shining light onto an oncoming vehicle. For example, the illumination pattern can be changed by selectively adjusting an illumination intensity of one or more of the illumination regions. In some embodiments, an indication may be provided that indicates a vehicle is rotating (e.g., from a sensor) and, in response, the individual illumination regions can be adjusted accordingly. In this way, for example, an intensity of one or more of the illumination regions that are directed toward an oncoming vehicle or object may be decreased. Additionally, an intensity of one or more of the illumination regions that aid in the driver's visibility can be increased. For example, as the illumination pattern rotates in response to a vehicle turn, one or more of the illumination regions on a side of the illumination pattern into which the vehicle is leaning may be sequentially increased as a function of the vehicle lean, while one or more of the illumination regions on an opposite side of the illumination pattern away from which the vehicle is leaning may be sequentially decreased as a function of the vehicle lean.

In some embodiments, the shape of the individual illumination regions on the sides of the illumination pattern can be advantageous to both decrease shining light on an oncoming vehicle and increase visibility for the driver of the banking vehicle. For example, one or more of the illumination regions can be angled relative a horizontal optical axis and/or a vertical optical axis. The one or more angled illumination regions within the illumination pattern can have a corresponding illumination region symmetrically arranged about the vertical optical axis. The angled shape of the one or more illumination regions provides increased visibility on the side facing the turning side, and decreased visibility of the side opposite the turning side. For example, when the vehicle leans the angled illumination region(s) facing the leaning side, more closely follows the road, as the angled illumination region(s) align closer to becoming parallel with the road's surface, providing increased visibility to the driver. Additionally, when a vehicle leans the angled illumination region(s) opposite the leaning side, further deviates from the road, as the angled illumination region(s) align closer to becoming perpendicular to the road's surface and decrease light shining on oncoming traffic. In some embodiments, a vehicle input (e.g., a sensor) can quantify the degree of leaning during a turn. This vehicle input can be electrically connected to a controller that can adjust the intensity of the one or more angled illumination region(s) on the leaning side and/or the side opposite the leaning side.

As shown in FIG. 1, in some embodiments, the headlight system 100 can include a one or more of optical assemblies 102. In the illustrated embodiment, four optical assemblies 102 are illustrated. In some embodiments, the headlight system 100 may include more or less than four optical assemblies 102. In some embodiments, each optical assembly 102 can include an illumination source 104 and an optical element 106. In some embodiments, the illumination source 104 can include any device capable of emitting visible electromagnetic radiation ("light"). For example, the illumination source can include a light emitting diode ("LED"), an incandescent light bulb, a fluorescent lamp, etc. In some embodiments the illumination source 104 can include various LED patterns. For example, the illumination source 104 can include any suitable array of single or multi-die LEDs. As a further example, the illumination source 104 can include a 2-die by 11 LED array, or a 5-die by 2 LED array. In some embodiments, the optical element 104 can include any device capable of directing, diverging, converging and/or manipulating light in any manner. For example, the optical element 104 can include reflectors, lenses, mirrors, polarizers, waveplates, beamsplitters, prisms, filters, etc. As a further example, the optical element 104 can include any optical components as listed above or including others known in the art, capable of directing light in a particular pattern or shape.

In some embodiments, each illumination source 102 can emit light, and the emitted light can be directed by the corresponding optical element 104. The light directed by the corresponding optical element 104 can create an individual illumination region. As shown in FIG. 1, each optical assembly 102 forms its own individual illumination region (e.g., a first illumination region 108, a second illumination region 110, a third illumination region 112, and a fourth illumination region 114). Each illumination region can create a particular illumination shape. For example, the shape can include a square, rectangle, trapezoid, triangle, any polygon, etc. In some embodiments, each illumination region can have a generally uniform and distinct illumination intensity. For example, an illumination region can be a square with a distinct quantitative irradiance value throughout the area of the square. In some embodiments, the distinct quantitative irradiance value of the illumination region can be proportional to the intensity of the corresponding illumination source 104 within its optical assembly 102.

In some embodiments, the illumination regions combine to form an illumination pattern 116. In some embodiments, the illumination regions are individually controllable within the illumination pattern 116 (i.e., controlling one region generally may not affect another region). However, in practice, the optical performance of the optical assemblies 102 is not theoretically-perfect, so some overlap may occur between adjacent illumination regions within the illumination pattern 116.

In some embodiments, the headlight system 100 can include a controller 118 in communication with the optical assemblies 102. Specifically, in some embodiments, the controller 118 can be in communication with the illumination sources 104. The headlight system 100 can also include an input 120 in communication with the controller 118. The input 120 can include a sensor (e.g., an accelerometer, a gyroscope, a handlebar positional sensor etc.), and/or a vehicle input already configured (e.g., a wheel encoder, a brake indicator, etc.) configured to measure changes it its environment. In some embodiments, the input 120 may be configured to detect a vehicle or object within the illumination pattern 116, for example, via a camera or another imaging device.

In some embodiments, the controller 118 can receive a signal from the input 120 and adjust the illumination intensity of one or more of the illumination sources 104. In this way, for example, an intensity or brightness of one or more illumination regions may be adjusted, based on a signal from the input 120. As an example, the input 120 can be an accelerometer that measures the bank or lean of a vehicle. When a vehicle leans, the controller 118 can sense changes in the orientation of the vehicle based on a signal from the accelerometer and adjust the illumination intensity of one or more of the illumination sources 104. In some embodiments, the controller 118 may control the illumination sources 104 via pulse width modulation (PWM).

Figure 2:
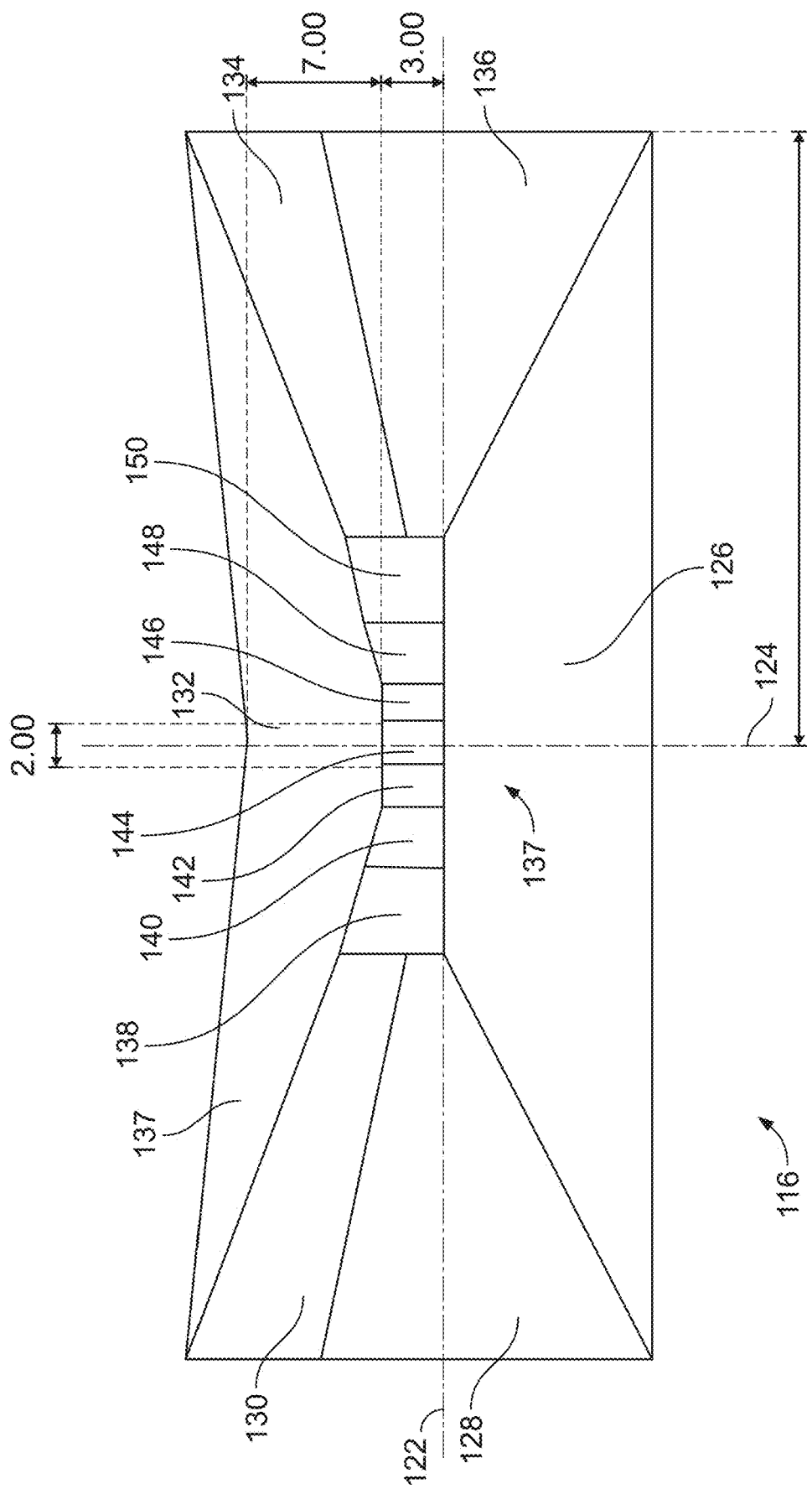
FIG. 2 is a schematic illustration of an illumination pattern, according to aspects of the present disclosure.
Figure 3:
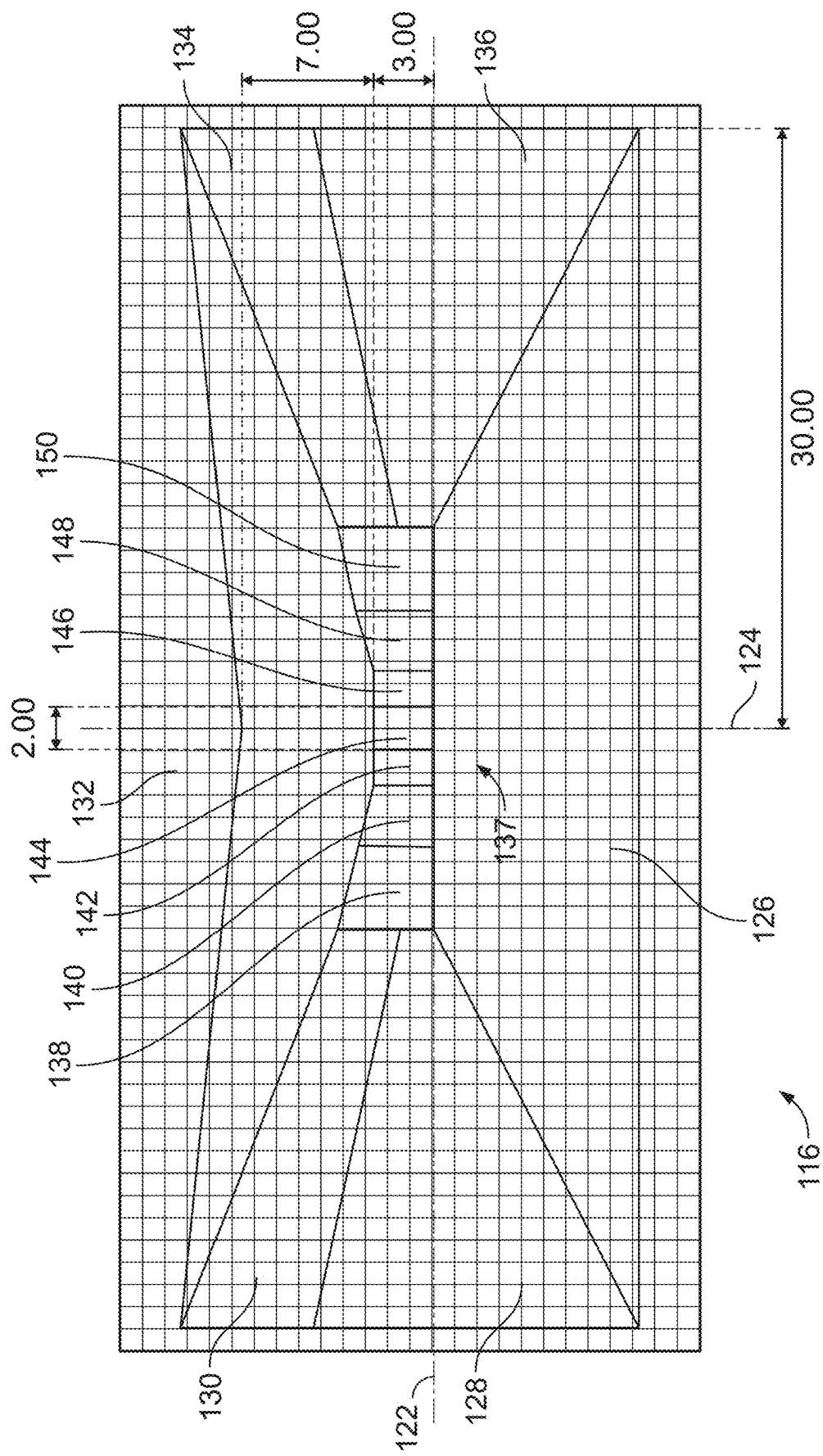
FIG. 3 is a graph illustrating the illumination pattern of FIG. 2 with respect to a vertical axis and a horizontal axis.

As shown in FIGS. 2 and 3, in some embodiments, the illumination pattern 116 can include a mesh of individual illumination regions. For example, as illustrated in FIGS. 2 and 3, illumination pattern 116 includes thirteen illumination regions each having its own controllable illumination output and corresponding illumination source 104. In some embodiments, the illumination pattern 116 may include more or less than thirteen illumination regions. The illumination pattern 116 can be arranged about an optical horizon 122 and an optical vertical axis 124. In the illustrated embodiment, the illumination pattern 116 can include a lower illumination region 126, a lower left illumination region 128, an upper-left illumination region 130, an upper illumination region 132, an upper-right illumination region 134, a lower right illumination region 136, and a center section 137. The center section 137 can include a left most center illumination region 138, a left center illumination region 140, three center illumination regions 142, 144, 146, a right illumination region 148, and a right most center illumination region 150. In some embodiments, the center section 137 can include more or less than three center illumination regions.

In the illustrated embodiment, the center section 137 can be positioned above the lower illumination region 126, and below the upper illumination region 132. In some embodiments, the center section 137 can be positioned right (from the perspective of FIGS. 2 and 3) of the lower left illumination region 126 and the upper-left illumination region 130. In some embodiments, the center section 137 can be positioned left (from the perspective of FIGS. 2 and 3) of the lower right illumination region 136 and the upper-right illumination region 134.

In the illustrated embodiment, the lower illumination region 126, the lower left illumination region 128, the upper-left illumination region 130, the upper-right illumination region 134, the lower right illumination region 136, the left most center illumination region 138, the left center illumination region 140, the right illumination region 148, and the right most center illumination region 150 may define a generally trapezoidal shape. In some embodiments, the lower illumination region 126, the lower left illumination region 128, the upper-left illumination region 130, the upper-right illumination region 134, the lower right illumination region 136, the left most center illumination region 138, the left center illumination region 140, the right illumination region 148, and/or the right most center illumination region 150 may define another shape, which may be designed to accommodate a specific vehicle or desired illumination pattern, for example, another polygon, triangular, pie-shaped, wedge-shaped, or rectangular. In the illustrated embodiment, the center illumination regions 142, 144, 146 can define a generally rectangular shape. In some embodiments, the center illumination regions 142, 144, 146 can define another shape, which may be designed to accommodate a specific vehicle or desired illumination pattern, for example, another polygon, triangular, pie-shaped, wedge-shaped, round, semi-circular, or circular.

In some embodiments, the illumination pattern may be symmetric about the optical vertical axis 146. For example, the left most center illumination region 138 and the right most center illumination region 150 can be symmetric about the optical vertical axis 124. The left center illumination region 140 and the right center illumination region 146 can be symmetric about the optical vertical axis 124. The central illumination region 142 and the central illumination region 146 can be symmetric about the optical vertical axis 124.

In the illustrated embodiment, the lower left illumination region 128 and the upper-left illumination region 130 may be symmetrical with the lower right illumination region 136 and the upper-right illumination region 134 about the optical vertical axis 124. Therefore, the following description of the lower left illumination region 128 and the upper-left illumination region 130 symmetrically applies to the lower right illumination region 136 and the upper-right illumination region 134. In the illustrated embodiment, the lower left illumination region 128 and the upper-left region 130 define laterally-elongated shapes, which extend from the center section 137 laterally outward (i.e., away from the optical vertical axis 124). The lower left illumination region 128 and the upper-left illumination region 130 are angled with respect to the optical horizon 122. That is, the laterally-extending borders, or edges, of the lower left illumination region 128 and the upper-left region 130 are angled with respect to the optical horizon 122. In other words, the laterally-extending borders, or edges, of the lower left illumination region 128 and the upper-left region 130 may, if extended, intercept the optical horizon 122 at a predefined angle. As will be described herein, the laterally-elongated shapes defined by the lower left illumination region 128 and the upper-left region 130 are advantageous for leaning vehicles.

FIG. 3 illustrates a quantitative view of the illumination pattern 116, where the boundaries of each illumination region are overlaid on a grid. The boundaries of each illumination region define edges, as discussed above, where the angles and relative length of the edges can be easily quantified based on their location on the grid. In the illustrated embodiment, the illumination pattern 116 may extend sixty degrees along the optical horizon 122 (i.e., thirty degrees in both directions from the optical vertical axis 124).

FIG. 4 illustrates another illumination pattern 152 according to the present disclosure that may be arranged about an optical vertical axis 124 and an optical horizon 122, and/or arranged about a road 151. An intersection of the optical vertical axis 124 and the optical horizon 122 can define an optical origin that may be centrally arranged within the illumination pattern 152. In some embodiments, the illumination pattern 152 can include a left-side illumination section 154, a right-side illumination pattern 156, a lower illumination region 160, and an upper illumination region 158. In some embodiments, the left-side illumination section 154 and the right-side illumination section 156 can be symmetrical and/or can be placed on opposite sides of the optical vertical axis 124. In some embodiments, the lower illumination region 160 can be positioned below the optical horizon 122.

In some embodiments, the upper illumination region 158 can be semi-circular. In some embodiments, the upper illumination region 158 can have a concentric portion (i.e., concentric edge) and/or include the optical origin. In some embodiments, the right-side illumination section 156 can include one or more right-side illumination regions 157. In some embodiments, the left-side illumination section 154 can include one or more left-side illumination regions 155. Each of the left-side illumination regions 155 can extend radially with respect to the optical origin. That is, the laterally-extending borders, or edges, of the left-side illumination regions 155 may extend radially with respect to the optical origin. In the illustrated embodiment, the left-side regions 155 can be in a fan-like arrangement. That is, the left-side illumination regions 155 may be circumferentially rotated or spaced with respect to one another, and so on. The left-side regions illumination 155 may be symmetric to the right-side illumination regions 157 about the optical vertical axis 124. Therefore, the foregoing description of the left-side regions illumination 155 symmetrically applies to the right-side regions illumination 157.

In some embodiments, when a vehicle turns, the illumination pattern 152 can also rotate. In some embodiments, as the vehicle rotates any of the illumination regions within the illumination pattern 152 can be decreased or increased in illumination intensity, and/or can be "turned off" (i.e. any illumination intensity within an illumination region is removed). In some embodiments, the degree and direction of rotation of the vehicle can also cause particular regions to increase or decrease in illumination intensity. For example, if the illumination pattern 152 rotates in a counterclockwise direction, with respect to FIG. 4, the left-side radial illumination regions 155 that are closest to the optical horizon 122 increase in illumination intensity before the remaining illumination regions within the left-side illumination section 154. Similarly, if the illumination pattern 152 rotates in a counterclockwise direction, with respect to FIG. 4, the right-side radial illumination regions 157 farthest from the optical horizon 122 decrease in illumination intensity before the remaining illumination regions within the first right-side illumination section 156. As another example, if the illumination pattern 152 rotates in a clockwise direction, with respect to FIG. 4, the left-side radial illumination regions 155 that are farthest from the optical horizon 122 decrease in illumination intensity before the remaining illumination regions within the first left-side illumination section 154. Similarly, if the illumination pattern 152 rotates in a clockwise direction, with respect to FIG. 4, the right-side radial illumination regions 157 closest to the optical horizon 122 increase in illumination intensity before the remaining illumination regions within the first right-side illumination section 156. The radially-extending shapes defined by the left-side illumination regions 155 and the right-side illumination regions 157 enable the sequential increasing and decreasing of circumferentially adjacent zones as a function of a lean or bank angle of a vehicle, which provides improved visibility for the driver and removes light directed toward oncoming vehicles or objects.

FIG. 5 illustrates another illumination pattern 162 according to the present disclosure that may be arranged about an optical vertical axis 124 and an optical horizon 122, and/or arranged about a road 151. An intersection of the optical vertical axis 124 and the optical horizon 122 can define an optical origin that may be centrally arranged within the illumination pattern 162. In some embodiments, the illumination pattern 162 may include a left-side illumination section 164, a right-side illumination section 166, a lower illumination region 170, an upper illumination region 168, and a central illumination section 171.

In some embodiments, the lower illumination region 170 can be positioned below the optical horizon 122. In some embodiments, the lower illumination region 170 can be positioned below the left-side illumination section 164, the right-side illumination section 166, the central illumination pattern 171, and/or the upper illumination region 168. In some embodiments, the upper illumination region 168 can be trapezoidal in shape. In some embodiments, the central illumination pattern 171 can include multiple illumination regions, where one illumination region includes the optical origin. In some embodiments, the multiple optical illumination regions within the central illumination pattern 171 can include a central trapezoidal illumination region positioned between two triangular illumination region.

In some embodiments, the left-side illumination section 164 and the right-side illumination section 166 can be symmetrical about the optical vertical axis 124. Therefore, the following description of the left-side illumination section 164 symmetrically applies to the right-side illumination section 166. In some embodiments, the left-side illumination section 164 can include one or more left-side illumination regions 165 In some embodiments, the right-side illumination section 166 can include one or more right-side illumination regions 167. Each of the left-side illumination regions 165 can extend radially with respect to the optical origin. That is, the laterally-extending borders, or edges, of the left-side illumination regions 165 may extend radially with respect to the optical origin. In the illustrated embodiment, the left-side regions 165 can be in a fan-like arrangement. That is, the left-side illumination regions 165 may be circumferentially rotated or spaced with respect to one another, and so on. In the illustrated embodiment, the left-side regions 165 may extend radially outward a greater distance than the lower illumination region 170.

The operation the left-side regions 155 and the right-side regions 157 during a vehicle turn, or bank, described above, similarly applies to the left-side regions 165 and the right-side regions 167 of the illumination pattern 162. As described above with respect to the illumination pattern 152, the radially-extending shapes defined by the side sections of an illumination pattern enables the headlight system 100 to provide improved visibility for a driver and removes light directed toward oncoming vehicles or objects. These advantages also apply to the radially-extending left-side regions 165 and the radially-extending right-side regions 167 of the illumination pattern 162.

FIG. 6 illustrates an illumination pattern 172 according to the present disclosure that may be arranged about an optical vertical axis 124 and an optical horizon 122, and/or arranged about a road 151. An intersection of the optical vertical axis 124 and the optical horizon 122 can define an optical origin that may be centrally arranged within the illumination pattern 172. In some embodiments, the illumination pattern 172 can include a left-side illumination section 174, a right-side illumination section 176, a lower illumination region 180, an upper illumination region 178, and a central illumination regions 181.

In some embodiments, the lower illumination region 180 can be positioned below the optical horizon 122. In some embodiments, the lower illumination region 180 can be positioned below the left-side illumination section 174, the right-side illumination section 176, and/or the upper illumination region 178. In some embodiments, the upper illumination region 178 can be wedge-shaped or pie-shaped. In some embodiments, each of the central illumination regions 181 can be wedge-shaped or pie-shaped and extend radially from from the optical origin.

In some embodiments, the right-side illumination section 176 can include one or more right-side illumination regions 177. In some embodiments, the left-side illumination section 174 can include one or more left-side illumination regions 175. Each of the left-side illumination regions 175 can extend radially with respect to the optical origin. That is, the laterally-extending borders, or edges, of the left-side illumination regions 175 may extend radially with respect to the optical origin. In the illustrated embodiment, the left-side regions 175 can be in a fan-like arrangement. That is, the left-side illumination regions 155 may be circumferentially rotated or spaced with respect to one another, and so on. In the illustrated embodiment, the left-side regions 175 extend in a fan-like arrangement above and below the optical horizon 122. The left-side regions illumination 175 may be symmetric to the right-side illumination regions 177 about the optical vertical axis 124. Therefore, the foregoing description of the left-side regions illumination 175 symmetrically applies to the right-side regions illumination 177.

The operation the left-side regions 155 and the right-side regions 157 during a vehicle turn, or bank, described above, similarly applies to the left-side regions 175 and the right-side regions 177 of the illumination pattern 172. As described above with respect to the illumination pattern 152, the radially-extending shapes defined by the side sections of an illumination pattern enables the headlight system 100 to provide improved visibility for a driver and removes light directed toward oncoming vehicles or objects. These advantages also apply to the radially-extending left-side regions 175 and the radially-extending right-side regions 177 of the illumination pattern 172.

FIG. 7 illustrates an illumination pattern 182 according to the present disclosure that may be arranged about an optical vertical axis 124 and an optical horizon 122, and/or arranged about a road 151. An intersection of the optical vertical axis 124 and the optical horizon 122 can define an optical origin that may be centrally arranged within the illumination pattern 182. In some embodiments, the illumination pattern 182 can include a left-side illumination section 184, a right-side illumination section 186, a lower illumination region 188, and one or more central regions 190.

In some embodiments, the lower illumination region 188 can be positioned below the optical horizon 122. In some embodiments, the ower illumination region 188 can be positioned below the left-side illumination section 184, the right-side illumination section 186, and the central illumination regions 190. In some embodiments, the central illumination regions 190 can define a square or rectangular shape. In some embodiments, the central illumination regions 190 can include the optical origin.

The operation the left-side regions 155 and the right-side regions 157 during a vehicle turn, or bank, described above, similarly applies to the left-side regions 185 and the right-side regions 187 of the illumination pattern 182. As described above with respect to the illumination pattern 152, the radially-extending shapes defined by the side sections of an illumination pattern enables the headlight system 100 to provide improved visibility for a driver and removes light directed toward oncoming vehicles or objects. These advantages also apply to the radially-extending left-side regions 185 and the radially-extending right-side regions 187 of the illumination pattern 182.

Figure 8A:
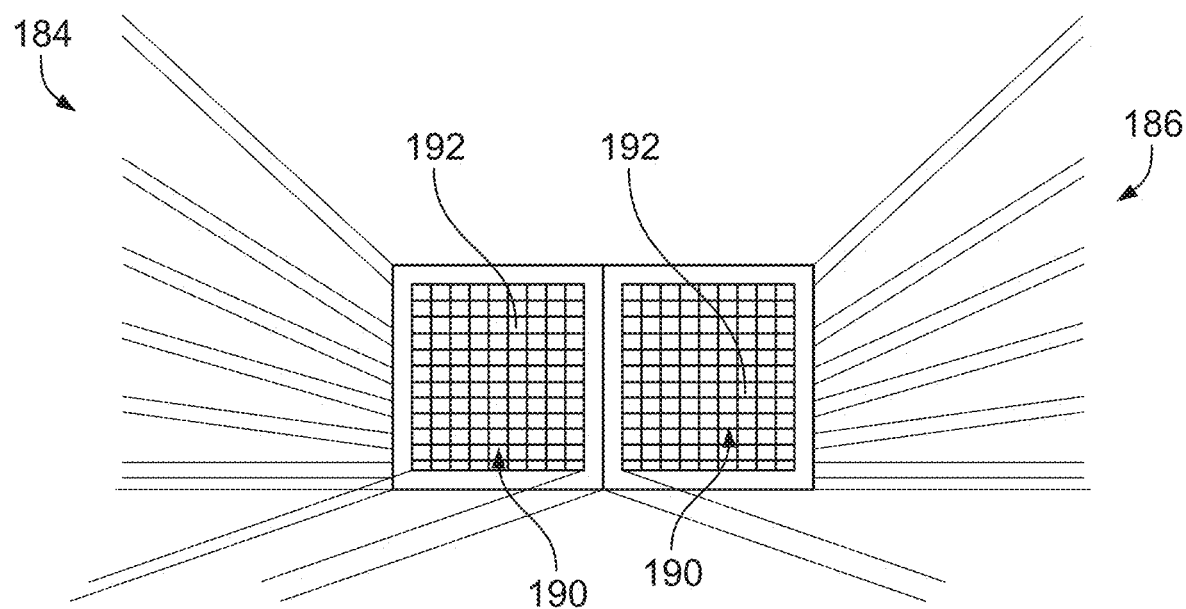
FIG. 8A is a schematic illustration of the central illumination regions and the side illumination regions within the illumination pattern of FIG. 7.
Figure 8B:
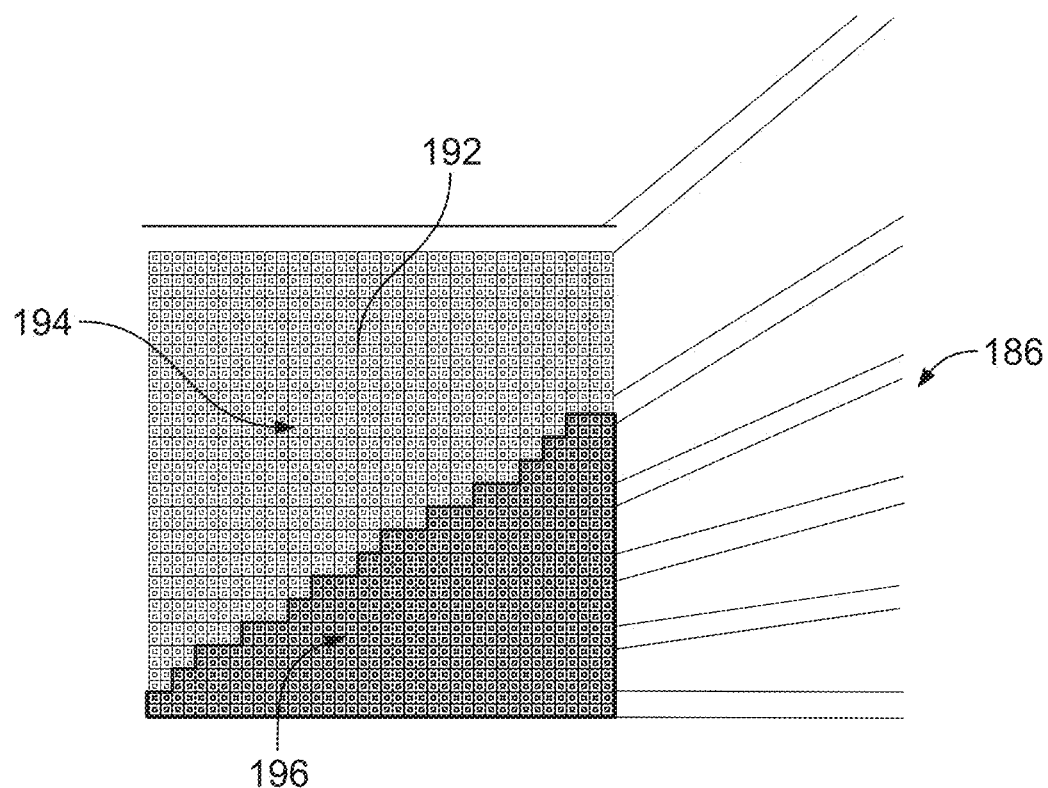
FIG. 8B is a schematic illustration of the illumination source of one of the central illumination regions.

FIG. 8 illustrates illumination sources 191 that produce the central illumination regions 190 of the illumination pattern 182. The illumination sources 191 that produce the fourth central illumination regions can be an LED array and/or LED matrixes 192. For example, each LED matrix 192 can comprise an n×m matrix of LEDs all in electrical communication with a controller (e.g., controller 118). In some embodiments, the controller can adjust the intensity of the LEDs within the matrix, which adjusts the illumination intensity of the corresponding one of the central illumination regions 190. For example, when the vehicle turns, as discussed above, each of the right-side radial illumination regions 187 can be adjusted in illumination intensity as a function of the vehicle's bank or lean direction and magnitude. Thus, in some instances, only certain right-side radial illumination regions 187 may be illuminated, while other right-side radial illumination regions 187 may be turned off, or substantially decreased in illumination intensity. The LED matrix 192 enables the controller to turn on certain LEDs so as to follow the pattern of the illuminated right-side radial illumination regions 187 (e.g., produce a triangular illumined region 196). For example, the controller can turn off a set of LEDs 194 and turn on the triangular illuminated region 196. This adjustment of the LED matrix can change the shape of the corresponding on of the central illumination regions 190, where the shape of the illumined LEDs within the matrix dictates the shape of the corresponding central illumination region 190. This can be desirable and enable the shape of the central illumination regions 190 to better conform to the illumination pattern to the side regions.

Figure 9:
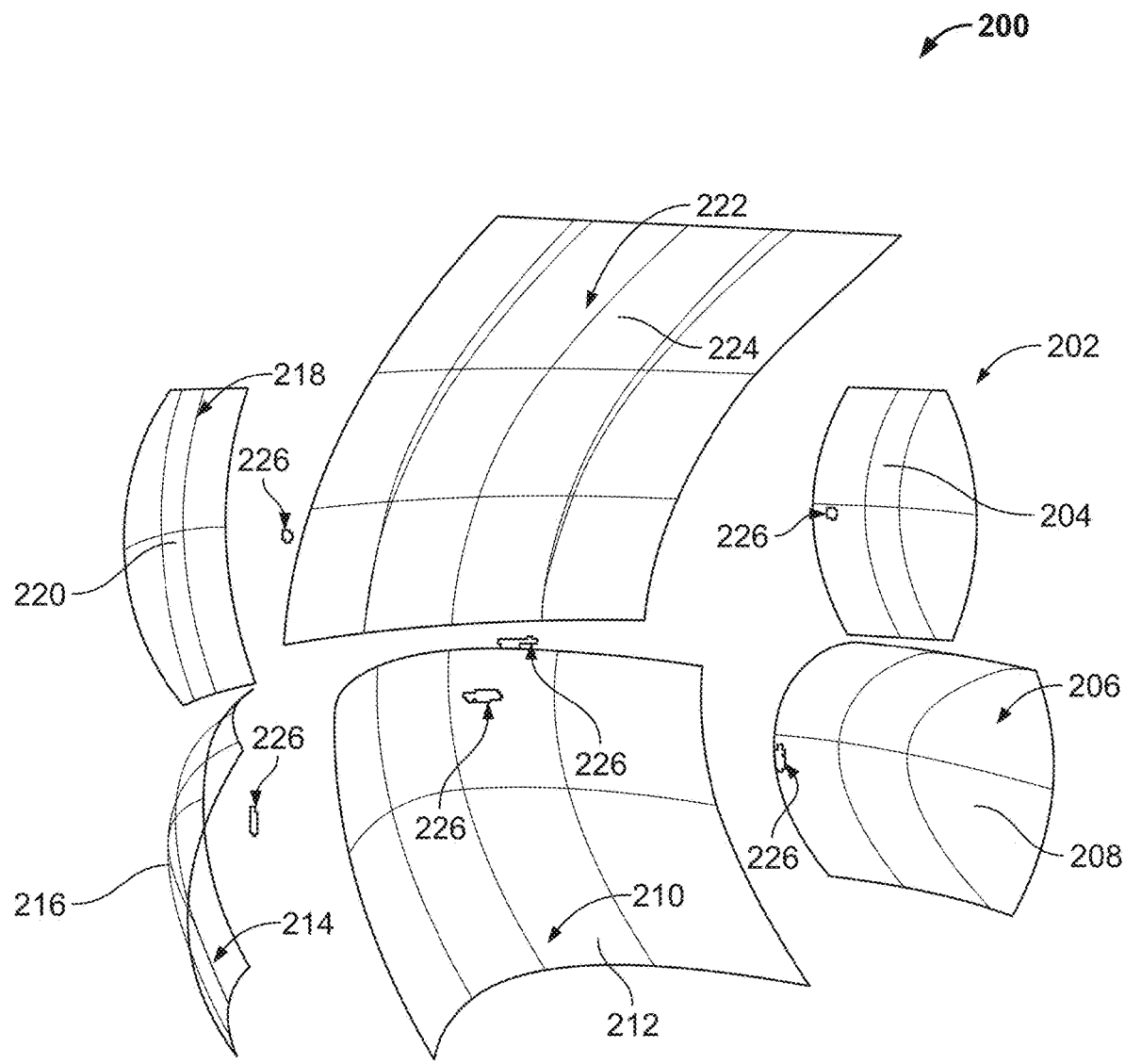
FIG. 9 is a perspective view of a headlight system including a plurality of reflectors, according to one aspect of the present disclosure.
Figure 10:
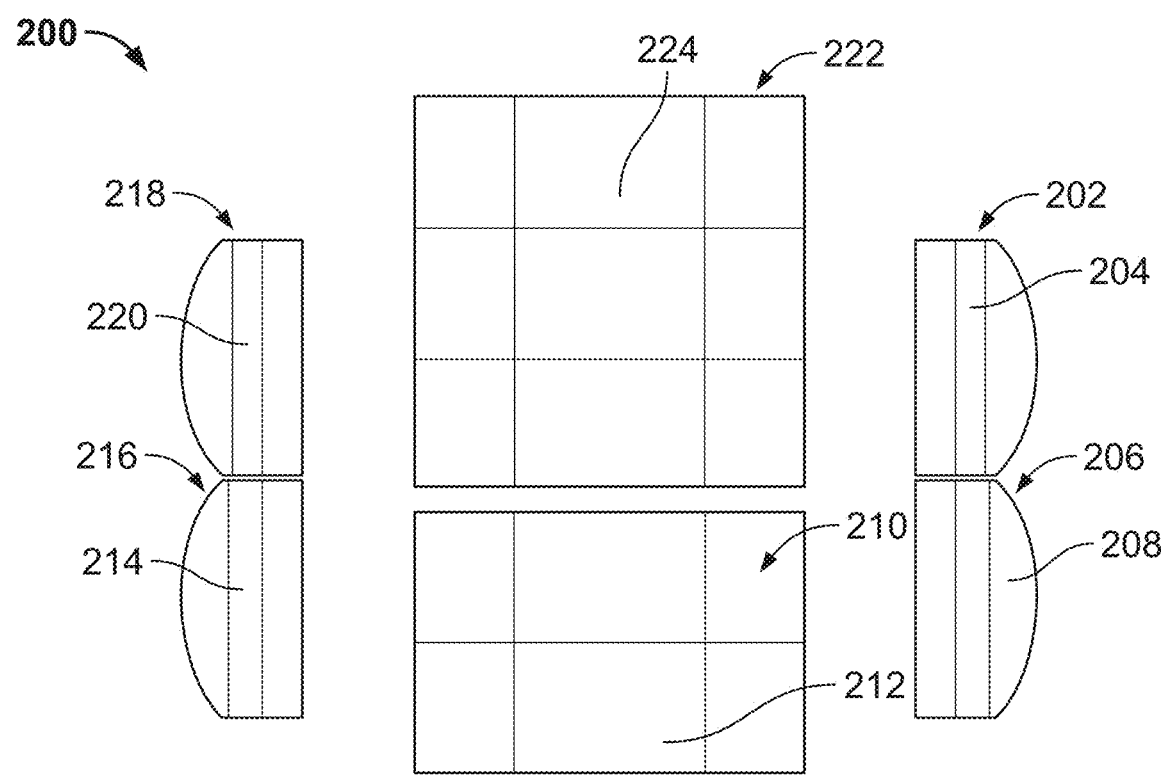
FIG. 10 is a front view of the headlight system of FIG. 9.

FIGS. 9 and 10 show multiple views of a headlight system 200, illustrating a particular embodiment of the headlight system 100. In some embodiments, the headlight system 200 can include an upper-right reflector 202, a lower right reflector 206, a lower central reflector 210, a lower left reflector 214, an upper-left reflector 218, and an upper central reflector 222. Each reflector 202, 206, 210, 214, 218, and 222 can have at least one reflector surface 204, 208, 212, 216, 220, and 222, respectively. In the illustrated embodiment, the reflector surfaces 204, 208, 212, 216, 220, and 222 may define a generally curved or arcuate shape to provide a predetermined shape in an illumination region.

Each reflector 202, 206, 210, 214, 218, and/or reflector surface 204, 208, 212, 216, 220, and 222, can have a corresponding illumination source 226 configured to direct light toward the respective reflector 202, 206, 210, 214, 218 and/or reflector surface 204, 208, 212, 216, 220, and 222. In some embodiments, each reflector surface (e.g., reflector surface 204) within its reflector (e.g., reflector 202) directs, or more specifically reflects, light from the corresponding illumination source 226 to produce an illumination region. In some embodiments, each reflector (e.g., reflector 202) can have more than one reflector surface (e.g., reflector surface 204), each reflector surface within the one or more reflector surfaces can direct, and more specifically reflect light, from the corresponding illumination source 226 within the reflector, to create multiple separate illumination regions based on each individual reflector surface. In some embodiments, the geometry of the reflector surface, the material of the reflector surface, the characteristics of the illumination sources 226, and/or the spatial relationship between the illumination source and the reflector surface can define a shape, size, and/or position of an illumination region. In some embodiments, each illumination source 226 can include a light emitting diode ("LED"), an incandescent light bulb, a fluorescent lamp, etc. In some embodiments the illumination sources 226 can include various LED patterns. For example, the illumination sources 226 can include any suitable array of single or multi-die LEDs. As another example, the illumination sources 226 can include a 1-die LED array, 2-die LED array, 3-die LED array, and/or 5-die LED array. As a further example, the illumination sources 226 can include a row of two, 3-die LEDs, a row of two, 5-die LEDs, and/or a row of two 1-die LEDs.

In some embodiments, each illumination source 226 can be in electrical communication with a controller (not shown), similar to the illumination sources 118 described herein. The controller can selectively adjust the illumination intensity of each illumination source 226, which an illumination intensity of the corresponding illumination region produced by the light reflected by the respective reflector. For example, by decreasing the illumination intensity of the illumination source 226 corresponding with the reflector surface 204, the illumination region produced only by the reflector surface 204 also decreases in illumination intensity, independently of the other illumination regions that also form an illumination pattern 228 (see. e.g., FIGS. 11 and 12). In some embodiments, the controller can also be in communication with an input (e.g., input 120). For example, the controller can receive a signal corresponding to a change in rotation, lean, or banking of a vehicle (e.g., the degree, speed, and/or direction of rotation). Based on the signal from the input, the controller can adjust one or more of the illumination sources 226 thereby adjusting the corresponding illumination region(s).

Figure 11:
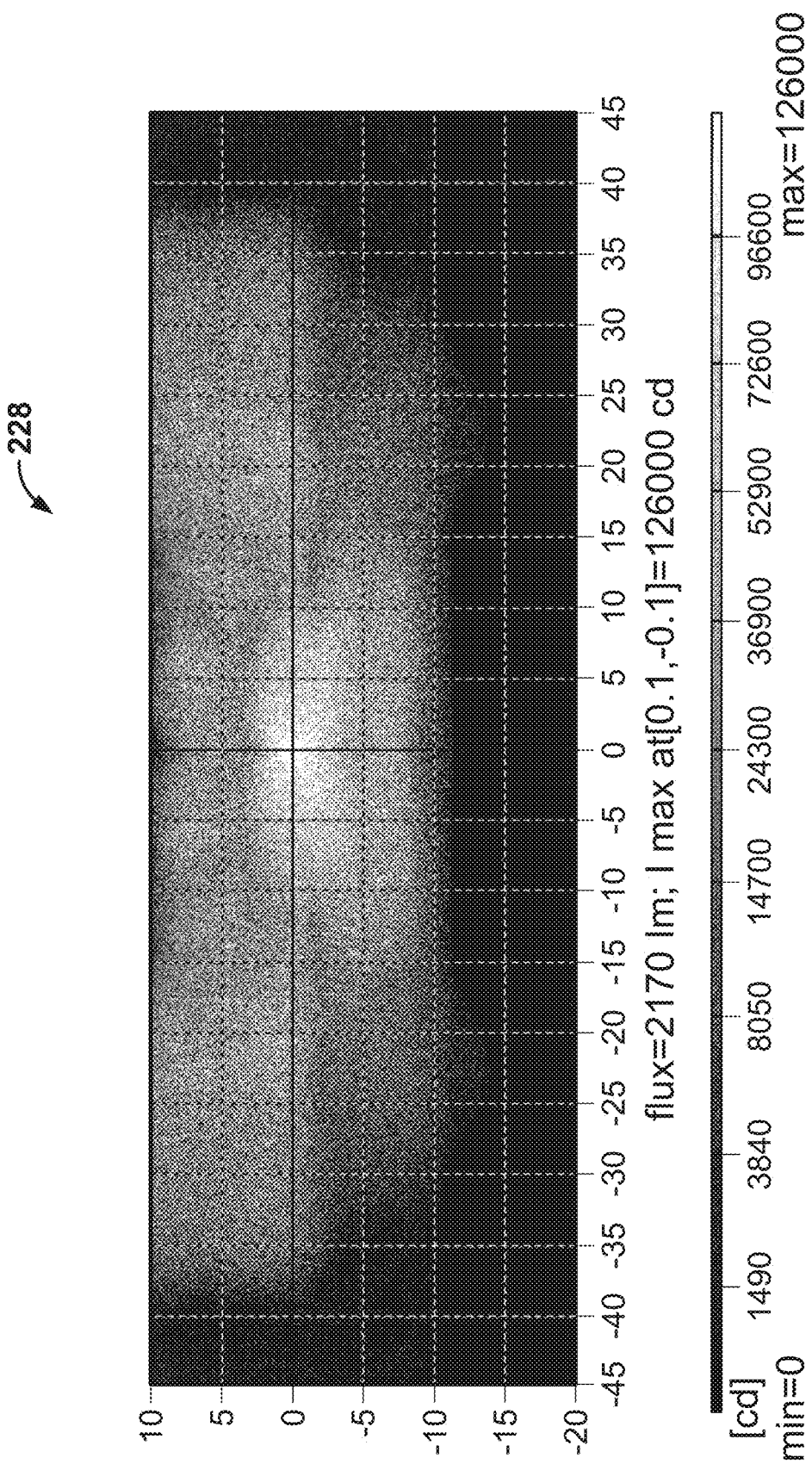
FIG. 11 is a graph illustrating an illumination pattern of the headlight system of FIG. 9.

FIG. 11 shows a graph of an illumination pattern 228 produced using the headlight system 200. The illumination pattern 228 can be formed of individual illumination regions, where each illumination region can be adjusted independently from other illumination regions. FIG. 11 specifically shows the illumination intensity of the illumination pattern 228, by capturing the luminous flux distribution represented on a candela distribution graph.

Figure 12:
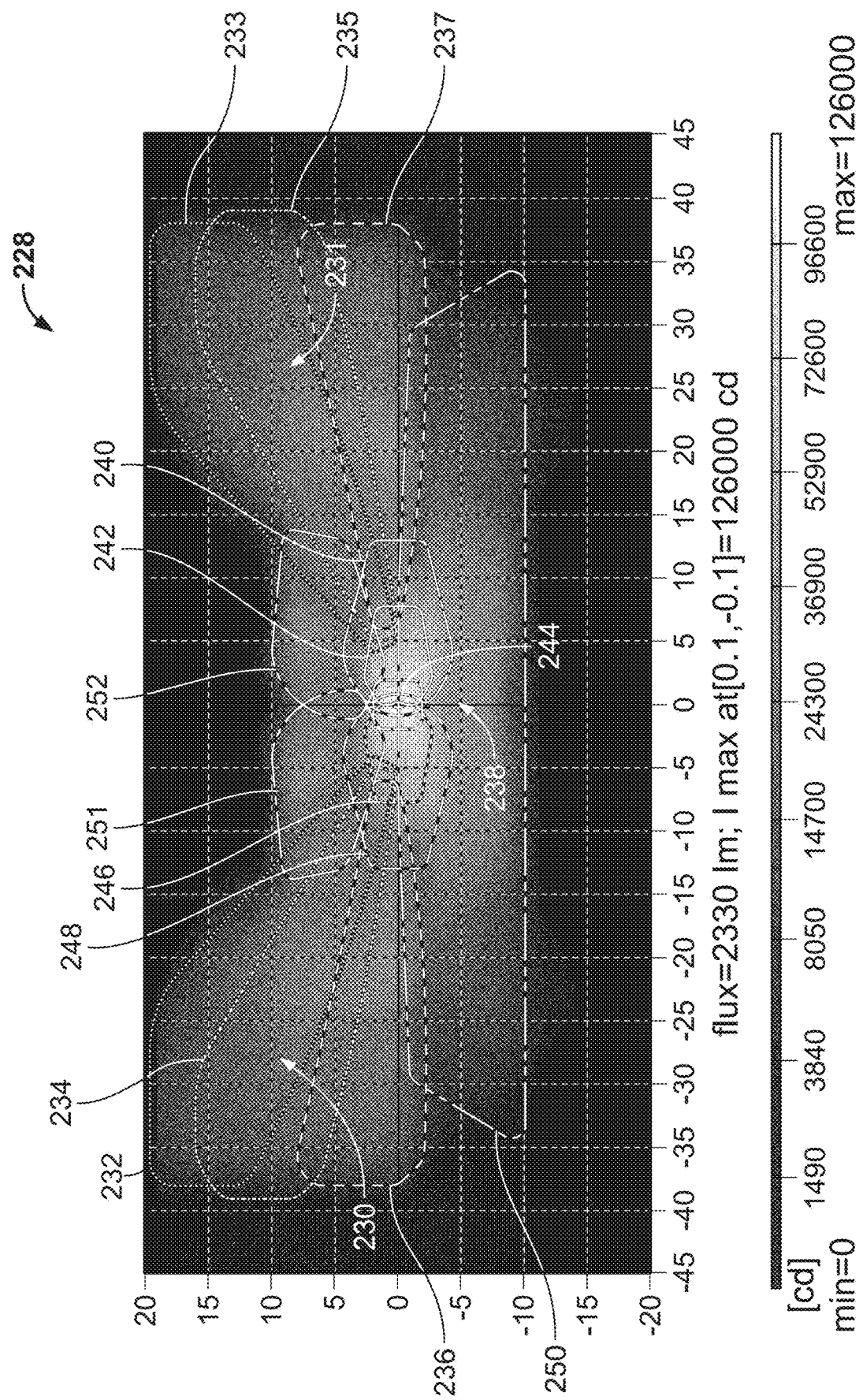
FIG. 12 is a graph illustrating illumination regions with the illumination pattern of FIG. 11.
Figure 13:
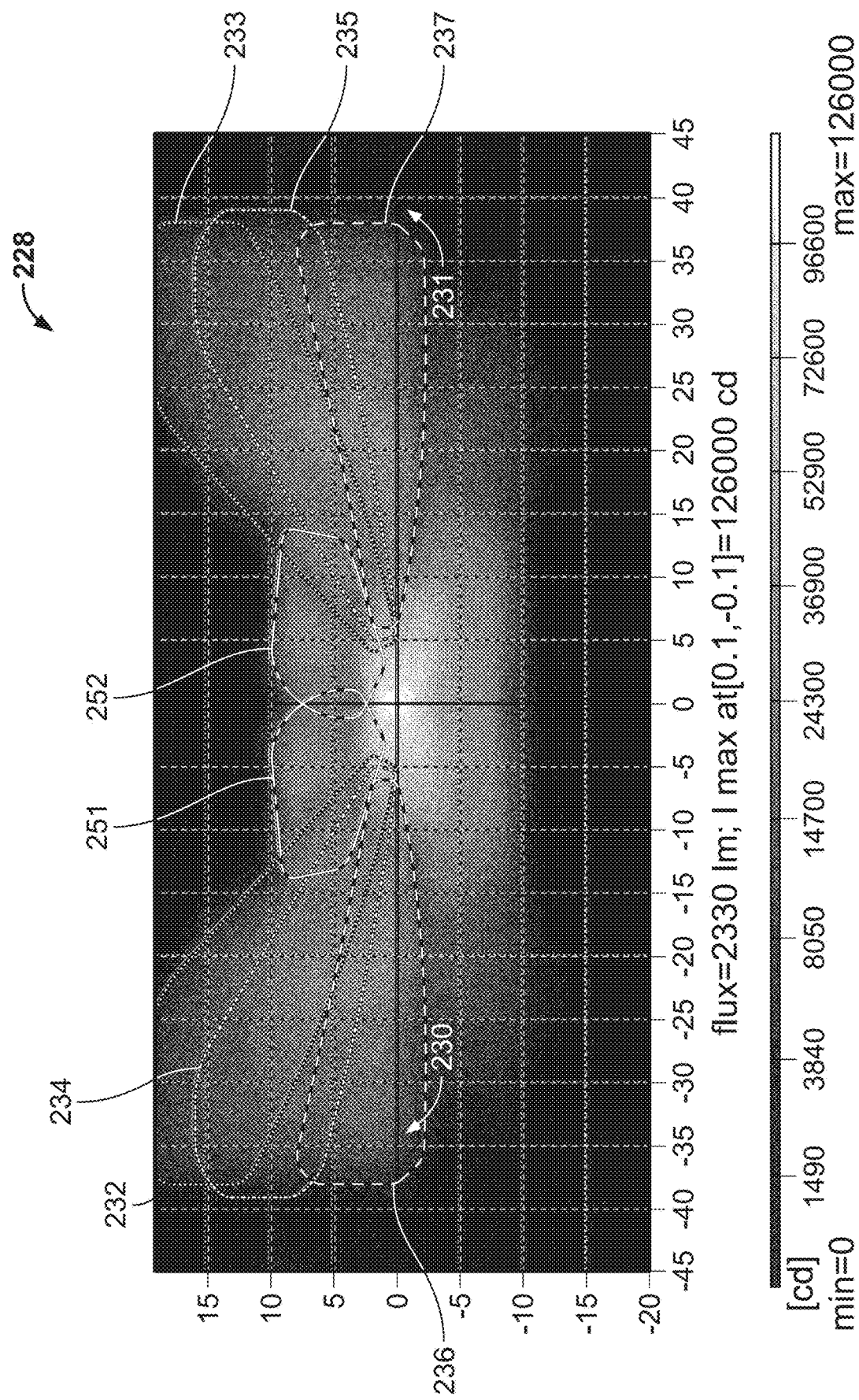
FIG. 13 is a graph illustrating selected upper and side illumination regions within the illumination pattern of FIG. 11.
Figure 14:
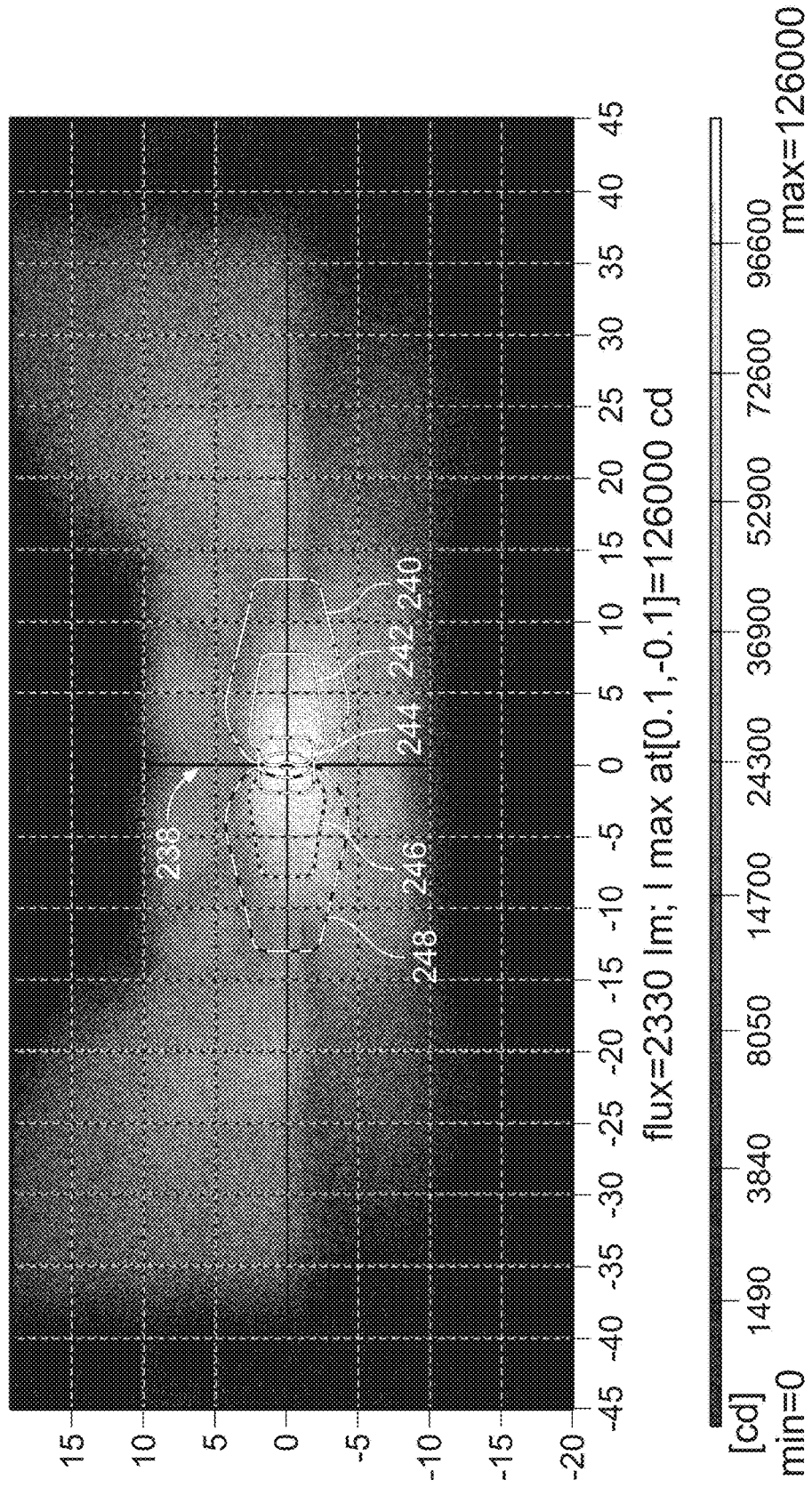
FIG. 14 is a graph illustrating selected center illumination regions within the illumination pattern of FIG. 11.

FIGS. 12-14 show outlines of the individual illumination regions that form the illumination pattern 228. For example, the illumination pattern 228 can include a lower illumination region 250, a left-side illumination section 230, a right-side illumination section 231, a central illumination section 238, an upper-left illumination region 251, and an upper-right illumination region 252. In some embodiments, the central illumination section 238 can be generally arranged centrally relative the left-side illumination section 230 and the right-side illumination section 231. In some embodiments, the central illumination section 238 can be positioned above the lower illumination region 250 and below the upper-left illumination region 251 and the upper-right illumination region 252.

In some embodiments, the left-side illumination section 230 can include a first left-side illumination region 232, a second left-side illumination region 234, and a third left-side illumination region 236. In some embodiments, the second left-side illumination region 234 can be positioned above the third left-side illumination region 236 and below the first left-side illumination region 232. In some embodiments, the right-side illumination section 231 can include a first right-side illumination region 233, a second right-side illumination region 235, and a third right-side illumination region 237. In some embodiments, the second right-side illumination region 235 can be positioned above the third right-side illumination region 237 and below the first right-side illumination region 233.

In the illustrated embodiment, the left-side illumination section 230 and the right-side illumination section 231 may be symmetrical about the vertical axis. Therefore, the following description of the left-side illumination section 230 symmetrically applies to the right-side illumination section 231. In the illustrated embodiment, the first left-side illumination region 232, the second left-side illumination region 234, and the third left-side illumination region 236 can define laterally-elongated shapes, which extend from the central illumination section 238 laterally outward (i.e., away from the vertical axis). Each of the first left-side illumination region 232, the second left-side illumination region 234, and the third left-side illumination region 236 is angled with respect to the horizontal axis. That is, the laterally-extending borders, or edges, of the first left-side illumination region 232, the second left-side illumination region 234, and the third left-side illumination region 236 are angled with respect to the horizontal axis. In addition, the first left-side illumination region 232, the second left-side illumination region 234, and the third left-side illumination region 236 each extend a greater angular distance laterally (i.e., in a general horizontal direction) than vertically. As will be described herein, the laterally-elongated shapes defined by the first left-side illumination region 232, the second left-side illumination region 234, and the third left-side illumination region 236 are advantageous for leaning vehicles.

In the illustrated embodiment, the central illumination section 238 can include a first center illumination region 240, a second center illumination region 242, a third central illumination region 244, a fourth central illumination region 246, and a fifth central illumination region 248. The third central illumination region 244 can be placed centrally with respect to the other regions within the central illumination section 238 (e.g., centered with respect to the origin in the illumination pattern 228). In some embodiments, the third central illumination region 244 can be positioned between the second central illumination region 242 and the fourth central illumination region 246. In some embodiments, the third central illumination region 244 can be positioned between the first central illumination region 240 and the fifth central illumination region 248. In some embodiments, the first central illumination region 240 can be symmetrical with the fifth central illumination region 248, and/or the second central illumination region 242 can be symmetrical with the fourth central illumination region 246.

As illustrated in FIGS. 12-14, some of the illumination regions may overlap with other adjacent illumination regions. For example, in practice, the optical performance of the optical components (e.g., reflector 202, reflector surface 204, and/or illumination sources 226) within the headlight system 200 may not be theoretically-perfect. Thus, some overlap between adjacent illumination regions (e.g., a first side illumination region 232 and a second side illumination region 234) may occur within the illumination pattern 228. That being said, the control of an illumination source 228 for a given illumination region within the illumination pattern 228 may control a substantial portion of the illuminous flux within that illumination region. For example, the control of an illumination source 228 for a given illumination region may control greater than 50% of the illuminous flux within the illumination region, greater than 60% of the illuminous flux within the illumination region, greater than 70% of the illuminous flux within the illumination region, greater than 80% of the illuminous flux within the illumination region, or greater than 90% of the illuminous flux within the illumination region. Thus, while some overlap may occur, the headlight system 200 is configured to output of generally discretized illumination regions via the use of a plurality of illumination sources 226 each configured to direct light toward a respective one of the reflectors 202, 206, 210, 214, 218. The use of illumination sources 226 (e.g., LED(s)) and reflectors 202, 206, 210, 214, 218 provides a low-cost solution to providing individually-controllable, generally discrete illumination regions within an illumination pattern, for example, compared to a projector-based solution.

As discussed above generally, each illumination region (e.g., the first side illumination region 232) can have an illumination intensity generally independent of other illumination regions. Each illumination region (e.g., the first side illumination region 232) can be created from a corresponding illumination source (e.g., illumination source 226) that emits light and a corresponding reflector (e.g., reflector 206) and/or a reflector surface (e.g., reflector surface 208) that reflects the emitted light creating each illumination region. Thus, different reflectors, reflector surfaces, and/or illumination sources within the headlight system 200 create each individual illumination region. As detailed above, each illumination source 226 that corresponds to a respective illumination region can be adjusted, as to increase or decrease the illumination of each illumination region accordingly. For example, when a vehicle on which the headlight system 200 is mounted rotates (i.e., banks or leans) in a first direction (e.g., rotates in a counterclockwise direction from the perspective of FIGS. 12-14) during a turn, a vehicle input senses the turn and inputs a signal to the controller that is proportional to the amount of banking or lean experience by the vehicle. In response to the input, the controller (e.g., controller 118) may increase the illumination intensities of the first left-side illumination region 232, the second left-side illumination region 234, and/or the third left-side illumination region 236 by increasing the illumination of the corresponding illumination sources 226 (e.g., increasing a duty cycle of a PWM signal applied to the illumination source 226 corresponding illumination regions). In addition, the controller may decrease the illumination intensities of the first right-side illumination region 231, the second right-side illumination region 233, and/or the third right-side illumination region 235.

As a further example, the controller can increase the intensities of the side illumination regions that are positioned closer to the horizontal axis first, compared to the side regions positioned farther away from the horizontal axis. For example, as the vehicle first begins to turn, or as a function of the vehicle's lean/bank angle of rotation in a counter-clockwise direction (from the perspective of FIGS. 12-14), the controller may increase the illumination intensity of the third left-side illumination region 236, before increasing the intensity of the second left-side illumination region 234 and/or the first left-side illumination region 232. Similarly, and substantially simultaneously, as the vehicle begins to turn in a counterclockwise direction, the controller can decrease the illumination intensity of the first right-side illumination region 233 before decreasing the illumination intensity of the second right-side illumination region 235 and/or the first right-side illumination region 233. These controlled variations in the selected illumination regions and the laterally-extending shapes of the illumination regions within the left-side illumination section 230 and the right-side illumination section 231 can advantageously allow the illumination regions that contour the road to be further illuminated in a sequential manner during a turn. In addition, the illumination regions that deviate from the road (e.g., toward an oncoming vehicle or object, or away from the road on which the vehicle is traveling) may be substantially simultaneously decreased in illumination. In some embodiments, the illumination adjustment of specific regions can be reversed and/or opposite as discussed with regard to counterclockwise rotation. For example, when the vehicle and illumination pattern 228 rotates in a clockwise direction, the third right-side illumination region 237 may initially increase in illumination intensity, while the first side illumination region 232 may initially decrease in illumination intensity.

Figure 15:
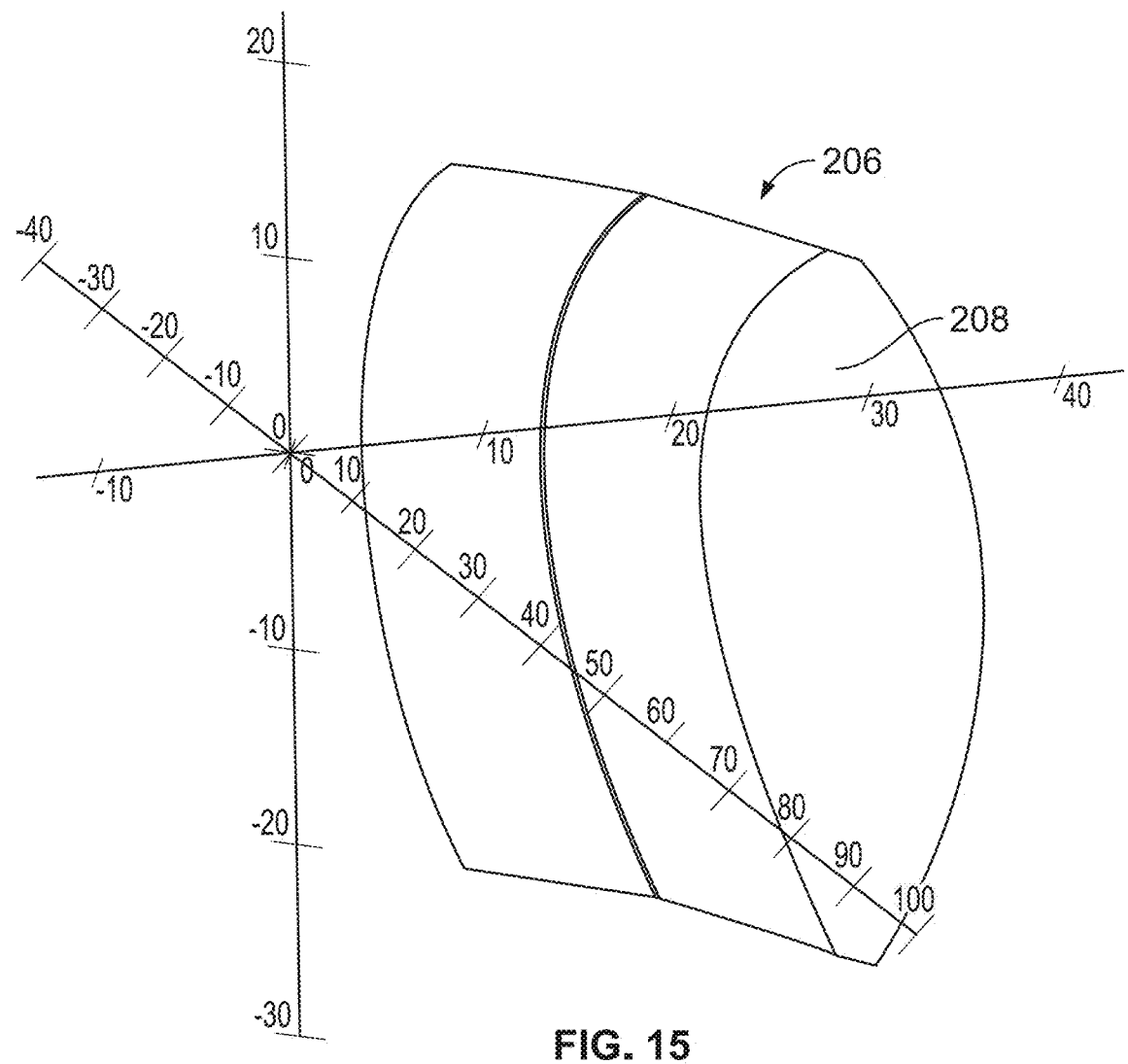
FIG. 15 is a perspective view of a reflector within the headlight system of FIG. 9.

FIG. 15 illustrates a spatial view of the lower right reflector 206. In some embodiments, the lower right reflector 206 and the lower left reflector 216 can be symmetrical. In some embodiments, the lower right reflector 206 can include the reflector surface 208. In some embodiments, the reflector surface 208 may include one or more reflector panels that comprise the reflector surface 208. The reflector surface 208 can include specific geometric, material properties (e.g., curvatures), and can include a corresponding one of the illumination sources 226 positioned to direct light toward the reflector surface 208. The light reflected from the reflector surface 208 may produce a corresponding illumination region.

Figure 16A:
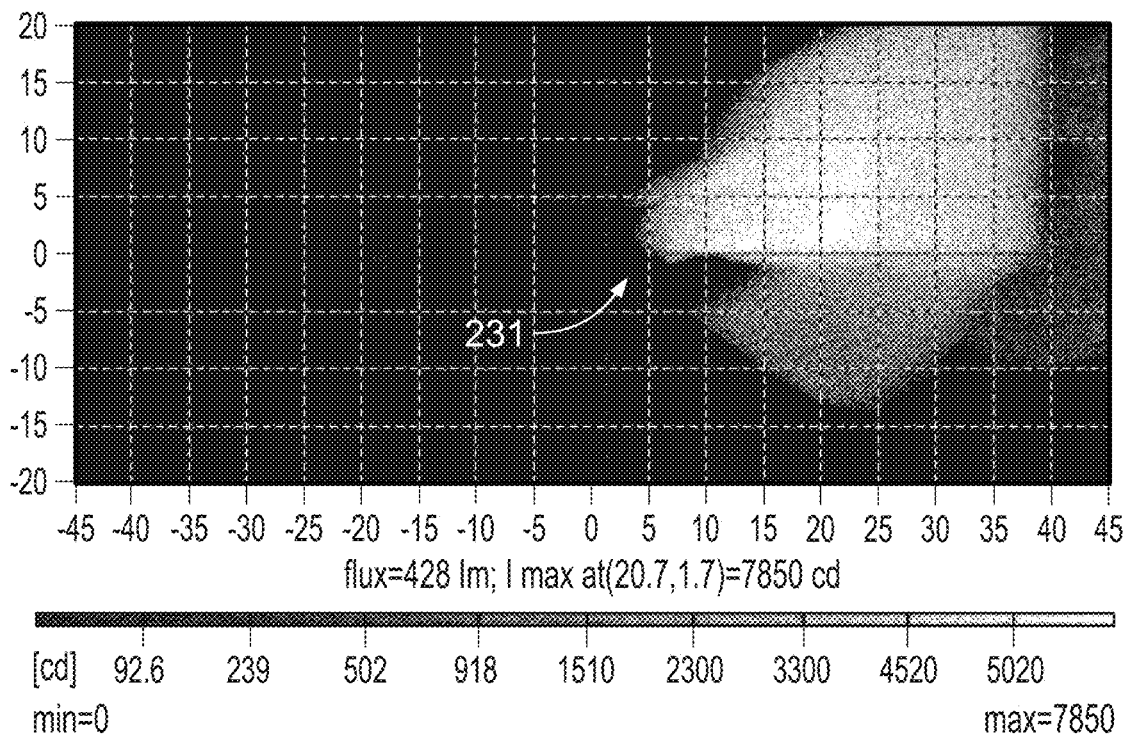
FIG. 16A is a graph illustrating a right-side illumination pattern of the illumination pattern of FIG. 11.
Figure 16B:
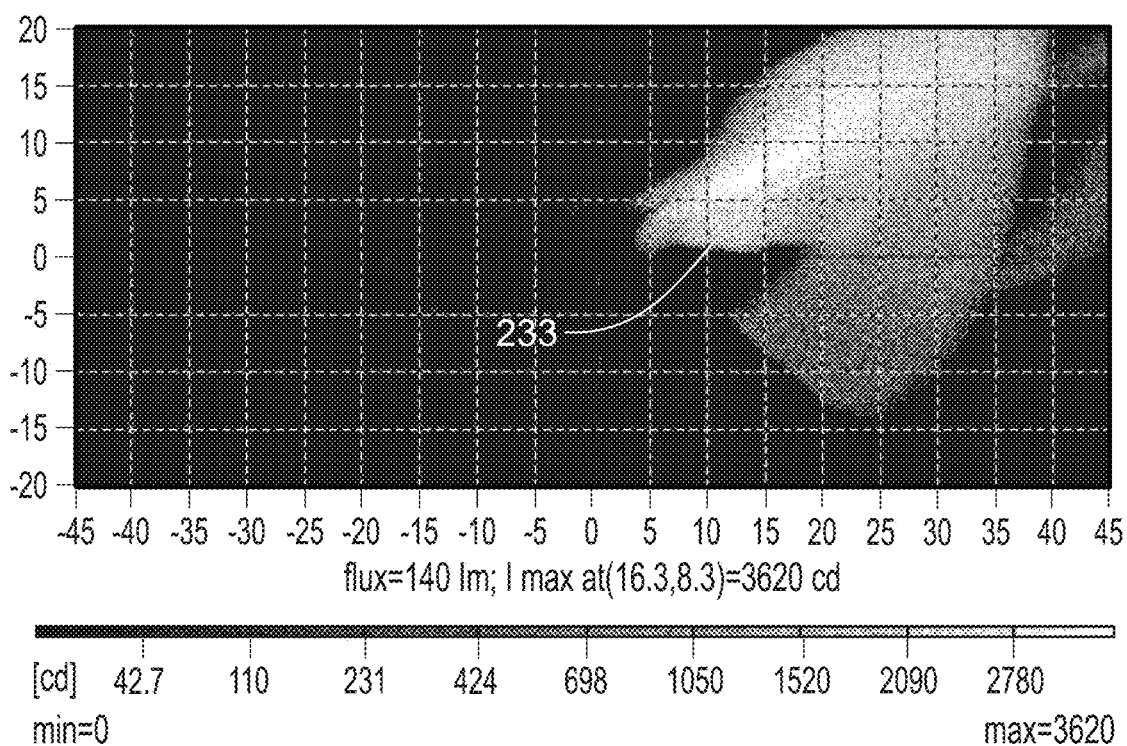
FIG. 16B is a graph illustrating a first right-side region of the illumination pattern of FIG. 16A.
Figure 16C:
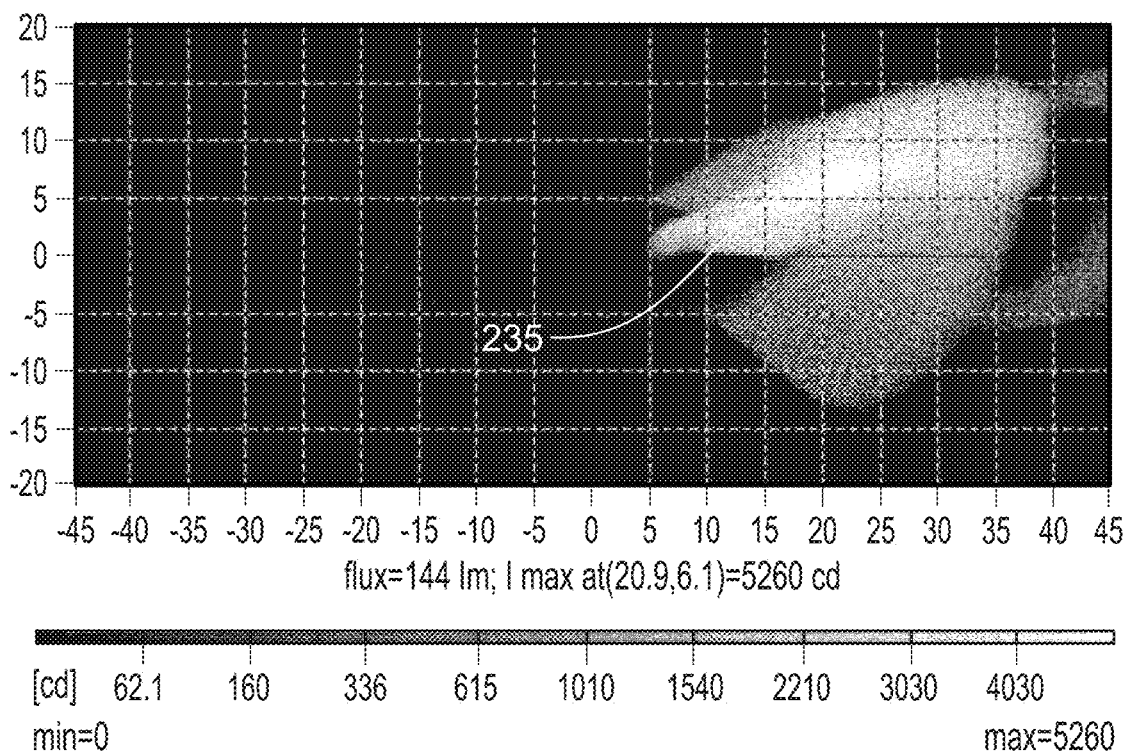
FIG. 16C is a graph illustrating a second right-side region of the illumination pattern of FIG. 16A.
Figure 16D:
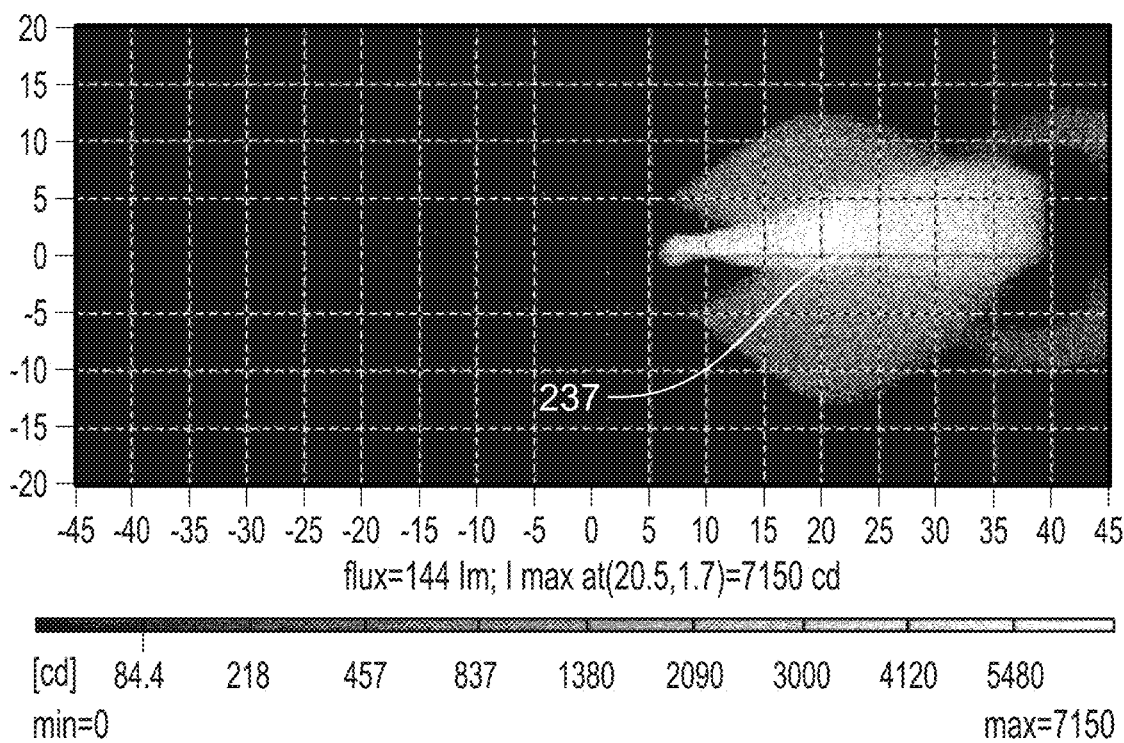
FIG. 16D is a graph illustrating a third right-side region of the illumination pattern of FIG. 16A.

FIGS. 16A-16D illustrate candela distribution graphs for the right-side reflector illumination section 231, and each of the illumination regions within the right-side reflector illumination section 231. FIG. 16A illustrates a candela distribution of the right-side reflector illumination section 231 with each of the first right-side illumination region 233, the second right-side illumination region 235, and the third left-side illumination region 237 illuminated to a full intensity. In some embodiments, light reflected off of the lower right reflector 206 produces the right side reflector illumination section 231. In some embodiments, the lower right reflector 206 includes three light sources within the illumination source 226 corresponding thereto, each light source corresponding to one of the first left-right illumination region 233, the second right-side illumination region 235, and the third right-side illumination region 237. It should be appreciated that the illumination source 226 that corresponds with the lower right reflector 206 may include three individual light sources or three individual groups of light sources that correspond with one of the first left-side illumination region 232, the second left-side illumination region 234, and the third left-side illumination region 236. FIG. 16B illustrates a candela distribution graph of the first right-side illumination region 233, FIG. 16C illustrates a candela distribution graph of the second right-side illumination region 235, and FIG. 16D illustrates a candela distribution graph of the third right-side illumination region 237.

In some embodiments, the lower left reflector 214 produces the left-side illumination section 230. In some embodiments, the lower left reflector 214 includes three illumination sources 226 each corresponding to one of the first left-side illumination region 232, the second left-side illumination region 234, and the third left-side illumination region 236. It should be appreciated that the illumination source 226 that corresponds with the lower right reflector 206 may include three individual light sources or three individual groups of light sources that correspond with one of the first right-side illumination region 233, the second right-side illumination region 235, and the third right-side illumination region 237.

Figure 17:
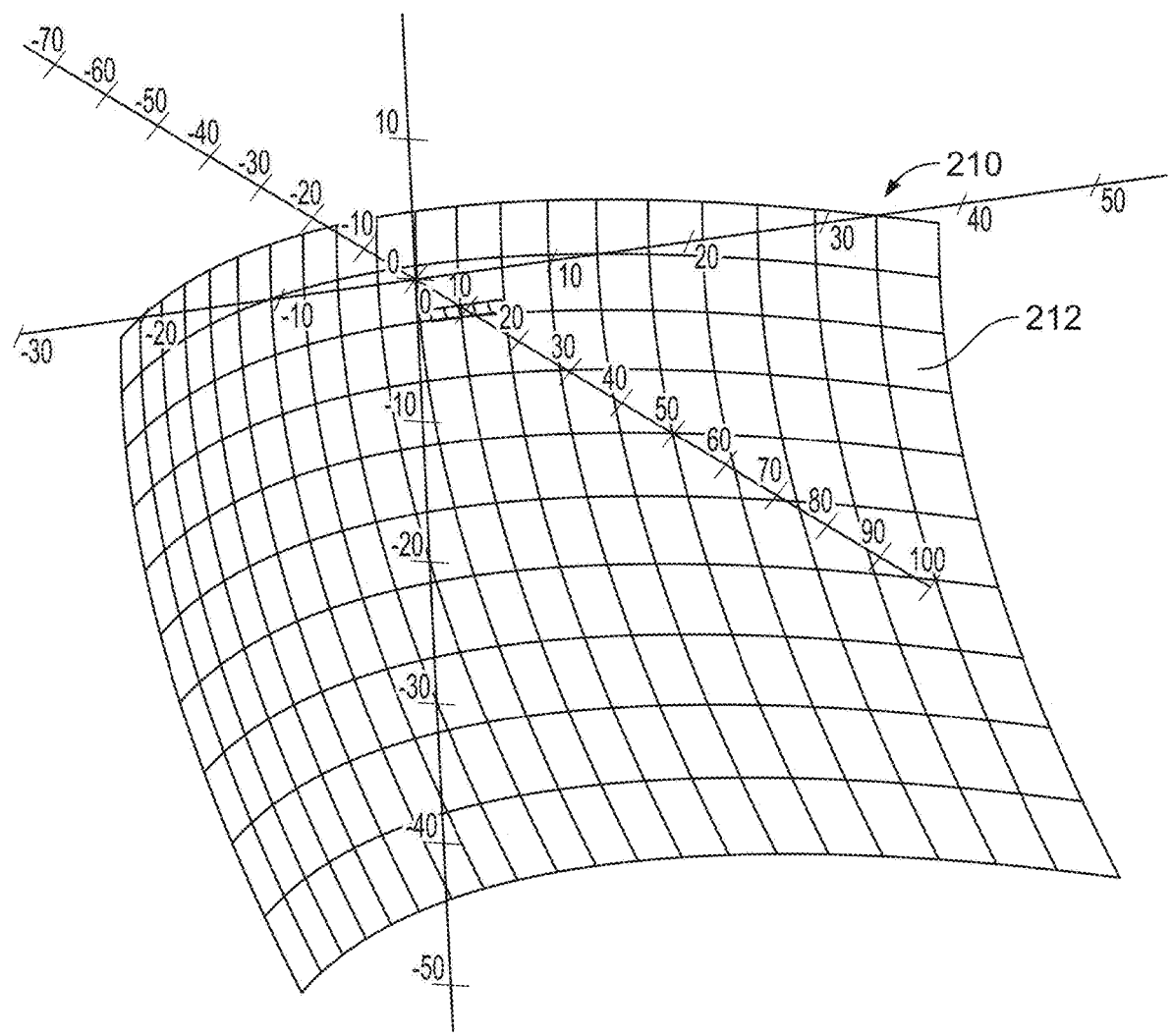
FIG. 17 is a perspective view of another reflector within the headlight system of FIG. 9.

FIG. 17 illustrates a spatial view of the lower central reflector 210. In some embodiments, the lower central reflector 210 can include the reflector surface 212. In some embodiments, the reflector surface 212 may include one or more reflector panels that comprise the reflector surface 208. The reflector surface 212 can include specific geometric, material properties (e.g., curvatures), and can include a corresponding one of the illumination sources 226 positioned to direct light toward the reflector surface 212. The light reflected from the reflector surface 212 may produce a corresponding illumination region.

Figure 18A:
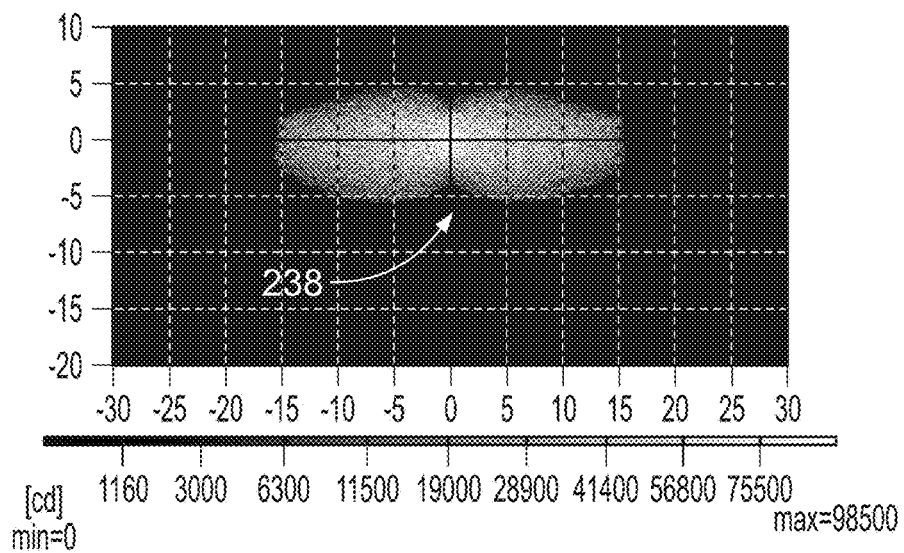
FIG. 18A is a graph illustrating a central illumination pattern of the illumination pattern of FIG. 11.
Figure 18B:
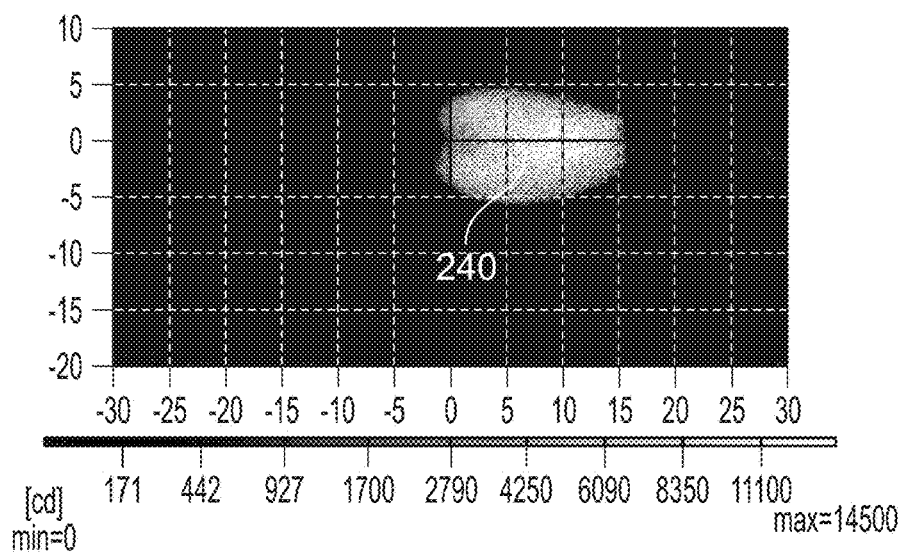
FIG. 18B is a graph illustrating a first right-side central region of the illumination pattern of FIG. 18A.
Figure 18C:
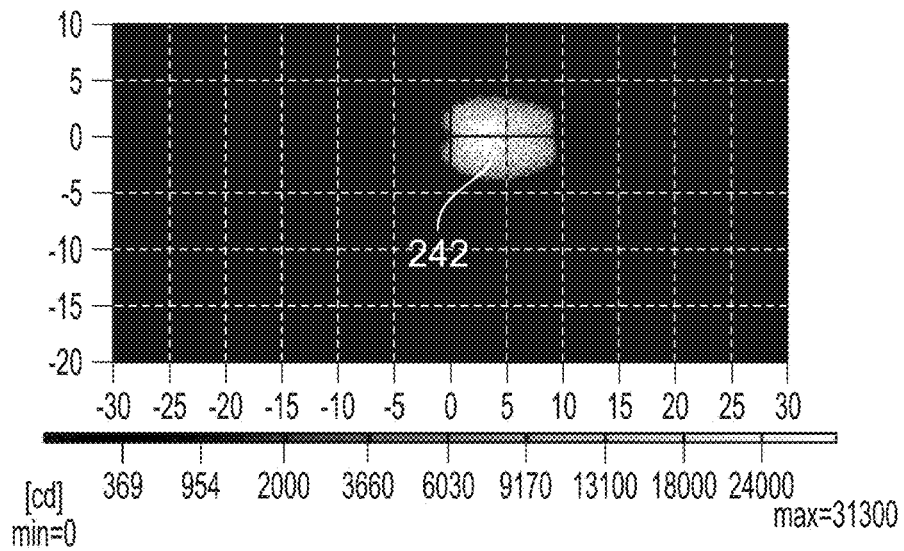
FIG. 18C is a graph illustrating a second right-side central region of the illumination pattern of FIG. 18A.
Figure 18D:
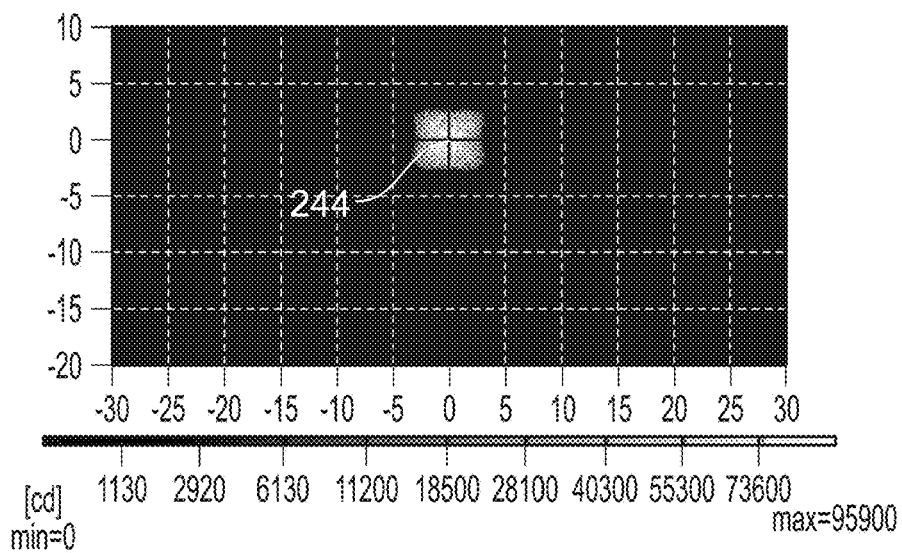
FIG. 18D is a graph illustrating a central region of the illumination pattern of FIG. 18A.
Figure 18E:
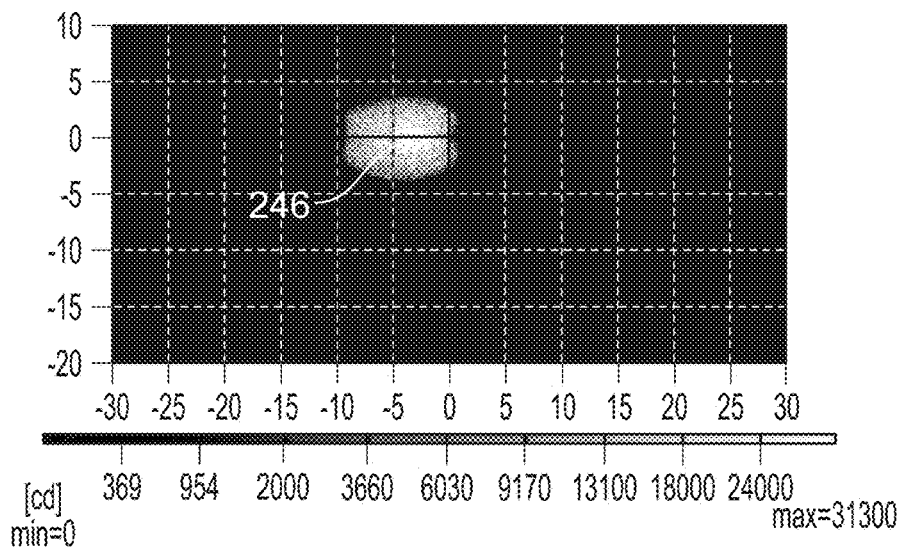
FIG. 18E is a graph illustrating a first left-side central region of the illumination pattern of FIG. 18A.
Figure 18F:
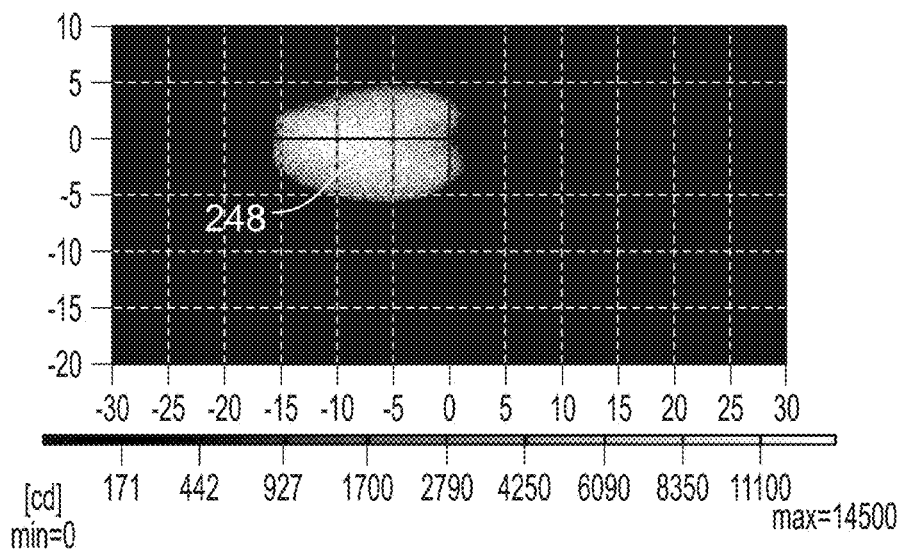
FIG. 18F is a graph illustrating a second left-side central region of the illumination pattern of FIG. 18A.

FIGS. 18A-18F illustrate candela distribution graphs for the central illumination section 238, and each of the illumination regions within the central illumination section 238. FIG. 18A illustrates a candela distribution graph of the central illumination section 238. In some embodiments, the lower central reflector 210 produces the central illumination section 238. In some embodiments, the lower central reflector 210 includes five illumination sources 226 each corresponding to five reflector surfaces of the one or more reflector surfaces 212. In some embodiments, the lower central reflector 210 includes five light sources within the illumination sources 226 corresponding thereto, each light source corresponding to one of the first center illumination region 240, the second center illumination region 242, the third central illumination region 244, the fourth central illumination region 246, and the fifth central illumination region 248. It should be appreciated that the illumination source 226 that corresponds with the lower central reflector 210 may include five individual light sources or five individual groups of light sources that correspond with one of the first center illumination region 240, the second center illumination region 242, the third central illumination region 244, the fourth central illumination region 246, and the fifth central illumination region 248. FIG. 18B illustrates a candela distribution graph of the first center illumination region 240, FIG. 18C illustrates a candela distribution graph of the second center illumination region 242, FIG. 18D illustrates a candela distribution graph of the third central illumination region 244, FIG. 18E illustrates a candela distribution graph of the fourth central illumination region 246, and FIG. 18F illustrates a candela distribution graph of the fifth central illumination region 248.

Figure 19:
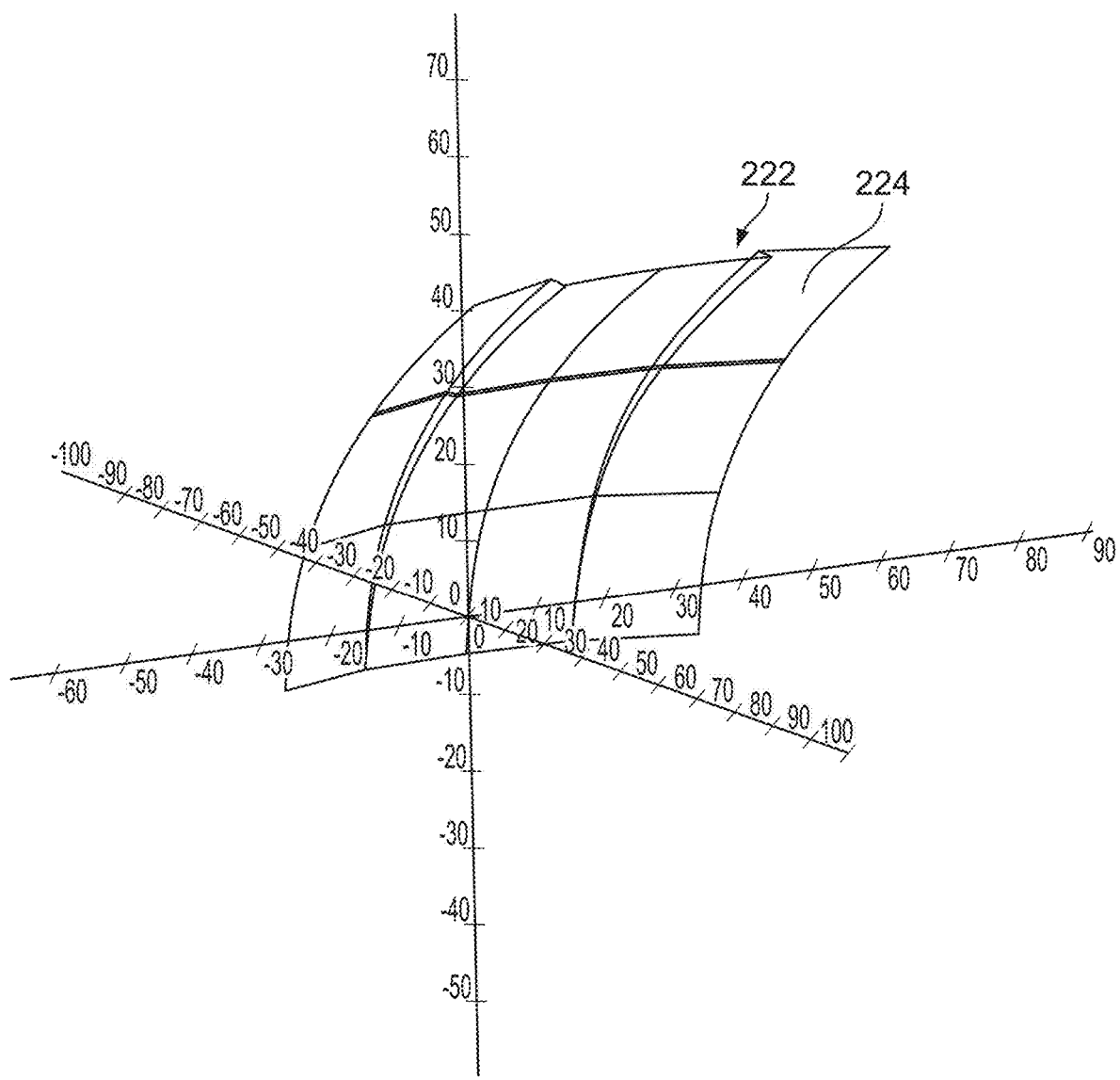
FIG. 19 is a perspective view of another reflector within the headlight system of FIG. 9.

FIG. 19 illustrates a spatial view of the upper central reflector 222. In some embodiments, the upper central reflector 222 can include the reflector surface 224. In some embodiments, the reflector surface 224 can include one or more reflector panels that comprise the reflector surface 224. The reflector surface 224 can include specific geometric, material properties (e.g., curvatures), and can include a corresponding one of the illumination sources 226 positioned to direct light toward the reflector surface 224. The light reflected from the reflector surface 224 may produce a corresponding illumination region.

Figure 20:
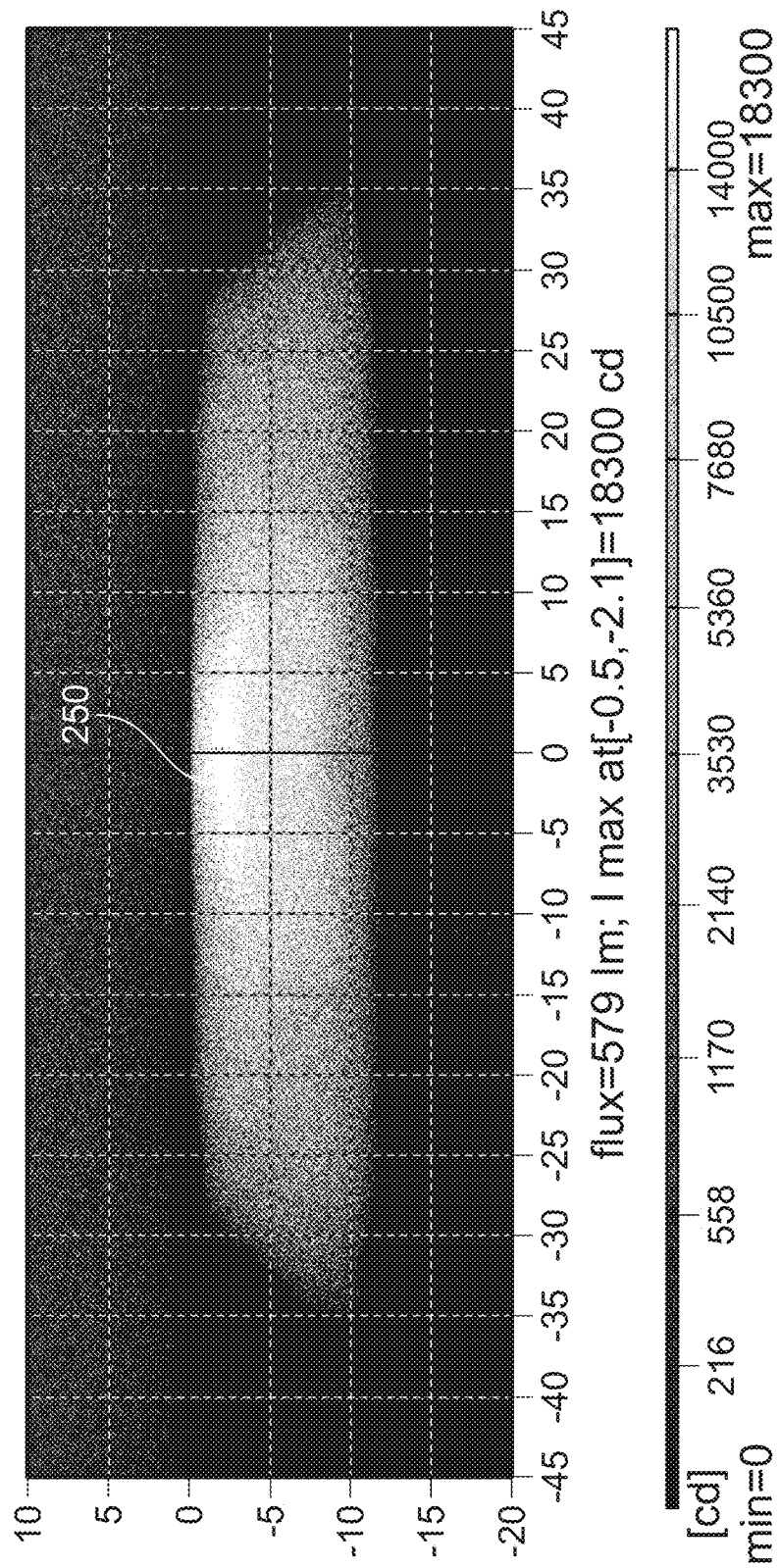
FIG. 20 is a graph illustrating a lower region of the illumination pattern of FIG. 11.

FIG. 20 illustrates a candela distribution graph for the lower illumination region 250. In some embodiments, the upper central reflector 222 produces the lower illumination region 250. In some embodiments, the upper central reflector 222 includes a corresponding illumination source 226 that produces the lower illumination region 250. It should be appreciated that the illumination source 226 that corresponds with the upper central reflector 222 may include an individual light source or an individual groups of light sources that correspond with the lower illumination region 250.

Figure 21:
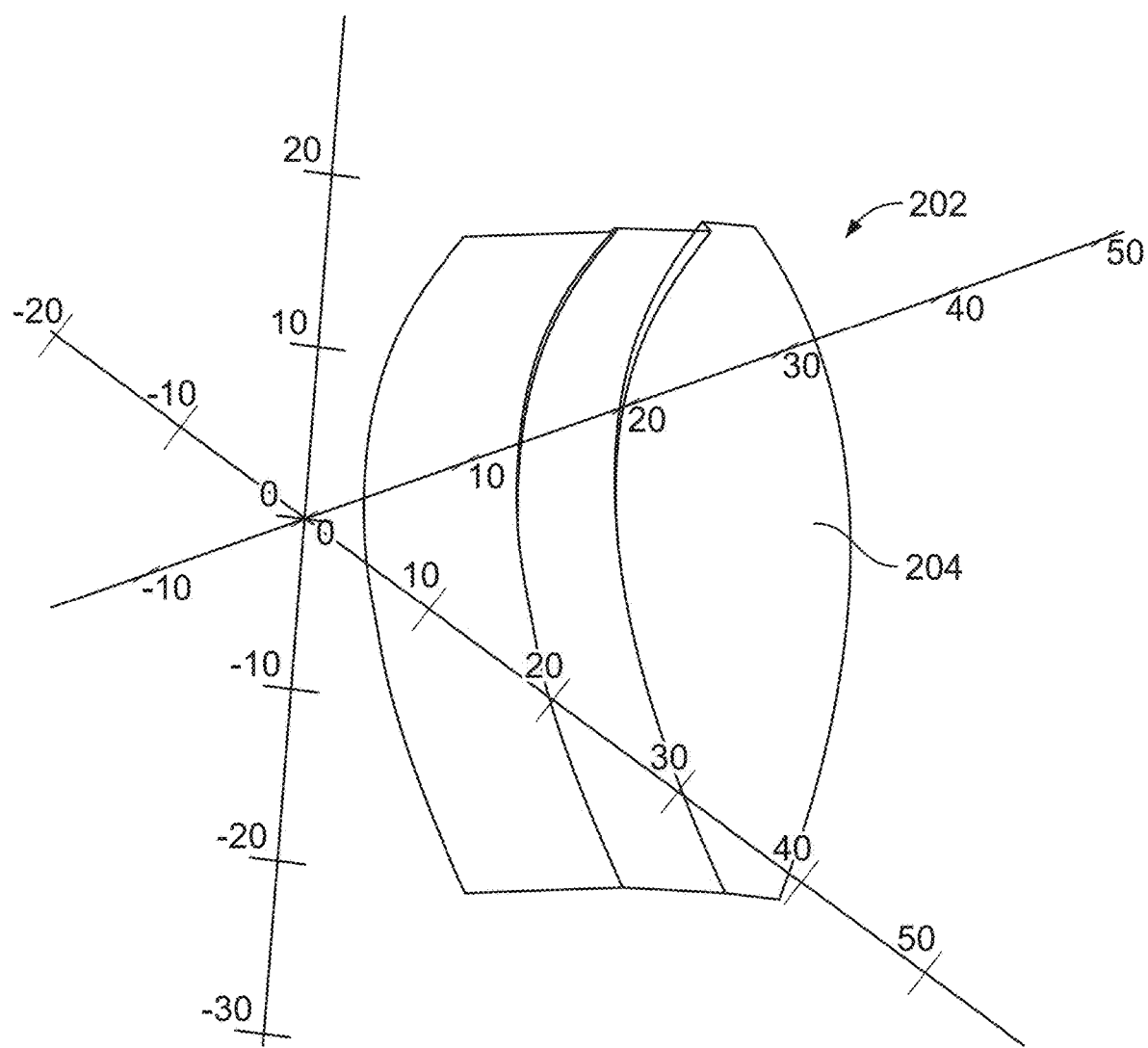
FIG. 21 is a perspective view of another reflector within the headlight system of FIG. 9.

FIG. 21 illustrates a spatial view of an upper-right reflector 202. In some embodiments, the upper-right reflector 202 and the upper-left reflector 218 can be symmetrical. In some embodiments, the upper-right reflector 202 can include the reflector surface 204. In some embodiments, the reflector surface 204 can include one or more reflector panels that comprise the reflector surface 204. The reflector surface 204 can include specific geometric, material properties (e.g., curvatures), and can include a corresponding one of the illumination sources 226 positioned to direct light toward the reflector surface 204. The light reflected from the reflector surface 204 may produce a corresponding illumination region.

Figure 22:
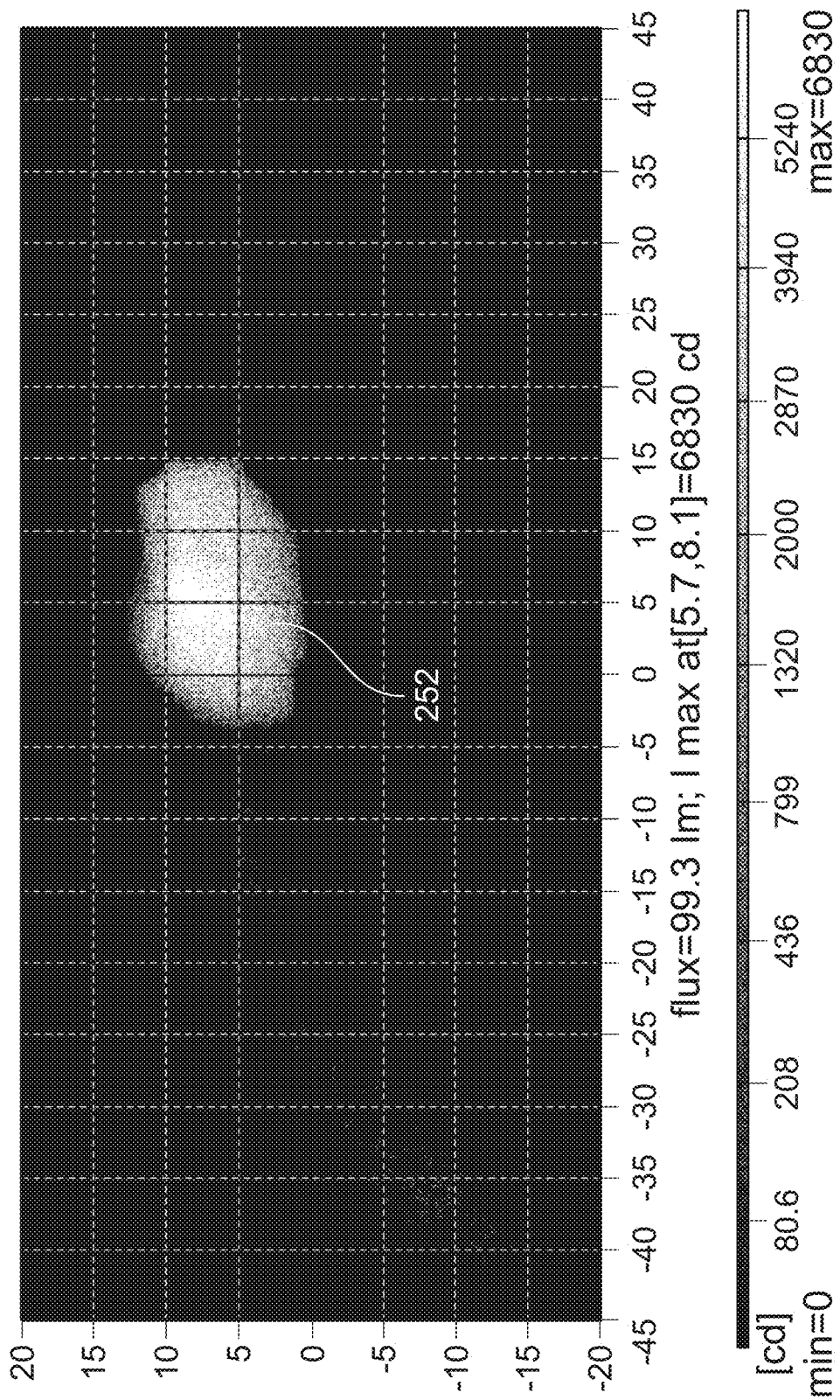
FIG. 22 is a graph illustrating an upper illumination region of the illumination pattern of FIG. 11.

FIG. 22 illustrates a candela distribution graph for the upper-right illumination region 252. In some embodiments, the upper-right illumination region 252 can be symmetrical with the upper-left illumination region 251. In some embodiments, the upper-right reflector 202 includes a corresponding illumination source 226 that produces the upper-right illumination region 252. It should be appreciated that the illumination source 226 that corresponds with the upper-right reflector 202 may include an individual light source or an individual groups of light sources that correspond with the upper-right illumination region 252.

Figure 23:
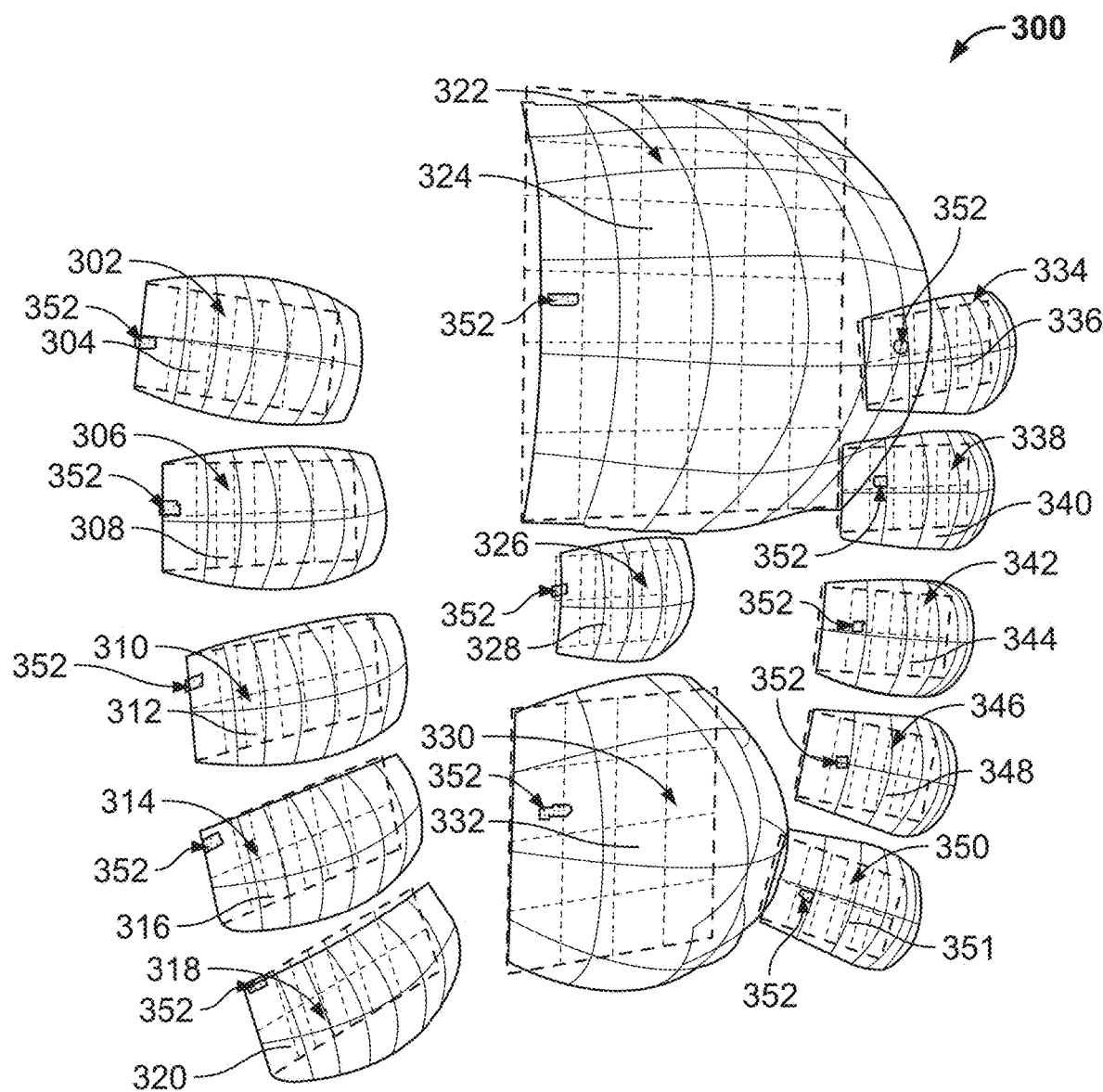
FIG. 23 is a perspective view of a headlight system including a plurality of lenses, according to one aspect of the present disclosure.
Figure 24:
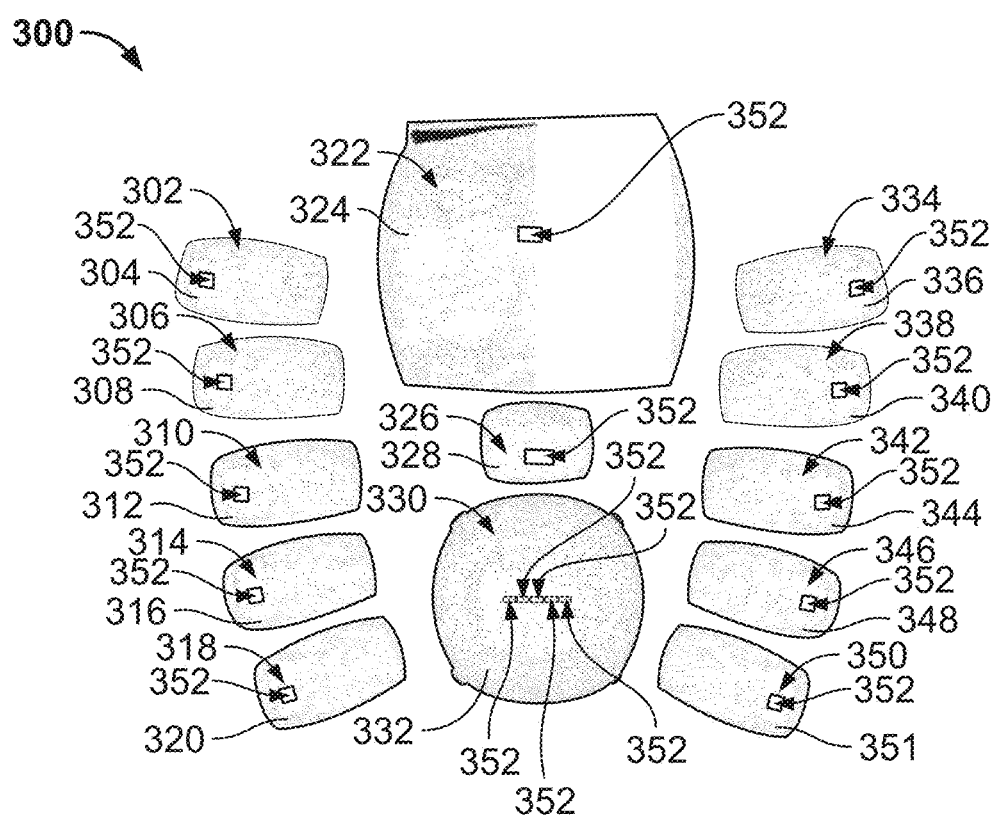
FIG. 24 is a front view of the headlight system of FIG. 23.

FIGS. 23 and 24 show multiple views of a headlight system 300, illustrating a particular embodiment of the headlight system 100. In some embodiments, the headlight system 300 can include a first left-side lens 302, a second left-side lens 306, a third left-side lens 312, a fourth left-side lens 314, and a fifth left-side lens 318, an upper central lens 322, a central lens 326, a lower central lens 330, a first right-side lens 334, a second right-side lens 338, a third right-side lens 342, a fourth right-side lens 346, and a fifth right-side lens 350. Each lens 302, 306, 310, 341, 318, 322, 326, 330, 334, 338, 342, 346, and 350 can have at least one lens surface 304, 308, 312, 316, 320, 324, 328, 332, 336, 340, 344, 348, and 351, respectively. In some embodiments, each lens 302, 306, 310, 341, 318, 322, 326, 330, 334, 338, 342, 346, 350 and/or lens surface 304, 308, 312, 316, 320, 324, 328, 332, 336, 340, 344, 348, and 351, can have a corresponding illumination source 352. In some embodiments, each lens surface within its lens directs, or shapes, light from the corresponding illumination source 352 to produce an illumination region having a selectively controllable illumination intensity. In some embodiments, the geometry of the lens surface, the material of the lens surface, the characteristics of the illumination source 352, and/or the spatial relationship between the illumination source and the lens can define a shape, size, and/or position of an illumination region. In some embodiments, each illumination source 352 can include a light emitting diode ("LED"), an incandescent light bulb, a fluorescent lamp, etc. In some embodiments the illumination sources 352 can include various LED patterns. For example, the illumination sources 352 can include any suitable array of single or multi-die LEDs. As a further example, the illumination sources 352 can include five, 2-die LEDs, positioned in a row. As another example, the illumination sources 352 can include a 5-die LED array and/or a 2-die LED array. As a further example, the illumination sources 352 can include eleven, 2-die LEDs, positioned in a row, and/or two 5-die LEDs, positioned in a row.

In some embodiments, each illumination source 352 can be in electrical communication with a controller (not shown), similar to the illumination sources 118 described herein. The controller can selectively adjust the illumination intensity of each illumination source 352, which an illumination intensity of the corresponding illumination region produced by the light directed through a respective lens. For example, by decreasing the illumination intensity of the illumination source 352 corresponding with the lens surface 336, the illumination region produced only by the lens surface 336 also decreases in illumination intensity, independently of the other illumination regions that also form an illumination pattern 354 (see. e.g., FIGS. 25-28). In some embodiments, the controller can also be in communication with an input (e.g., input 120). For example, the controller can receive a signal corresponding to a change in rotation, lean, or banking of a vehicle (e.g., the degree, speed, and/or direction of rotation). Based on the signal from the input, the controller can adjust one or more of the illumination sources 352 thereby adjusting the corresponding illumination region(s).

Figure 25:
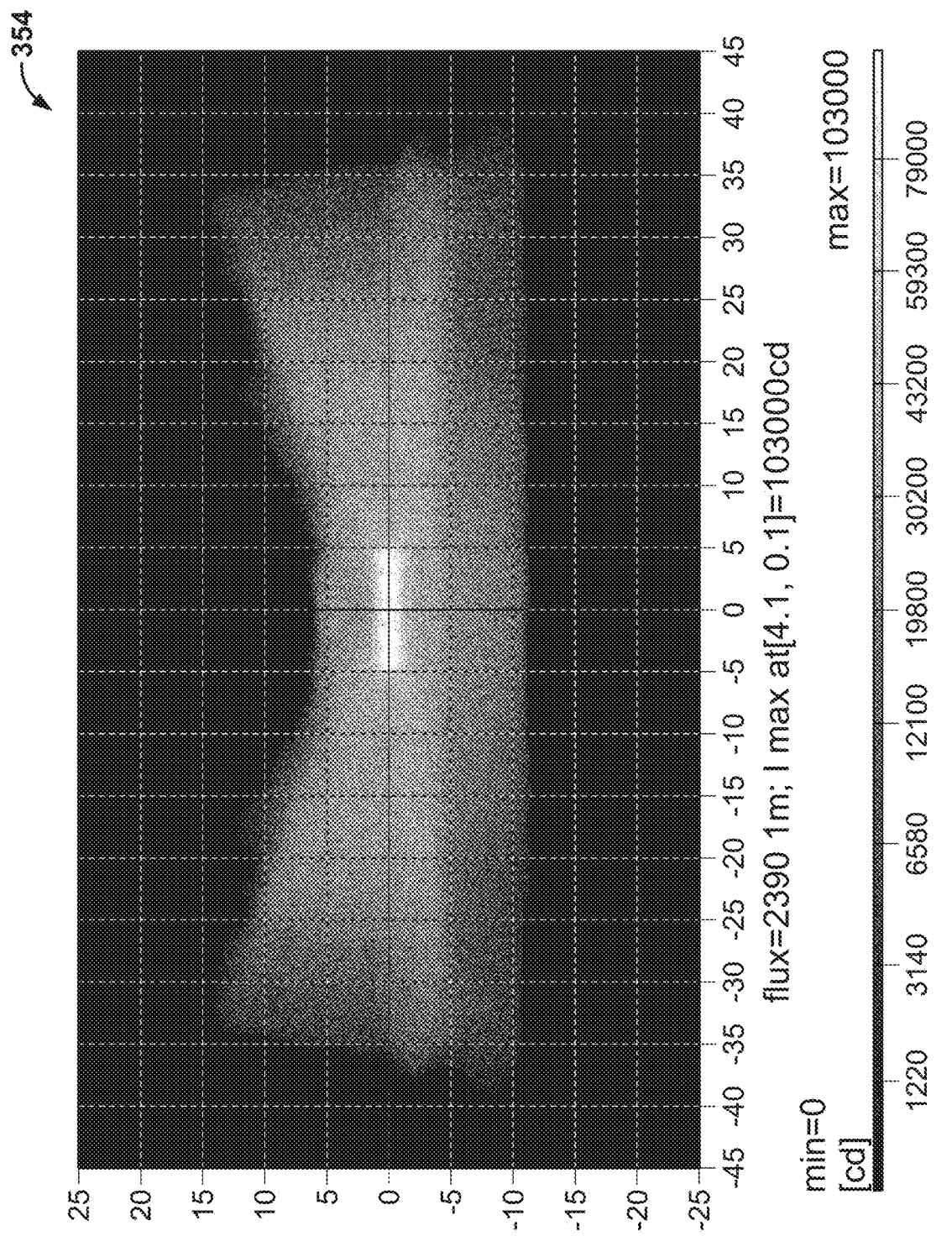
FIG. 25 is a graph illustrating an illumination pattern of the headlight system of FIG. 23.

FIG. 25 shows a graph of an illumination pattern 354 produced using the headlight system 300. The lens illumination pattern 354 can be formed of individual illumination regions, where each illumination region can be adjusted independently from other illumination zone regions. FIG. 25 specifically shows the illumination intensity of the lens illumination pattern 354 by capturing the luminous flux distribution represented on a candela distribution graph.

Figure 26:
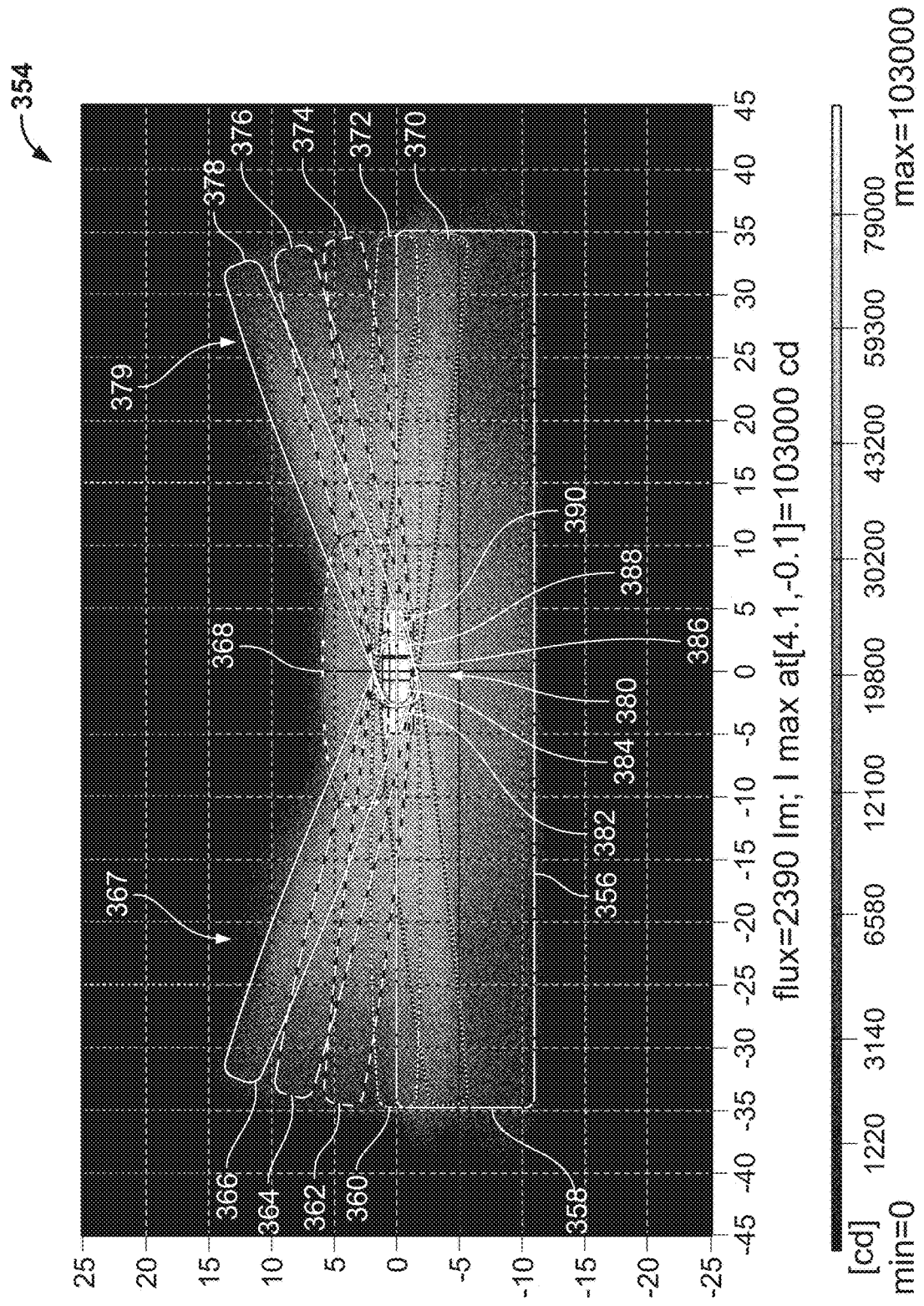
FIG. 26 is a graph illustrating illumination regions of the illumination pattern of FIG. 25.
Figure 27:
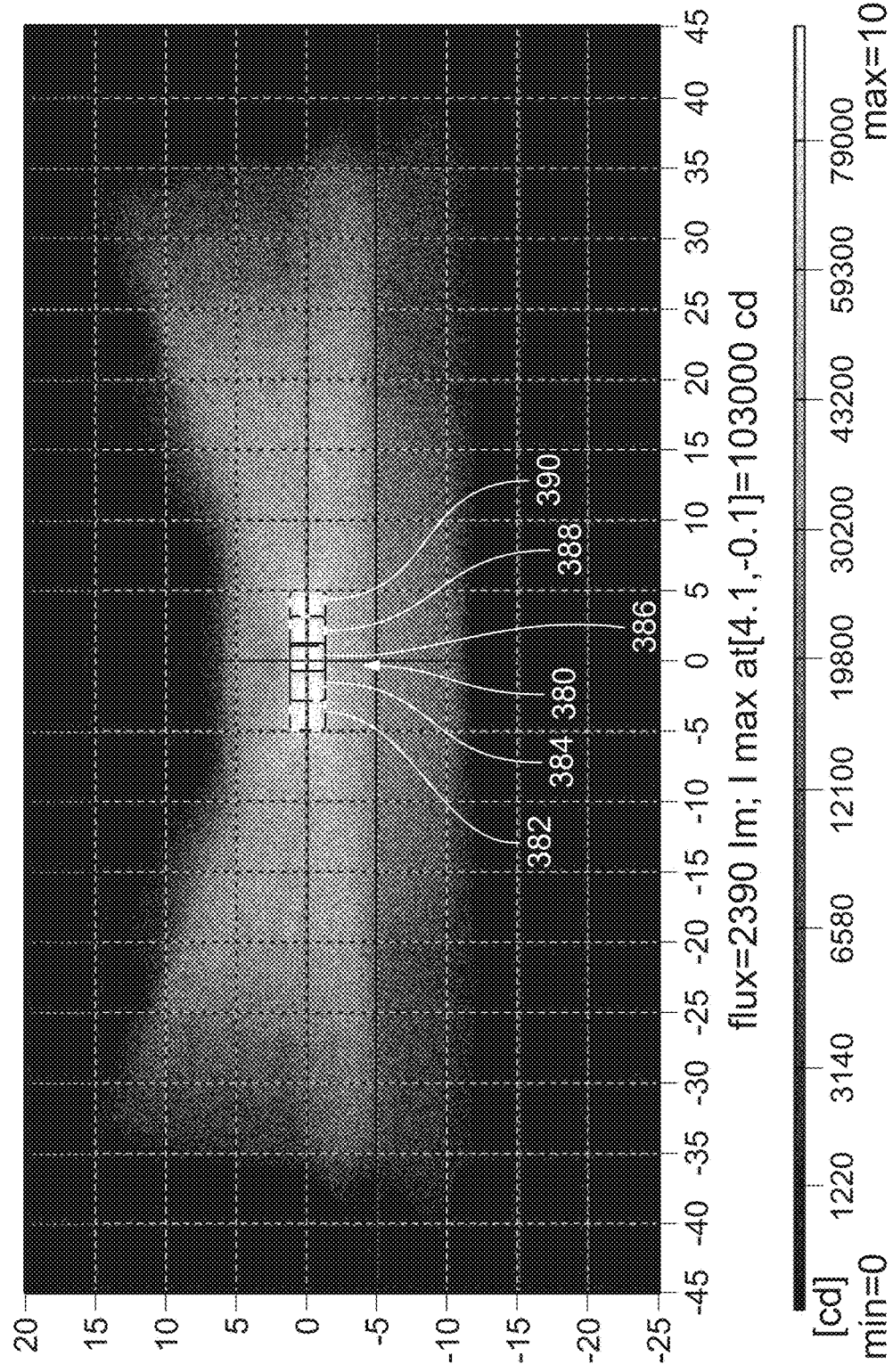
FIG. 27 is a graph illustrating selected central illumination regions within the illumination pattern of FIG. 25.
Figure 28:
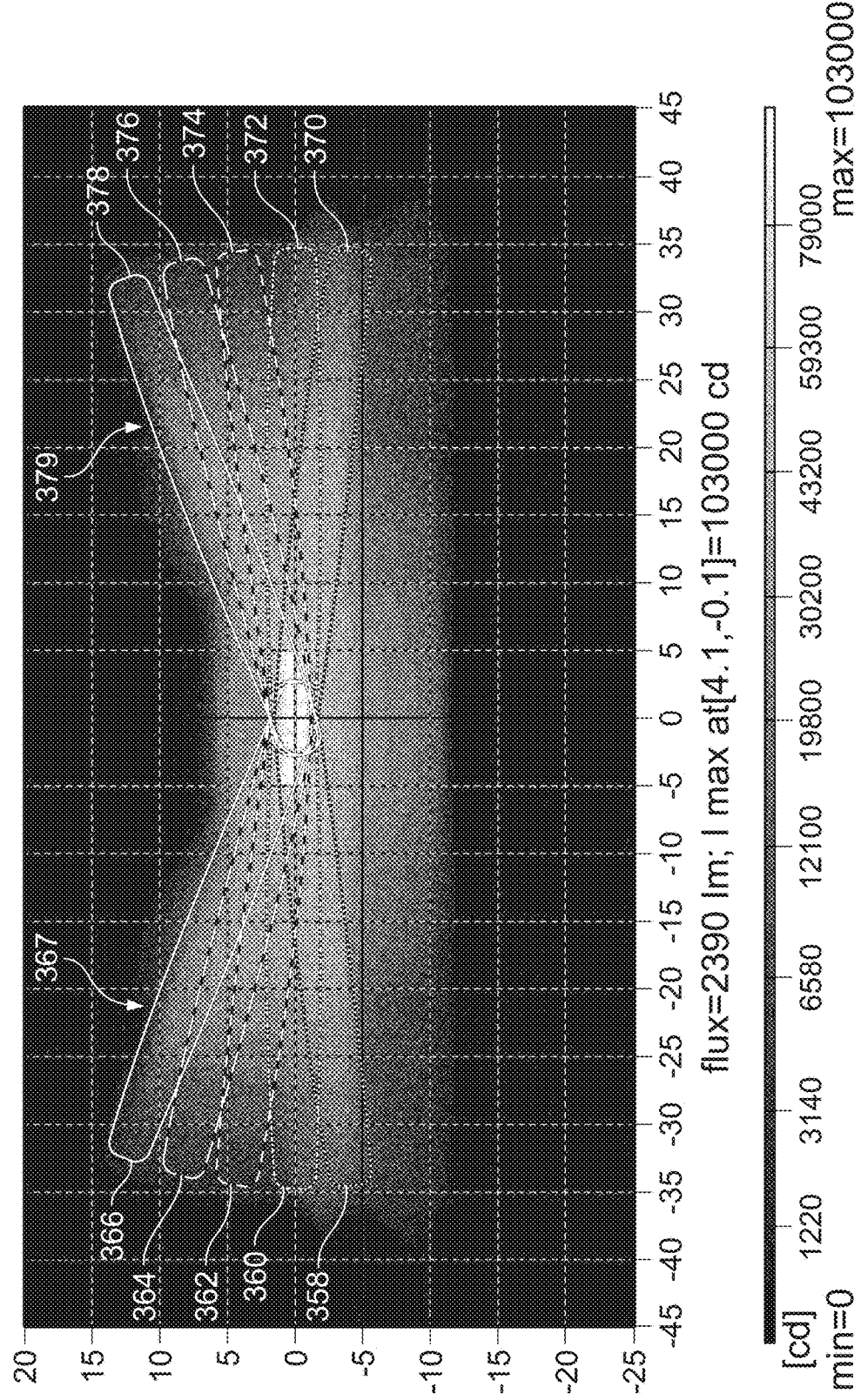
FIG. 28 is a graph illustrating selected side illumination regions within the illumination pattern of FIG. 25.

FIGS. 26-28 show outlines of the individual illumination regions that form the lens illumination pattern 354. For example, the lens illumination pattern 354 can include a lower illumination region 356, a left-side illumination section 367, a right-side illumination section 379, an upper illumination region 368, and a central illumination section 380. In some embodiments, the central illumination section 380 can be generally arranged centrally, relative the left-side illumination section 367 and the right-side illumination section 368. In some embodiments, the central illumination section 380 can be positioned above the lower illumination region 356 and below the upper illumination region 368. In some embodiments, the left-side illumination section 367 can include a first left-side illumination region 358, a second left-side illumination region 360, a third left-side illumination region 362, a fourth left-side illumination region 364, and a fifth left-side illumination region 366, all of which can be angled relative an optical horizon (e.g., a horizontal axis on the candela distribution graph). In the illustrated embodiment, the regions 358, 360, 362, 364, 366 within the left-side illumination section 367 can be in a fan-like arrangement. That is, the regions 358, 360, 362, 364, 366 may be circumferentially rotated or spaced with the first left-side illumination region 358 being arranged circumferentially below the second left-side illumination region 360, and so on.

In some embodiments, the right-side illumination section 379 can include a first right-side illumination region 370, a second right-side illumination region 372, a third right-side illumination region 374, a fourth right-side illumination region 376, and a fifth right-side illumination region 378, all of which can be angled relative an optical horizon (e.g., a horizontal axis on the candela distribution graph). In the illustrated embodiment, the regions 370, 372, 374, 376, 378 within the right-side illumination section 379 can be in a fan-like arrangement. That is, the regions 370, 372, 374, 376, 378 may be circumferentially rotated or spaced with the first right-side illumination region 378 being arranged circumferentially below the second right-side illumination region 376, and so on.

In the illustrated embodiment, the left-side illumination section 367 may be symmetrical to the right-side illumination section 379 about the vertical axis. Therefore, the following description of the left-side illumination section 367 symmetrically applies to the right-side illumination section 379. In the illustrated embodiment, the first left-side illumination region 358, the second left-side illumination region 360, the third left-side illumination region 362, the fourth left-side illumination region 364, and the fifth left-side illumination region 366 can define laterally-elongated shapes, which extend from the central illumination section 380 laterally outward (i.e., away from the vertical axis). Each of the first left-side illumination region 358, the second left-side illumination region 360, the third left-side illumination region 362, the fourth left-side illumination region 364, and the fifth left-side illumination region 366 is angled with respect to the horizontal axis. That is, the laterally-extending borders, or edges, of the first left-side illumination region 358, the second left-side illumination region 360, the third left-side illumination region 362, the fourth left-side illumination region 364, and the fifth left-side illumination region 366 are angled with respect to the horizontal axis. In addition, the first left-side illumination region 358, the second left-side illumination region 360, the third left-side illumination region 362, the fourth left-side illumination region 364, and the fifth left-side illumination region 366 extend a greater angular distance laterally (i.e., in a general horizontal direction) than vertically. As will be described herein the laterally-elongated shapes defined by the first left-side illumination region 358, the second left-side illumination region 360, the third left-side illumination region 362, the fourth left-side illumination region 364, and the fifth left-side illumination region 366 are advantageous for leaning vehicles.

In some embodiments, the central illumination section 380 can include a left most central illumination region 382, a left central illumination region 384, a central illumination region 386, a right central illumination region 388, and a right most central illumination region 390. The central illumination region 386 can be placed centrally with respect to the other regions within the central illumination pattern 380. In some embodiments, the central illumination region 386 defines an optical origin for the illumination pattern 354. In some embodiments, the central illumination region 386 can be positioned between the left most central illumination region 382 and the right most central illumination region 390. In some embodiments, the central illumination region 386 can be positioned between the left central illumination region 384 and the right central illumination region 388. In some embodiments, the upper illumination region 368 can overlap with any illumination regions within the central illumination section 380, the left-side illumination section 367, and/or the right-side illumination section 379.

As illustrated in FIGS. 26-28, some of the illumination regions overlap with other illumination regions. For example, in practice, the optical performance of the optical components (e.g., lens 302, lens surface 304, and/or illumination sources 352) within the headlight system 300 may not be theoretically-perfect. Thus, some overlap between adjacent illumination regions (e.g., the first left-side illumination region 358 and the second left-side illumination region 360) may occur within the lens illumination pattern 354. That being said, the control of an illumination source 352 for a given illumination region within the illumination pattern 354 may control a substantial portion of the illuminous flux within the illumination region. For example, the control of an illumination source 352 for a given illumination region may control greater than 50% of the illuminous flux within the illumination region, greater than 60% of the illuminous flux within the illumination region, greater than 70% of the illuminous flux within the illumination region, greater than 80% of the illuminous flux within the illumination region, or greater than 90% of the illuminous flux within the illumination region. Thus, while some overlap may occur, the headlight system 300 is configured to output of generally discretized illumination regions via the use of a plurality of illumination sources 352 each configured to direct light toward a respective one of the lens 302, 306, 310, 341, 318, 322, 326, 330, 334, 338, 342, 346, 350. The use of illumination sources 354 (e.g., LED(s)) and lens 302, 306, 310, 341, 318, 322, 326, 330, 334, 338, 342, 346, 350 provides a lost-cost solution to providing individually-controllable, generally discrete illumination regions within an illumination pattern, for example, compared to a projector-based solution.

As discussed above generally, each illumination region (e.g., the first left-side illumination region 358) can have an illumination intensity generally independent of other illumination regions. Each illumination region (e.g., the lower illumination region 356) can be created from a corresponding illumination source (e.g., illumination source 356) that emits light and a corresponding reflector (e.g., lens 332) and/or a lens surface (e.g., lens surface 324) that directs the emitted light creating each illumination region. Thus, different lenses, lens surfaces, and/or illumination sources within the headlight system 300 create each individual illumination region. As detailed above, each illumination source 356 that corresponds to a respective illumination region can be adjusted, as to increase or decrease the illumination of each illumination region accordingly. For example, when a vehicle on which the headlight system 300 is mounted rotates (i.e., banks or leans) during a turn in a first direction (e.g., rotates in a counterclockwise direction from the perspective of FIGS. 25-28), a vehicle input senses the turn and inputs a signal to the controller that is proportional to the amount of banking or lean experience by the vehicle. In response to the input, a controller (e.g., controller 118) may increase the illumination intensities of the first left-side illumination region 358, the second left-side illumination region 360, the third left-side illumination region 362, the fourth left-side illumination region 364, and/or the fifth left-side illumination region 366 by increasing the illumination of the corresponding illumination sources 352 (e.g., increasing a duty cycle of a PWN signal applied to the illumination source 352 corresponding illumination regions). In addition, the controller may decrease the illumination intensities of the first right-side illumination region 370, the second right-side illumination region 372, the third right-side illumination region 374, the fourth right-side illumination region 376, and/or the fifth right-side illumination region 378.

As a further example, the controller can increase the intensities of the side illumination regions that are positioned closer to the optical horizon first, compared to the side regions positioned farther away from the optical horizon. For example, as the vehicle first begins to turn, or as a function of the vehicle's lean/bank angle of rotation in a counterclockwise direction (from the perspective of FIGS. 25-28), the controller may increase the illumination intensity of the first left-side illumination region 358 before increasing the intensity of the remaining left-side illumination regions 360-366. Similarly, and substantially simultaneously, as the vehicle begins to turn in a counterclockwise direction, the controller can decrease the illumination intensity of the fifth right-side illumination region 378, before decreasing the illumination intensity of the other remaining right-side illumination regions 372-378. These controlled variations in the selected illumination regions and the laterally-extending shapes of the illumination regions within the left-side section 367 and the right-side section 379 can allow the illumination regions that contour the road to be further illuminated in a sequential manner during a turn. In addition, the illumination regions that deviate from the road (e.g., toward an oncoming vehicle or object, or away from the road on which the vehicle is traveling) may be substantially simultaneously decreased in illumination. In some embodiments, the illumination adjustment of specific regions can be reversed and/or opposite as discussed with regard to counterclockwise rotation. For example, when the vehicle and illumination pattern 354 rotates in a clockwise direction, the first right-side illumination region 370 may initially increase in illumination intensity, while the fifth left-side illumination region 366 may initially decrease in illumination intensity.

Figure 29:
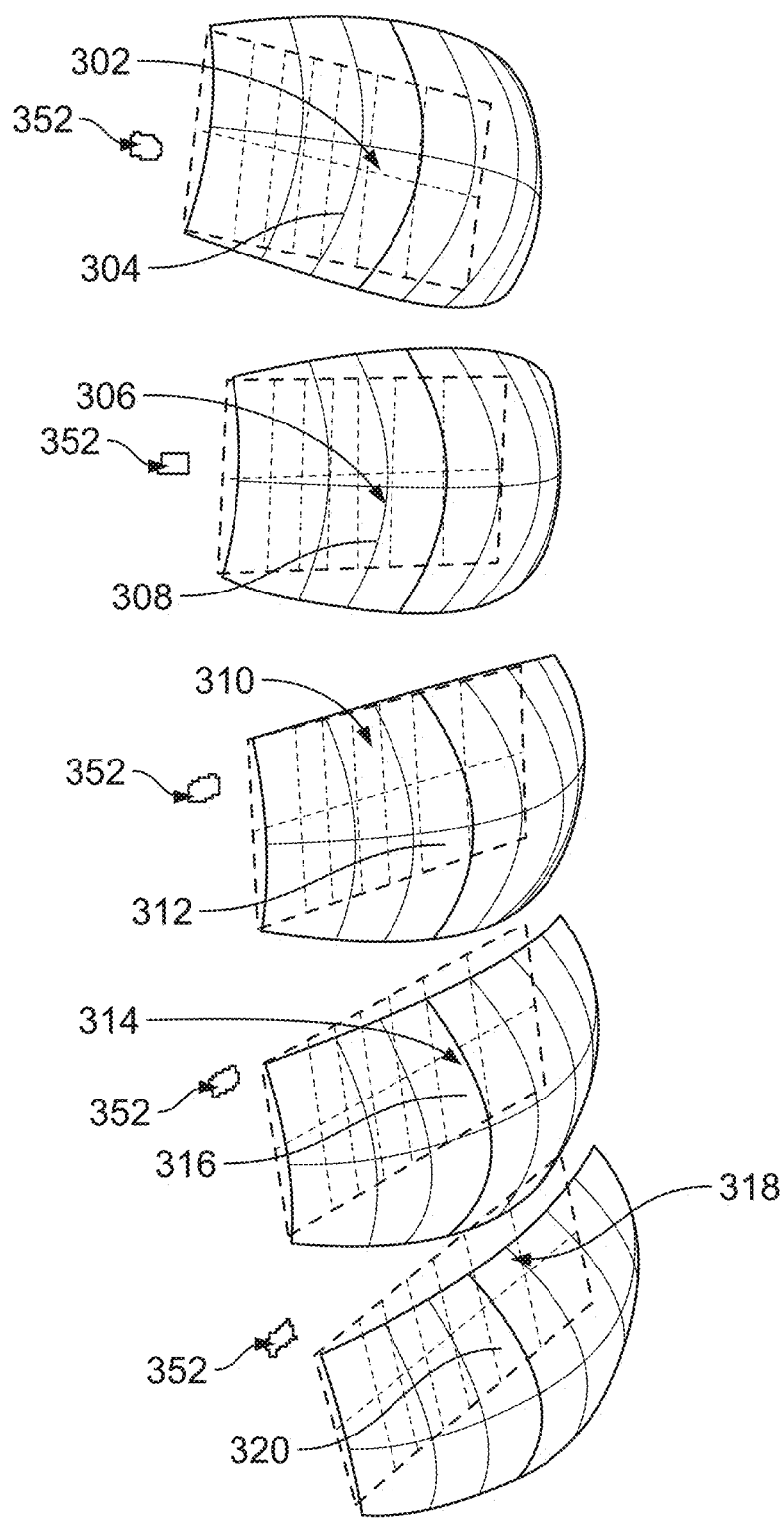
FIG. 29 is a perspective view of a plurality of lenses within the headlight system of FIG. 23.

FIG. 29 illustrates the first left-side lens 302, the second left-side lens 306, the third left-side lens 312, the fourth left-side lens 314, and the fifth left-side lens 318. In some embodiments, each left-side lens within the group of left-side lenses (e.g., a first left-side lens 302) can include one or more lens surfaces (e.g., one or more lens surfaces 304). Each lens can include specific geometric, material properties (e.g., curvatures), and can include one or more illumination sources (e.g., illumination source 352) positioned to direct light toward the lens surface. The light directed through the lens surface may produce a corresponding illumination region.

Figure 30A:
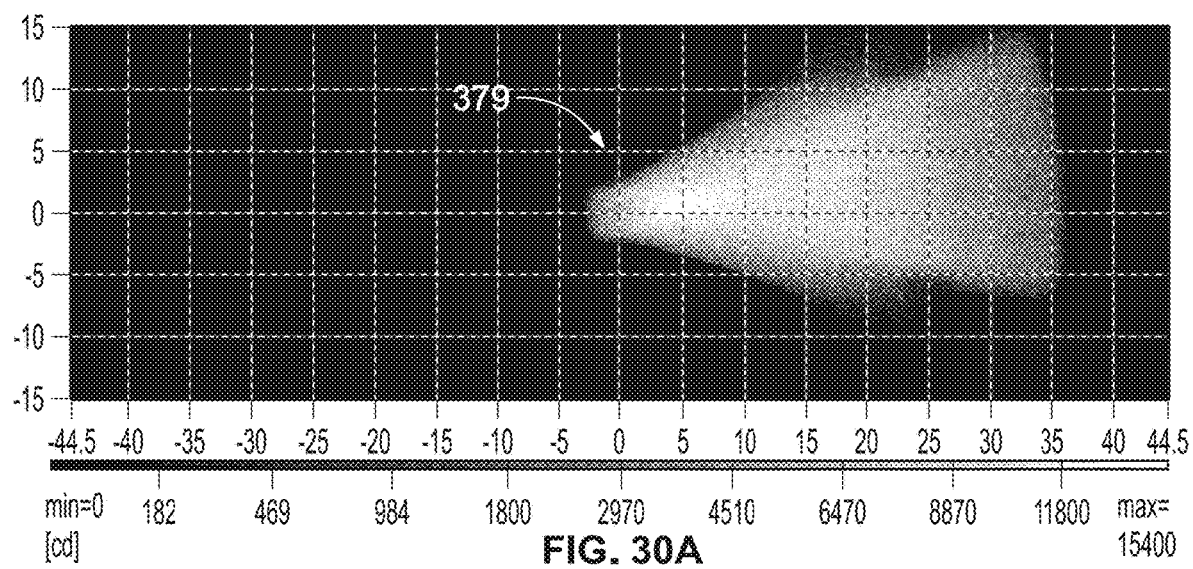
FIG. 30A is a graph illustrating a right-side illumination pattern of the illumination pattern of FIG. 25.
Figure 30B:
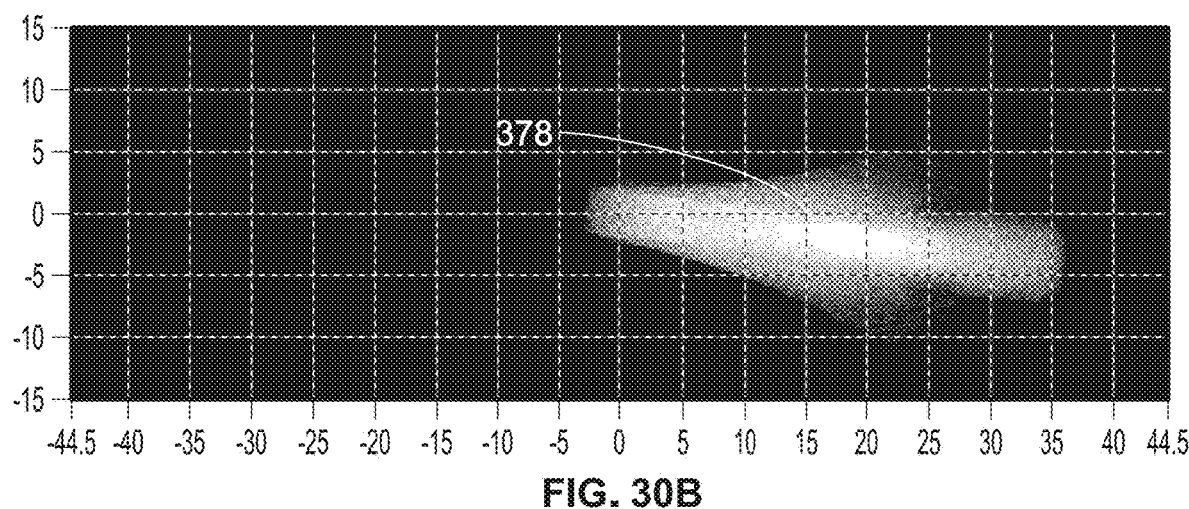
FIG. 30B is a graph illustrating a first right-side illumination region of the illumination pattern of FIG. 30A.
Figure 30C:
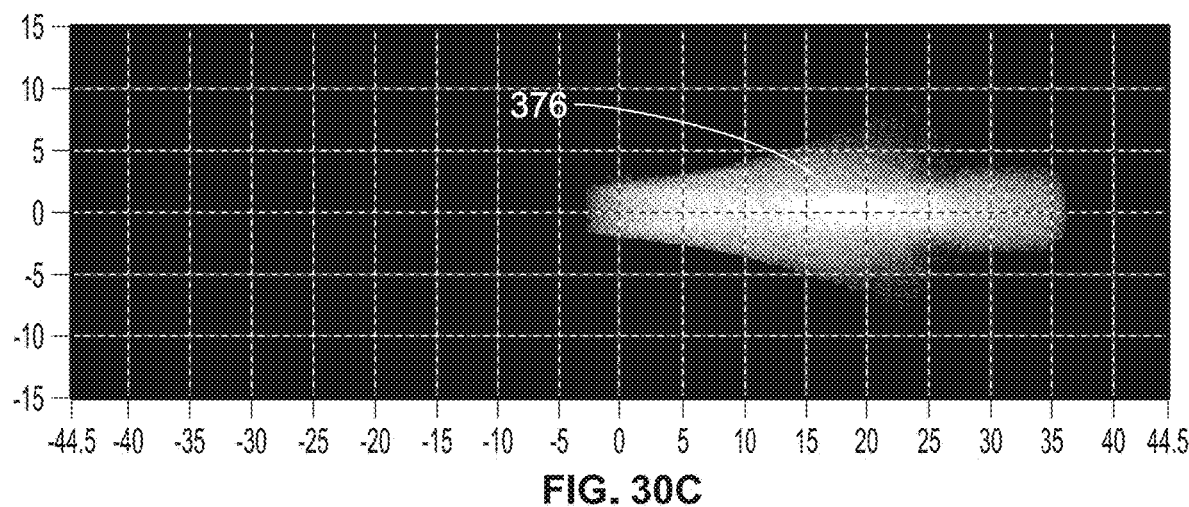
FIG. 30C is a graph illustrating a second right-side illumination region of the illumination pattern of FIG. 30A.
Figure 30D:
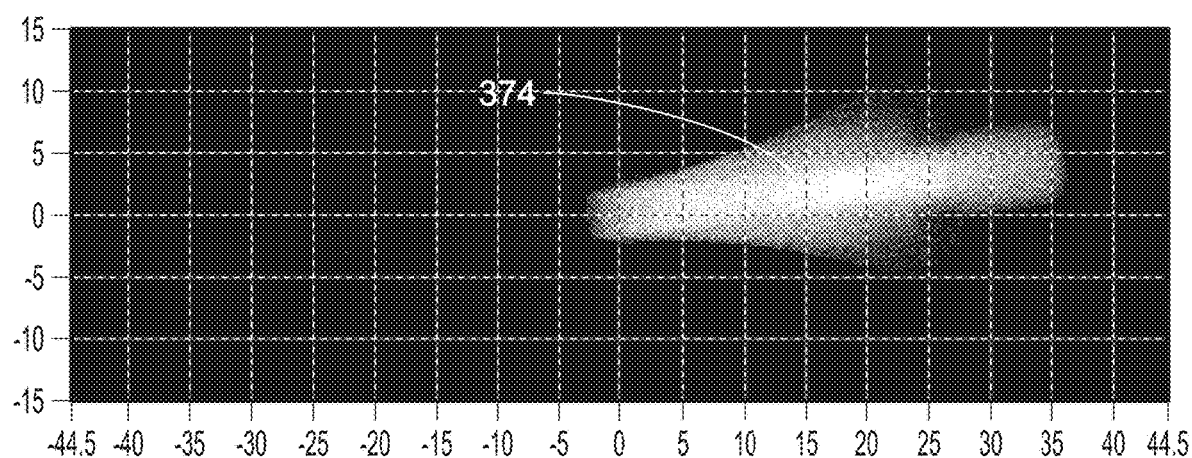
FIG. 30D is a graph illustrating a third right-side illumination region of the illumination pattern of FIG. 30A.
Figure 30E:
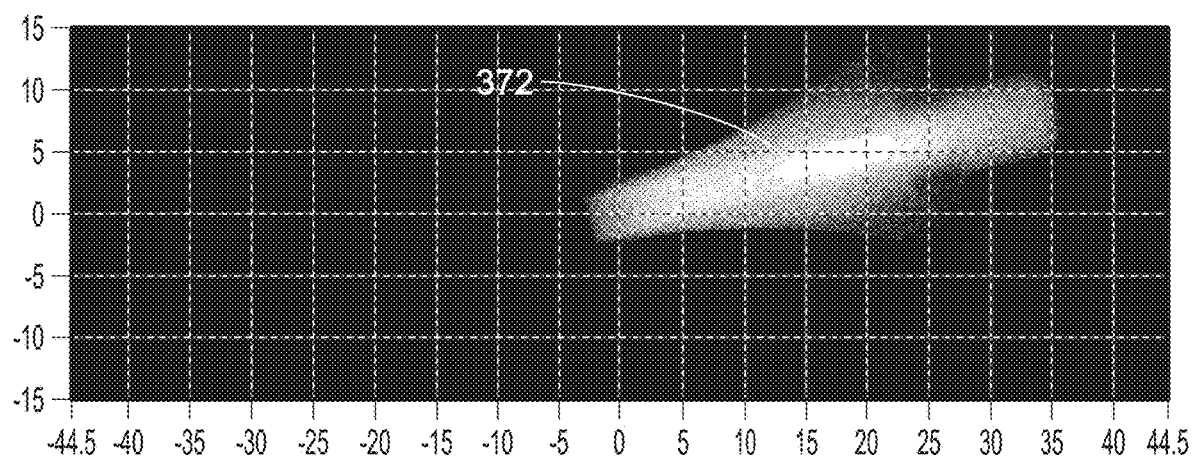
FIG. 30E is a graph illustrating a fourth right-side illumination region of the illumination pattern of FIG. 30A.
Figure 30F:
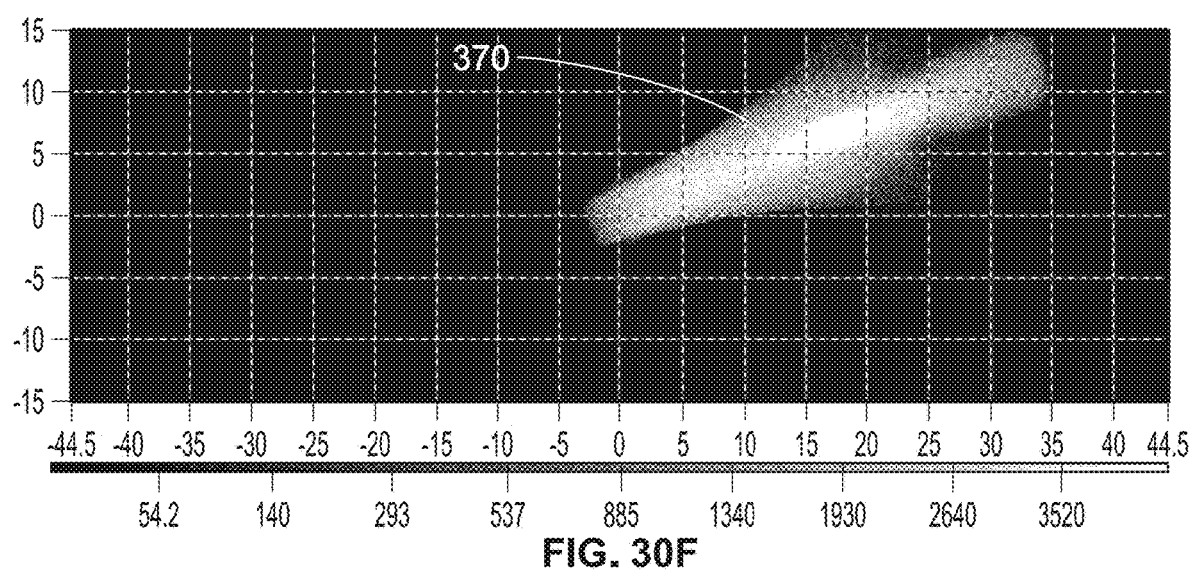
FIG. 30F is a graph illustrating a fifth right-side illumination region of the illumination pattern of FIG. 30A.

FIGS. 30A-30F illustrate candela distribution graphs for the right-side illumination section 379, and each of the illumination regions within the left-side illumination section 367. In some embodiments, each of the left-side lenses can include an illumination source 352 that corresponds with a lens surface 336, 340, 344, 348, 352 within each of the right-side lenses 334, 338, 342, 346, 350 to produce individual illumination regions. In some embodiments, an illumination source 352 associated with each of the first right-side lens 334, the second right-side lens 338, the third right-side lens 342, the fourth right-side lens 346, and the fifth right-side lens 350 produces the fifth left-side illumination region 378, the fourth right-side illumination region 376, the third right-side illumination region 374, the fourth right-side illumination region 372, and the first right-side illumination region 370, respectively. FIG. 30B illustrates a candela distribution graph of the fifth right-side illumination region 378, FIG. 30C illustrates a candela distribution graph of the fourth right-side illumination region 376, FIG. 30D illustrates a candela distribution graph of the third right-side illumination region 374, FIG. 30E illustrates a candela distribution graph of the second right-side illumination region 372, and FIG. 30F illustrates a candela distribution graph of the first right-side illumination region 370.

In some embodiments, each of the left-side lenses can include an illumination source 352 that corresponds with a lens surface 304, 308, 312, 316, 320 within each of the left-side lenses 302, 306, 310, 314, 318 to produce individual illumination regions. In some embodiments, an illumination source 352 associated with each of the first left-side lens 302, the second left-side lens 306, the third left-side lens 310, the fourth left-side lens 314, and the fifth left-side lens 318 produces the first left-side illumination region 358, the second left-side illumination region 360, the third left-side illumination region 362, the fourth left-side illumination region 364, and the fifth left-side illumination region 366, respectively.

Figure 31:
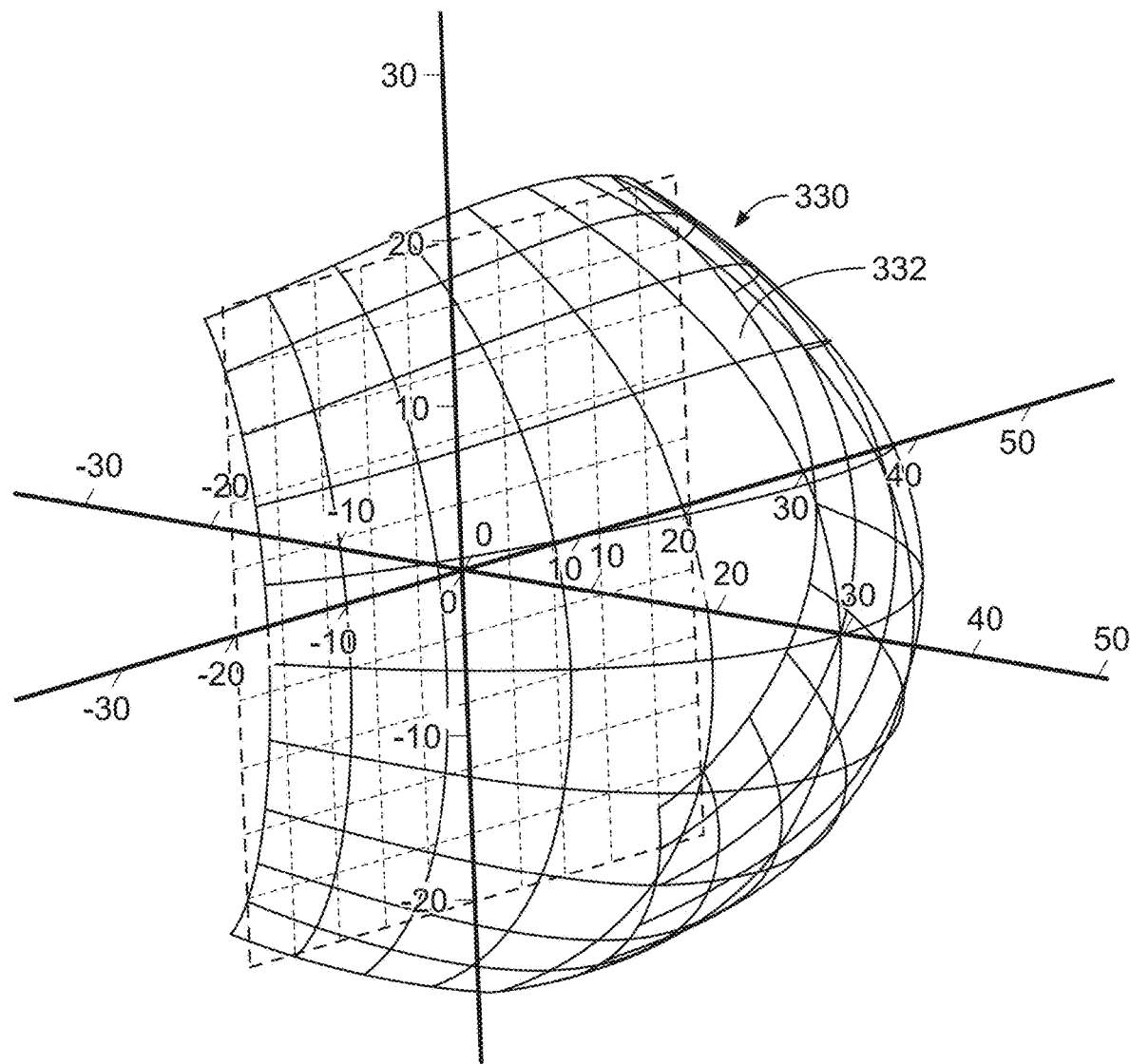
FIG. 31 is a perspective view of another lens within the headlight system of FIG. 23.

FIG. 31 illustrates a spatial view of the lower central lens 330. In some embodiments, the lower central lens 330 can include the lens surface 332. The lens surface 332 can include specific geometric, material properties (e.g., curvatures), and can include a corresponding one of the illumination sources 352 positioned to direct light toward the lens surface 332. The light directed by the lens surface 332 may produce a corresponding illumination region.

Figure 32A:
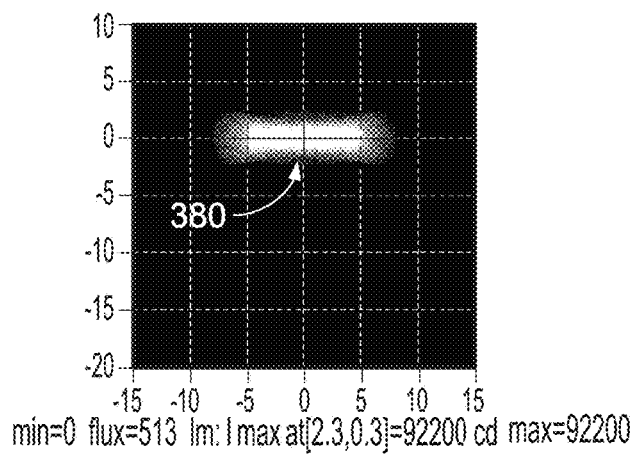
FIG. 32A is a graph illustrating a central illumination pattern of the illumination pattern of FIG. 25.
Figure 32B:
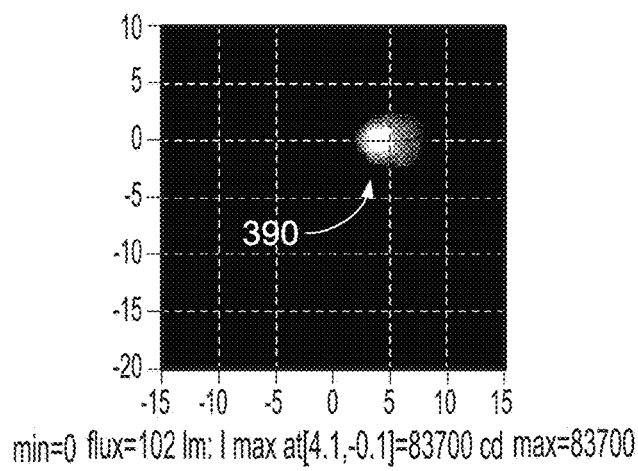
FIG. 32B is a graph illustrating a first right-side central illumination region of the illumination pattern of FIG. 32A.
Figure 32C:
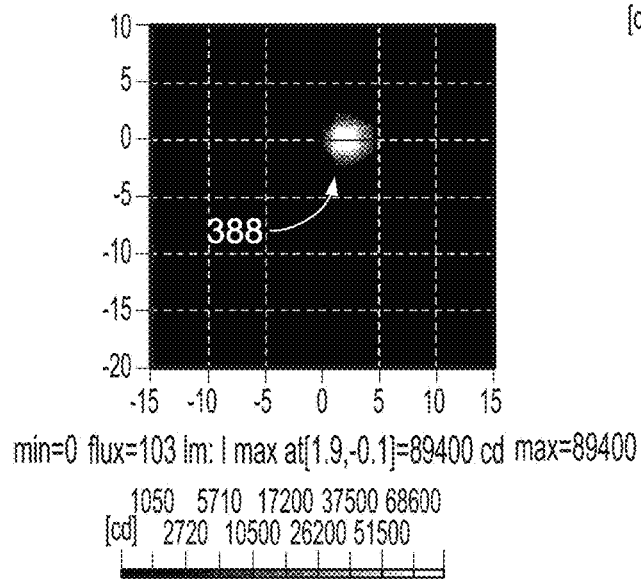
FIG. 32C is a graph illustrating a second right-side central illumination region of the illumination pattern of FIG. 32A.
Figure 32D:
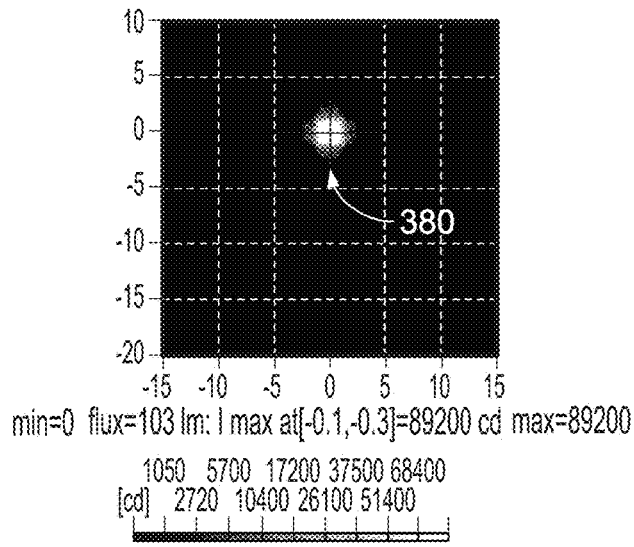
FIG. 32D is a graph illustrating a central illumination region of the illumination pattern of FIG. 32A.
Figure 32E:
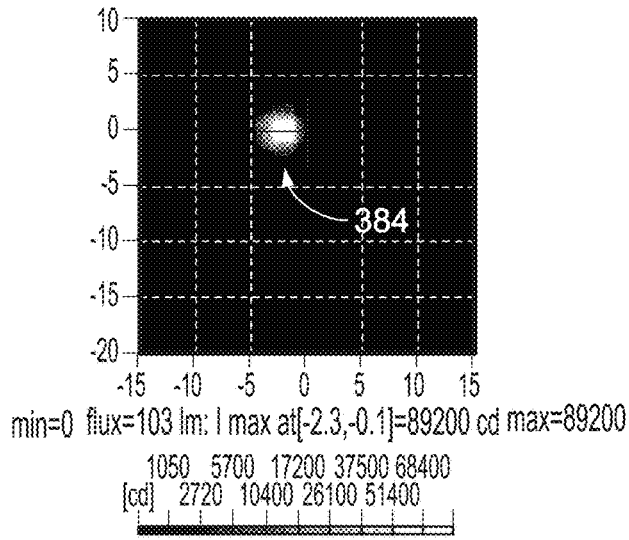
FIG. 32E is a graph illustrating a first left-side central illumination region of the illumination pattern of FIG. 32A.
Figure 32F:
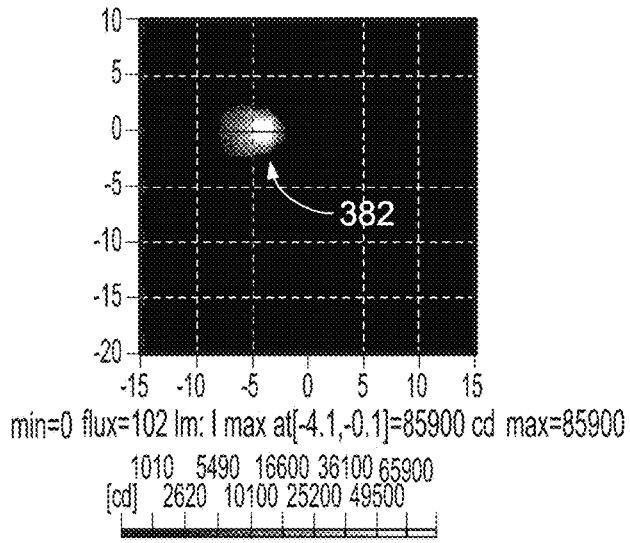
FIG. 32F is a graph illustrating a second left-side central illumination region of the illumination pattern of FIG. 32A.

FIGS. 32A-32F illustrate candela distribution graphs for the central illumination section 380, and each of the illumination regions within the central illumination section 380. FIG. 32A illustrates a candela distribution graph of the central illumination section 380. In some embodiments, the lower central lens 330 produces the central illumination section 380. In some embodiments, the lower central lens 330 includes five light sources within the illumination source 352 corresponding thereto, each light source corresponding with one of the left most central illumination region 382, the left central illumination region 384, the central illumination region 386, the right central illumination region 388, and the right most central illumination region 390. It should be appreciated that the illumination source 352 that corresponds with the lower central lens 330 may include five individual light sources or five individual groups of light sources that correspond with one of the left most central illumination region 382, the left central illumination region 384, the central illumination region 386, the right central illumination region 388, and the right most central illumination region 390. FIG. 32B illustrates a candela distribution graph of the right most central illumination region 390, FIG. 32C illustrates a candela distribution graph of the right central illumination region 388, FIG. 32D illustrates a candela distribution graph of the central illumination region 380, FIG. 32E illustrates a candela distribution graph of the left central illumination region 384, and FIG. 32F illustrates a candela distribution graph of the left most central illumination region 382.

Figure 33:
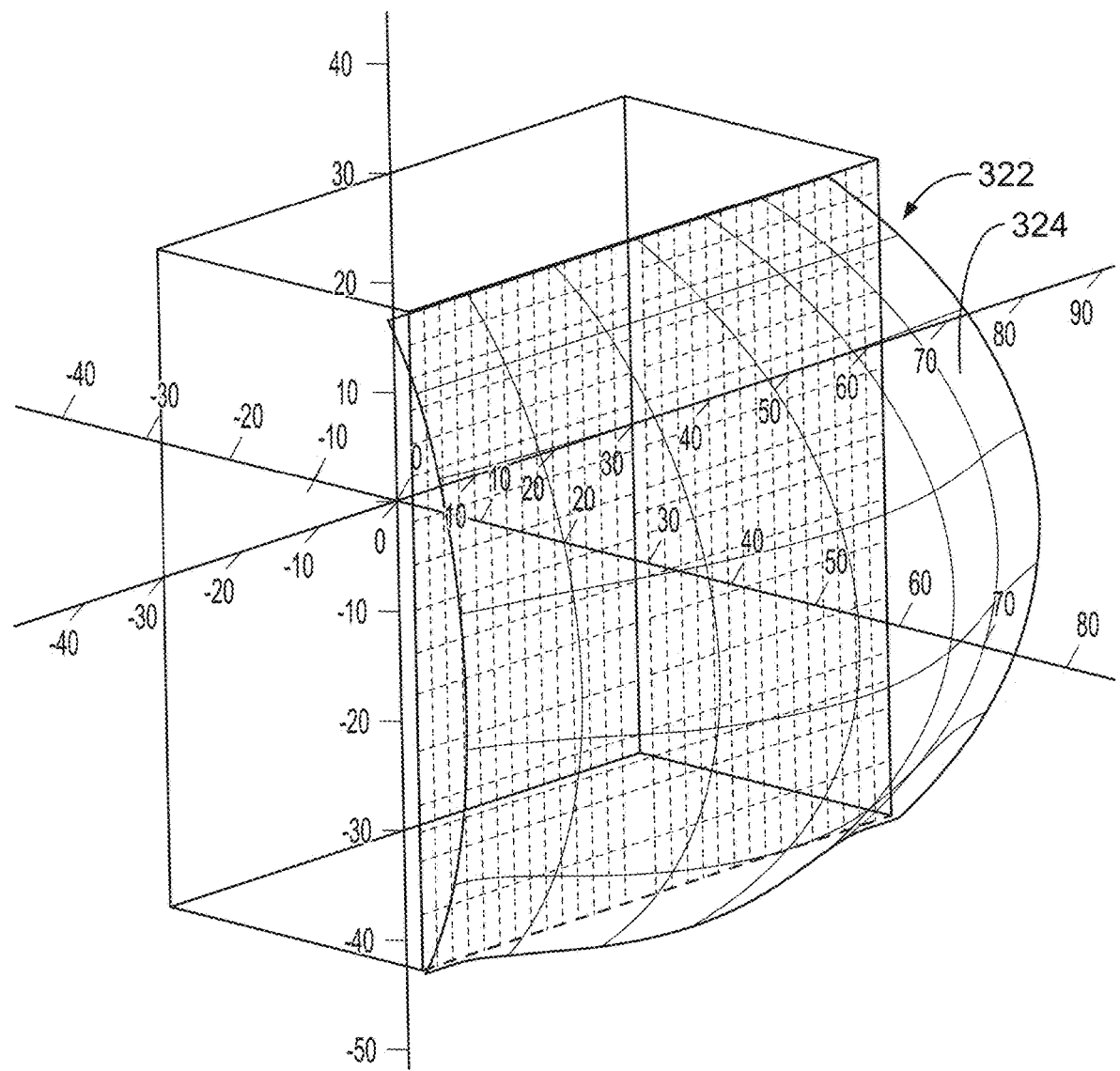
FIG. 33 is a perspective view of another lens within the headlight system of FIG. 23.

FIG. 33 illustrates a spatial view of an upper central lens 322. In some embodiments, the upper central lens 322 can include the lens surface 324. The lens surface 324 can include specific geometric, material properties (e.g., curvatures), and can include a corresponding one of the illumination sources 352 positioned to direct light toward the lens surface 324. The light directed by the lens surface 324 may produce a corresponding illumination region.

Figure 34:
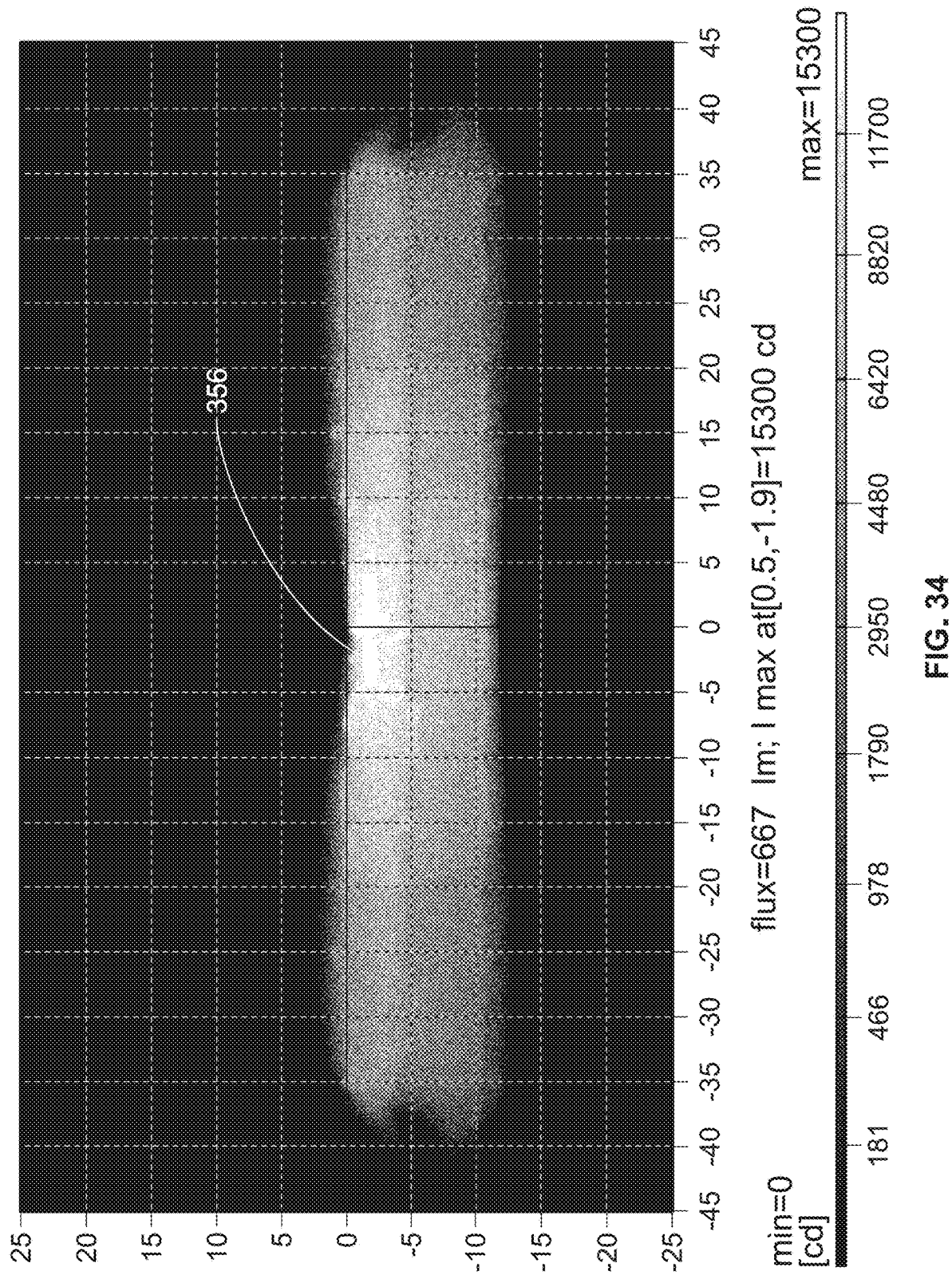
FIG. 34 is a graph illustrating a lower region of the illumination pattern of FIG. 25.

FIG. 34 illustrates a candela distribution graph for the lower illumination region 356. In some embodiments, the upper central lens 322 produces the lower illumination region 356. In some embodiments, the upper central lens 322 includes one illumination source 352 that corresponds to the lens surface 324. In some embodiments, a group of light sources within the illumination source 352 corresponding with the lens surface 324 produce the lower illumination region 356.

Figure 35:
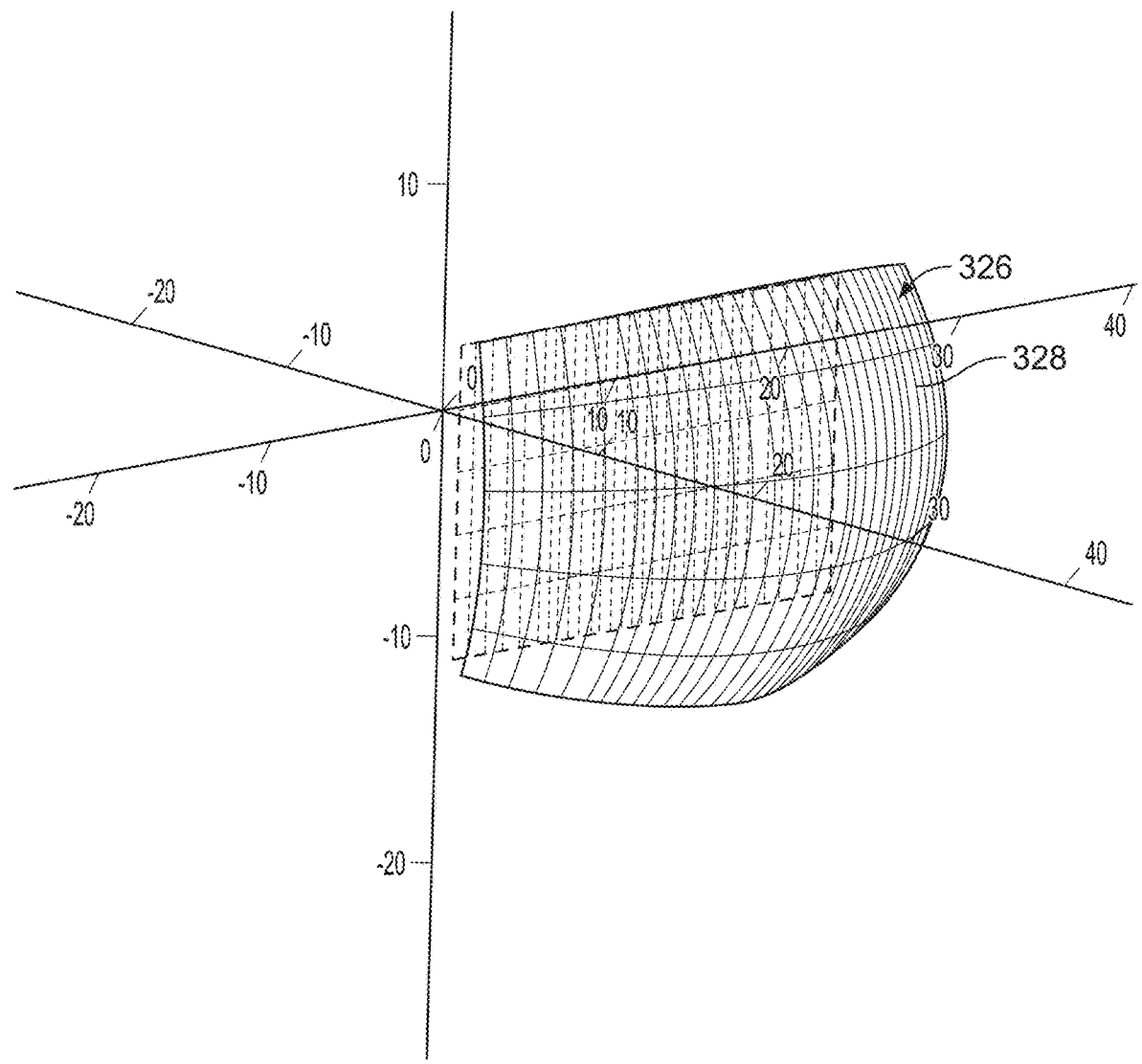
FIG. 35 is a perspective view of another lens within the headlight system of FIG. 23.

FIG. 35 illustrates a spatial view of the central lens 326. In some embodiments, the central lens 326 can the lens surfaces 328. The lens surface 328 can include specific geometric, material properties (e.g., curvatures), and can include a corresponding one of the illumination sources 352 positioned to direct light toward the lens surface 328. The light directed by the lens surface 328 may produce a corresponding illumination region.

Figure 36:
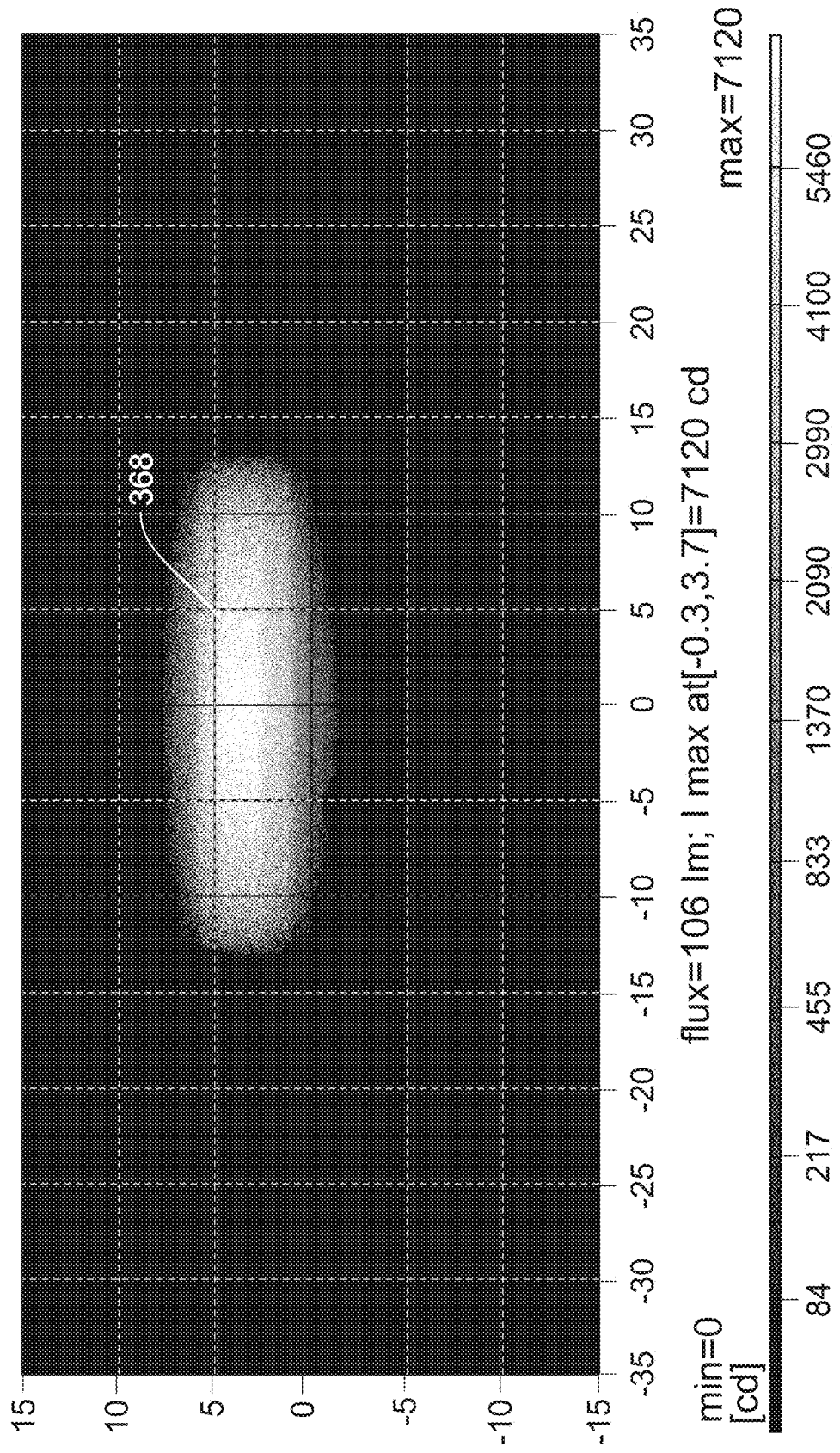
FIG. 36 is a graph illustrating an upper region of the illumination pattern of FIG. 25.

FIG. 36 illustrates a candela distribution graph for the upper illumination region 368. In some embodiments, the central lens 326 produces the upper illumination region 368. In some embodiments, the central lens 326 includes one illumination source 352 that corresponds to the lens surfaces 328. In some embodiments, a group of light sources within the illumination source 352 corresponding with the lens surface 328 produce the upper illumination region 368.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A headlight system for a banking vehicle, the headlight system comprising:
a plurality of optical assemblies being arranged about an optical horizon and an optical vertical axis, wherein each of the plurality of optical assemblies includes an illumination source and an optical element,
wherein each of the illumination sources is configured to direct light toward a corresponding one of the optical elements to produce an illumination region,
wherein the illumination regions combine to form an illumination pattern that includes at least one illumination region that is radial and is positioned relative an optical origin, and wherein the intersection between the optical horizon and the optical vertical axis defines the optical origin, and
wherein the at least one illumination region is a first illumination region and the illumination pattern further comprises a second illumination region positioned closer to the optical vertical axis than the first illumination region, and wherein a lateral edge of a third illumination region and a lateral edge of a fourth illumination region are each located closer to the optical origin than a lateral edge of the first illumination region, each of the third illumination region and fourth illumination region extending from the optical origin in the same radial direction as the first illumination region.

2. The headlight system of claim 1, wherein the at least one illumination region is translated above at least one of the optical horizon and the optical vertical axis.

3. The headlight system of claim 1, further comprising:
a controller in electrical communication with the plurality of illumination sources and at least one vehicle input, the controller configured to:
receive a signal from the vehicle input; and
adjust the illumination intensity of the illumination source that corresponds to the first illumination region, thereby adjusting the illumination intensity of the first illumination region.

4. The headlight system of claim 3, wherein the controller is also configured to:
adjust the illumination intensity of the illumination source that corresponds to the second illumination region, thereby adjusting the illumination intensity of the second illumination region.

5. The headlight system of claim 4, wherein the vehicle input further comprises an accelerometer, the accelerometer sensing an orientation of the vehicle.

6. The headlight system of claim 5, wherein the orientation of the vehicle includes a first rotational direction and a second rotational direction opposite the first rotational direction.

7. The headlight system of claim 6, wherein the controller is further configured to:
receive an accelerometer signal indicative of the first rotational direction or the second rotational direction of the vehicle; and
adjust the intensity of the first illumination region or the second illumination region, based the accelerometer signal.

8. The headlight system of claim 3, wherein the controller is also configured to adjust the illumination intensity of the illumination source that corresponds to the third illumination region, thereby adjusting the illumination intensity of the third illumination region,
wherein the controller adjusts the illumination intensity of the illumination source that corresponds to the third illumination region prior to adjusting the illumination intensity of the illumination source that corresponds to the first illumination region.

9. The headlight system of claim 8, wherein the third illumination region extends radially between the fourth illumination region and the first illumination region, and
wherein the controller is configured to adjust the illumination intensity of the illumination source that corresponds to the fourth illumination region prior to adjusting the illumination intensity of the illumination source that corresponds to the third illumination region.

10. A headlight system for a leaning vehicle, the headlight system comprising:
a plurality of optical assemblies being arranged about an optical horizon and an optical vertical axis,
wherein each of the optical assemblies is configured to produce an illumination region,
wherein the illumination regions combine to form an illumination pattern,
wherein at least one illumination region is radial and positioned relative an optical origin, and wherein the intersection between the optical horizon and the optical vertical axis defines the optical origin, and
wherein the at least one illumination region is a first illumination region and the illumination pattern further comprises a second illumination region that is symmetrical to the first illumination region about the optical vertical axis, and wherein a lateral edge of an illumination region extending in the same radial direction as the first illumination region is located closer to the optical origin than a lateral edge of the first illumination region.

11. The headlight system of claim 10, wherein at least one optical assembly from the plurality of optical assemblies includes a lens.

12. The headlight system of claim 10, wherein at least one optical assembly from the plurality of optical assemblies includes a reflector.

13. The headlight system of claim 10, wherein the illumination pattern further comprises a third illumination region positioned between the first illumination region and the second illumination region.

14. The headlight system of claim 13, wherein the at least one optical assembly includes an illumination source, and wherein the illumination source corresponds to one of the first illumination region or the second illumination region.

15. The headlight system of claim 10, further comprising:
a controller in electrical communication with one or more of the optical assemblies and at least one vehicle input, the controller configured to:
receive a signal from the vehicle input; and
in response to receiving the signal, adjust the illumination intensity of the first illumination region and the illumination intensity of the illumination region extending in the same radial direction as the first illumination region in a sequential manner.

16. The headlight system of claim 15, wherein the controller is configured to decrease the illumination intensity of the first illumination region prior to decreasing the illumination intensity of the illumination region extending in the same radial direction as the first illumination region.

17. A headlight system for a leaning vehicle, the headlight system comprising:
a plurality of illumination sources being arranged about an optical horizon and an optical vertical axis,
wherein each of the illumination sources is configured to produce an illumination region,
wherein the illumination regions combine to form an illumination pattern,
wherein a first illumination region, a second illumination region and a third illumination region are each positioned relative an optical origin and each extend in the same radial direction, a lateral edge of each of the first illumination region, second illumination region and third illumination region being located at a different radial distance from the optical origin, and wherein the intersection between the optical horizon and the optical vertical axis defines the optical origin, and
a controller in electrical communication with one or more of the illumination sources and at least one vehicle input, the controller configured to:
receive a signal from the vehicle input; and
adjust the intensity of at least one illumination source, thereby adjusting the illumination intensity of the corresponding illumination region.

18. The headlight system of claim 17, wherein the controller is configured to adjust the illumination intensity of the first illumination region independently of the illumination intensities of the second and third illumination regions.

19. The headlight system of claim 17, wherein the controller is configured to adjust the illumination intensities of the first illumination region, second illumination region and third illumination region in a sequential manner.

20. The headlight system of claim 17, wherein the first illumination region extends radially between the optical origin and the second illumination region, and wherein the second illumination region extends radially between the first illumination region and the third illumination region,
the controller further being configured to:
increase the illumination intensity of the second illumination region after increasing the illumination intensity of the first illumination region, and
increase the illumination intensity of the third illumination region after increasing the illumination intensity of the second illumination region.

* * * * *